United States Patent [19]

Asano et al.

[11] 4,189,232
[45] Feb. 19, 1980

[54] RANGE DETECTING METHOD AND APPARATUS

[75] Inventors: Noriyuki Asano, Kawasaki; Yukichi Niwa, Yokohama; Mitsutoshi Owada, Yokohama; Takaaki Yamagata, Yokohama; Shin Tsuda, Kawagoe, all of Japan

[73] Assignee: Canon Kabushiki Kaisha, Tokyo, Japan

[21] Appl. No.: 867,339

[22] Filed: Jan. 5, 1978

[30] Foreign Application Priority Data

Jan. 6, 1977 [JP] Japan ............... 52-505

[51] Int. Cl.² .................. G01C 3/00; G03B 7/08
[52] U.S. Cl. ...................... 356/1; 250/201; 354/25; 356/4
[58] Field of Search ............ 356/1, 4; 354/25; 250/201, 204

[56] References Cited
U.S. PATENT DOCUMENTS

| | | | |
|---|---|---|---|
| 3,898,676 | 8/1975 | Hosoe Machioa et al. | 354/25 |
| 3,945,023 | 3/1976 | Stauffer | 356/4 |
| 4,004,852 | 1/1977 | Pentecost | 356/1 |

Primary Examiner—S. C. Buczinski
Attorney, Agent, or Firm—Fitzpatrick, Cella, Harper & Scinto

[57] ABSTRACT

A range detecting method and apparatus of a construction, in which first and second images of an object to be formed by a range finding optical system with a relative positional parallax corresponding to the object distance are scanned purely electrically by the use of one or more photo-sensor arrays, then analog image element signals concerning these first and second images obtained at this time are sequentially converted into two-value signals, after which the two-value signals are stored, as inputs, in first and second digital storing device where the coincidence and non-coincidence of these digital image scanning signals stored in these first and second storing devices are detected by means of a coincidence detecting device, while one of these image scanning signals are relatively shifted bit by bit with respect to other image scanning signals, and the shift bit quantities required until the digital image scanning signals of the same bit numbers concerning these first and second images may become optimumly coincided, thereby finding out the object distance from the shift bit quantities.

32 Claims, 94 Drawing Figures

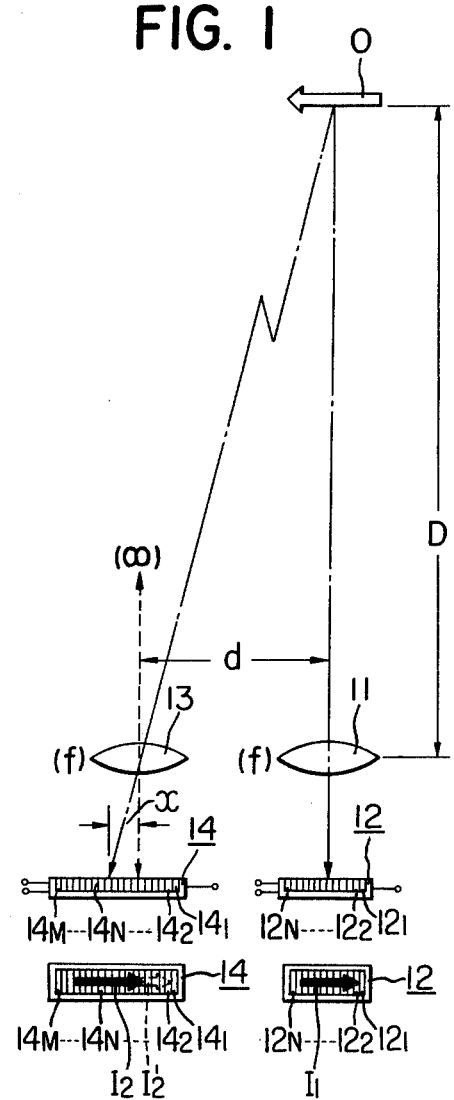
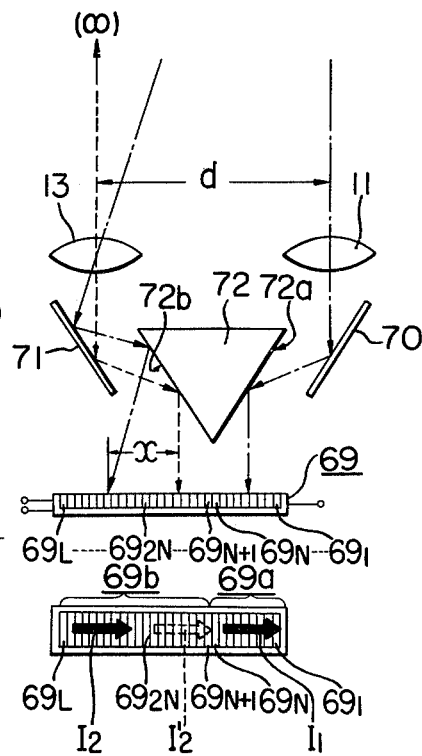

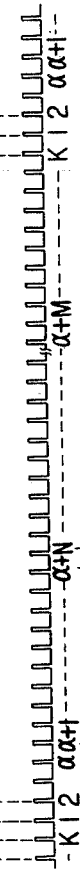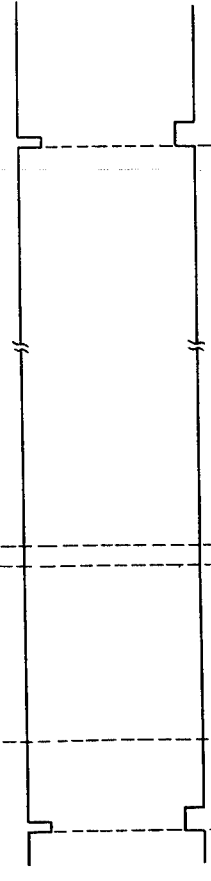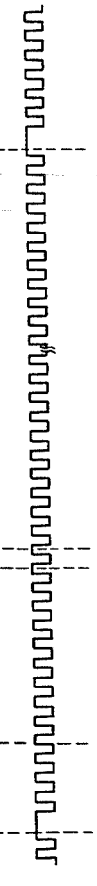
FIG. 3A PULSE GENERATING CIRCUIT 16 OUTPUT (OUTPUT a)
FIG. 3B PULSE GENERATING CIRCUIT 16 OUTPUT (OUTPUT b)
FIG. 3C PULSE GENERATING CIRCUIT 16 OUTPUT (OUTPUT c)
FIG. 3D DRIVER 15 OUTPUT (START PULSE $\phi_S$)
FIG. 3E DRIVER 15 OUTPUT (DRIVE CLOCK $\phi_C$)

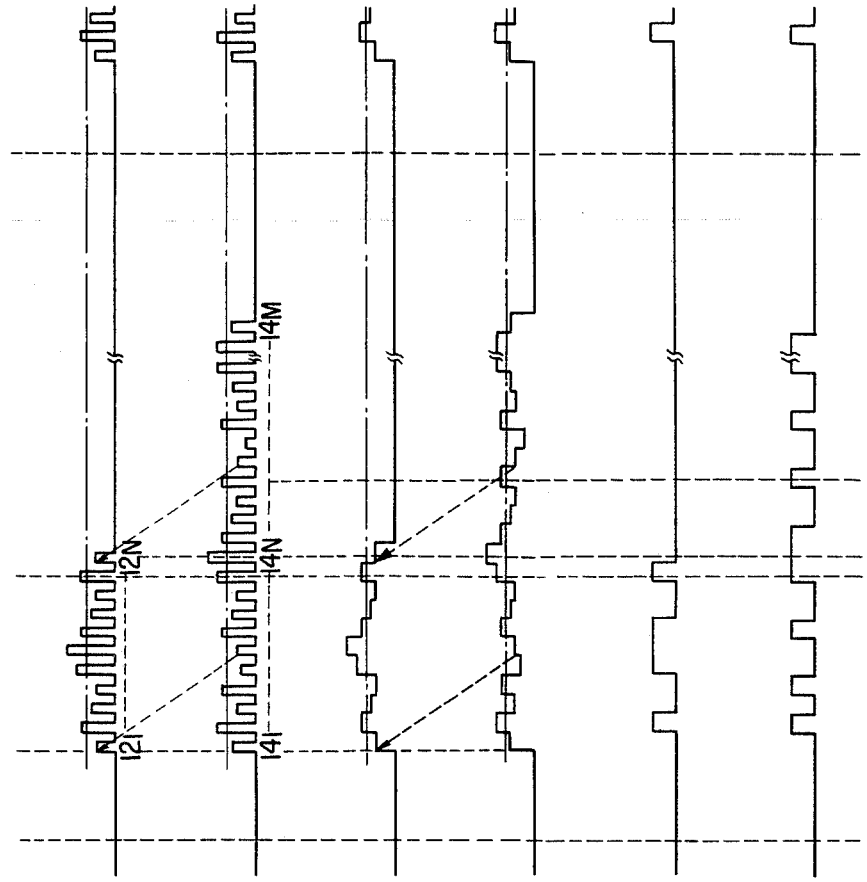
FIG. 3F SENSOR ARRAY 12 OUTPUT
FIG. 3G SENSOR ARRAY 14 OUTPUT
FIG. 3H SAMPLE AND HOLD CIRCUIT 17 OUTPUT
FIG. 3I SAMPLE AND HOLD CIRCUIT 18 OUTPUT
FIG. 3J COMPARATOR 20 OUTPUT
FIG. 3K COMPARATOR 21 OUTPUT

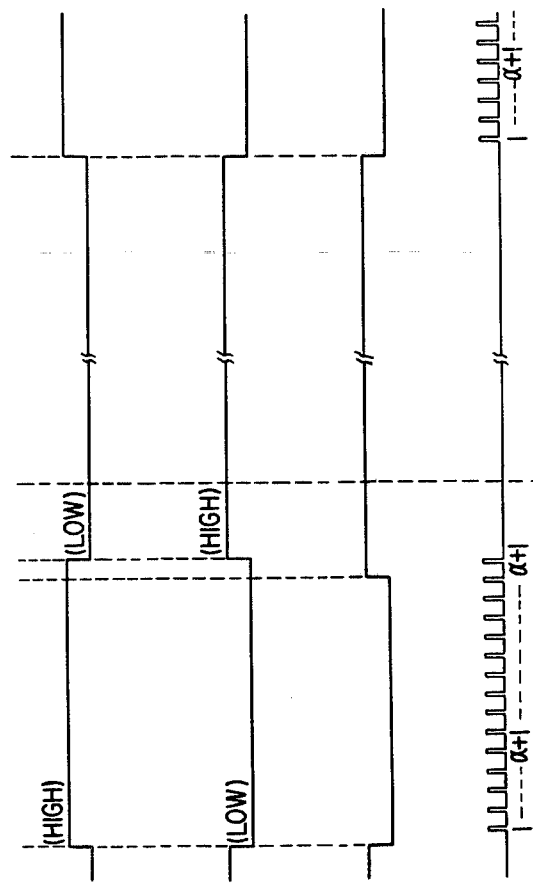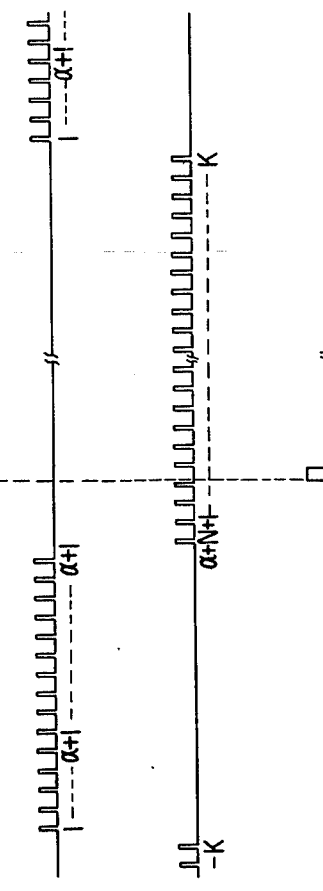
FIG. 3L
CONTROL CIRCUIT 25 OUTPUT (OUTPUT d)
FIG. 3M
CONTROL CIRCUIT 25 OUTPUT (OUTPUT e)
FIG. 3N
CONTROL CIRCUIT 25 OUTPUT (OUTPUT f)
FIG. 3O
"AND" GATE 26 OUTPUT
FIG. 3P
"AND" GATE 29 OUTPUT
FIG. 3Q
COINCIDENCE DETECTING CIRCUIT 27 OUTPUT (COINCIDENCE SIGNAL)

FIG. 8A PULSE GENERATING CIRCUIT 16 OUTPUT a

FIG. 8B PULSE GENERATING CIRCUIT OUTPUT b

FIG. 8C CONTROL CIRCUIT 25 OUTPUT f

FIG. 8D "AND" GATE 59 OUTPUT

FIG. 8E INVERTER 60 OUTPUT

FIG. 8F "AND" GATE 61 OUTPUT

FIG. 8G "AND" GATE 64 OUTPUT (COINCIDED SIGNAL)

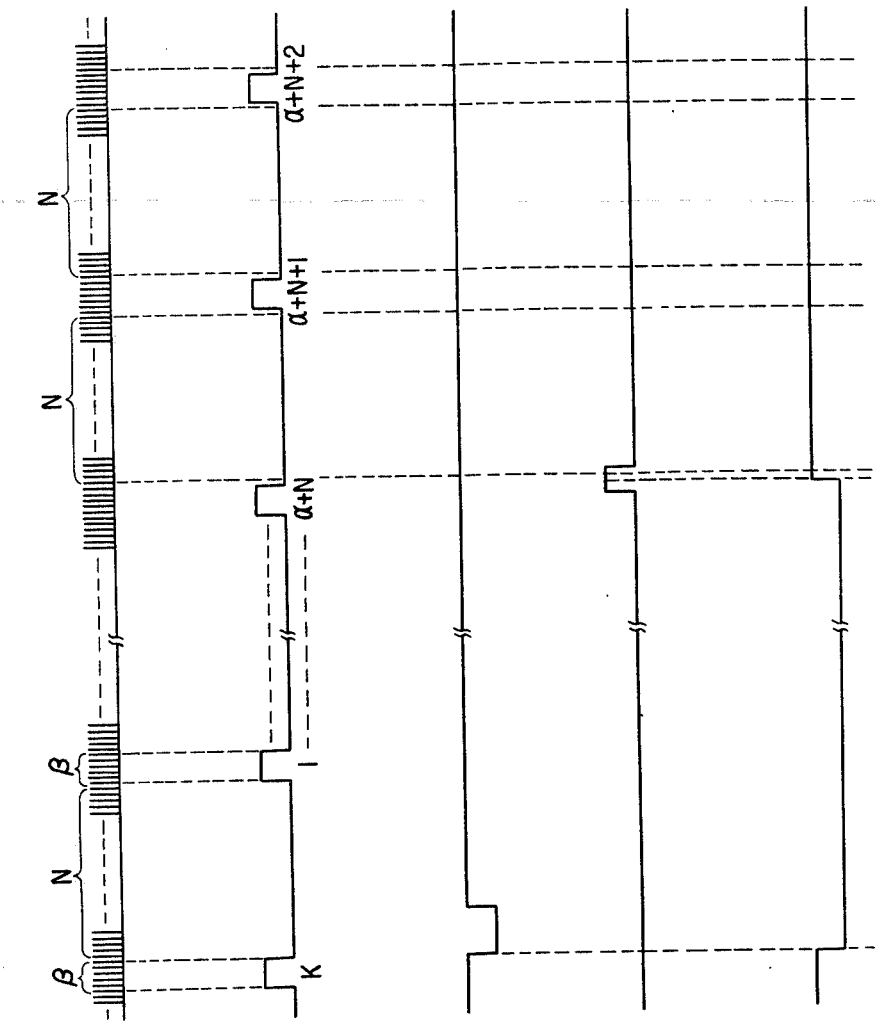

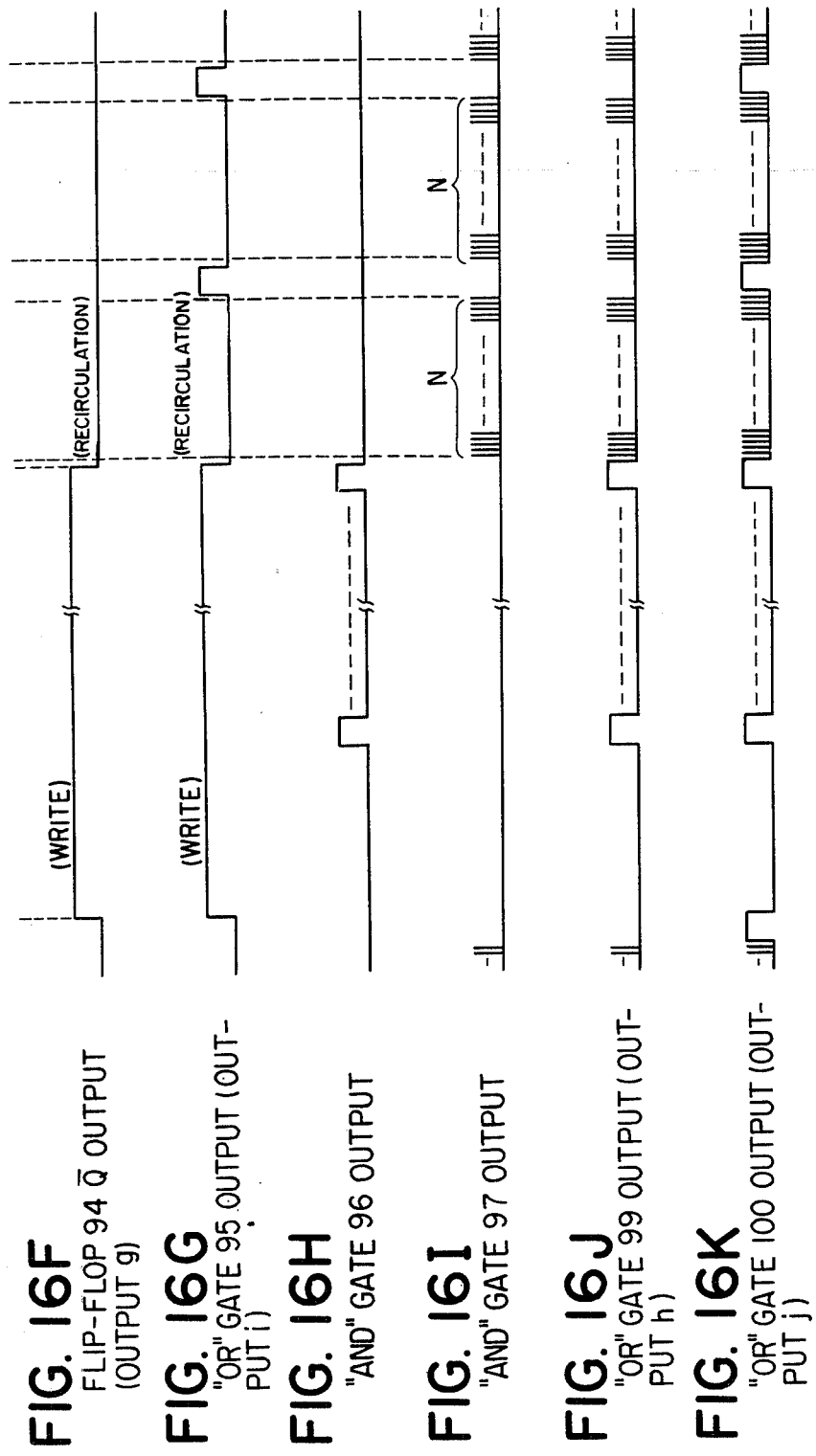

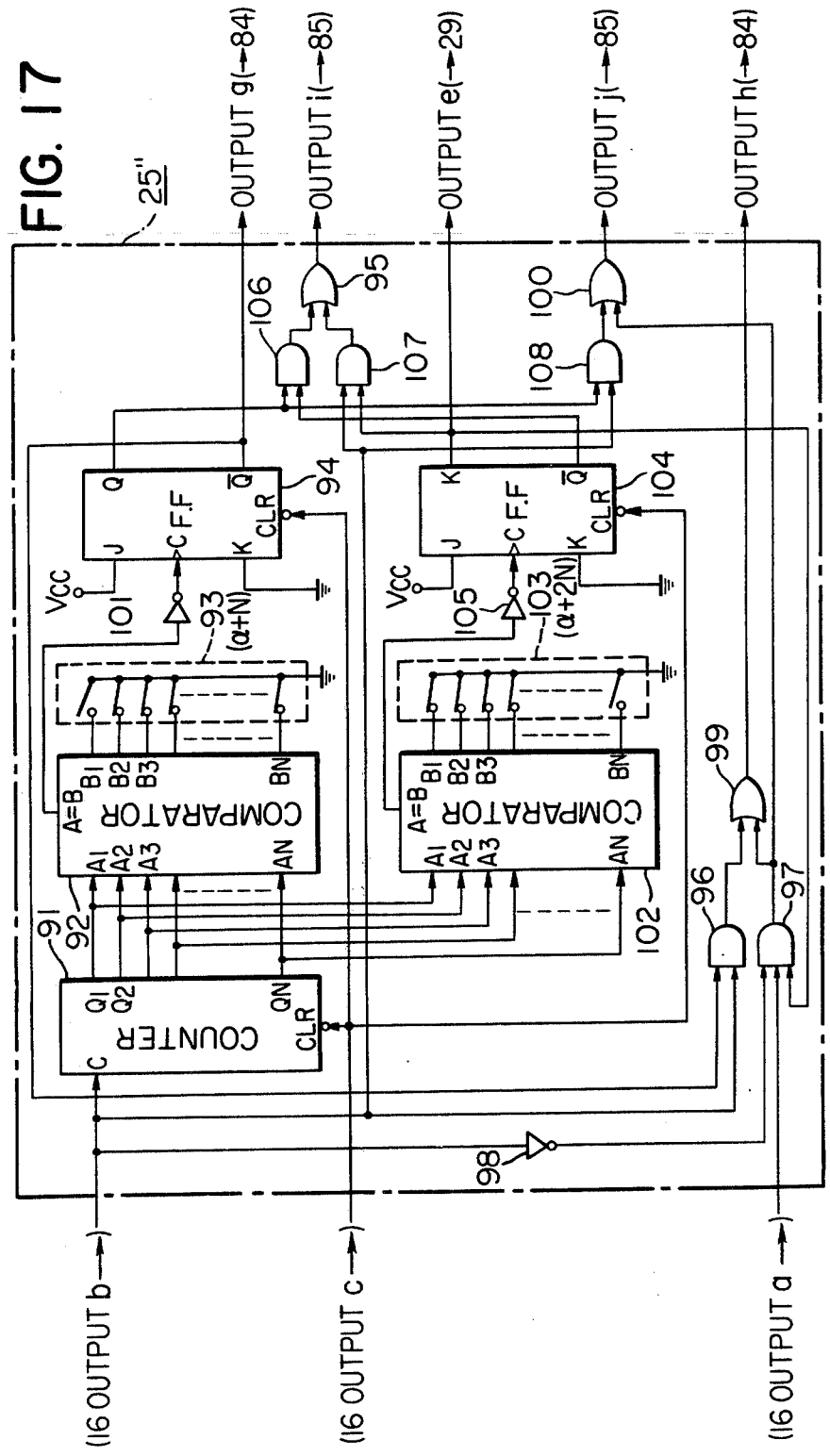

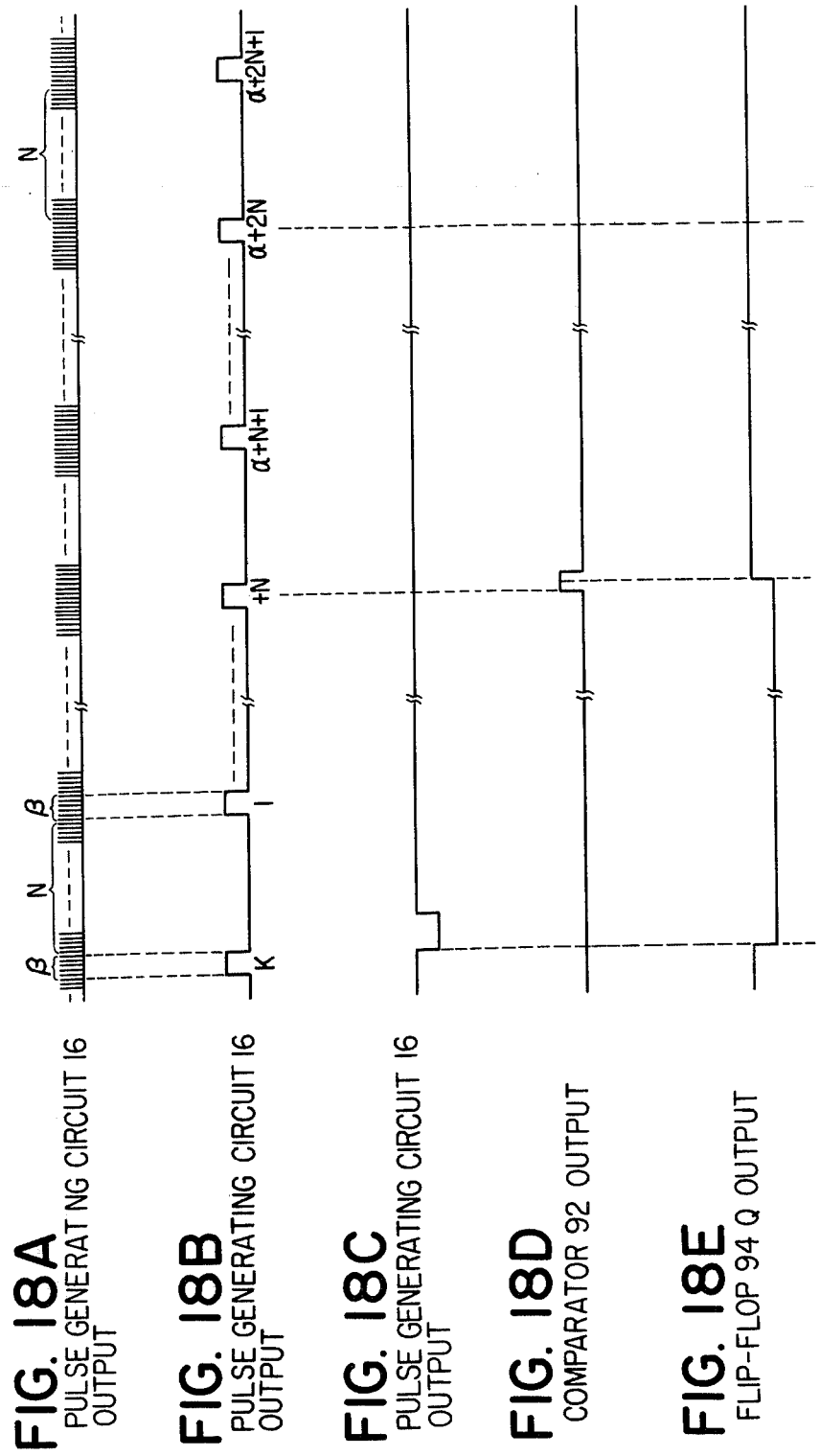

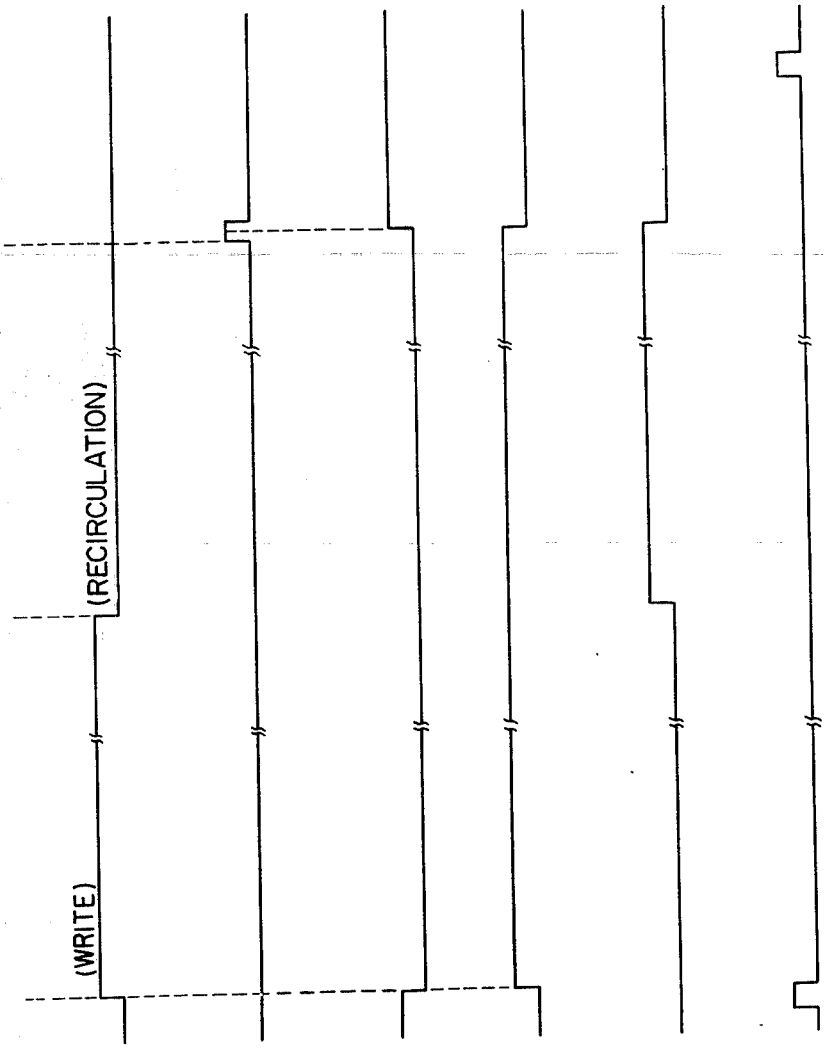

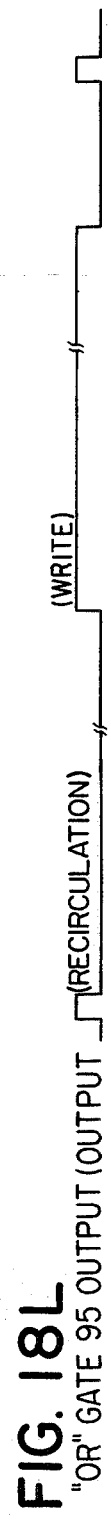
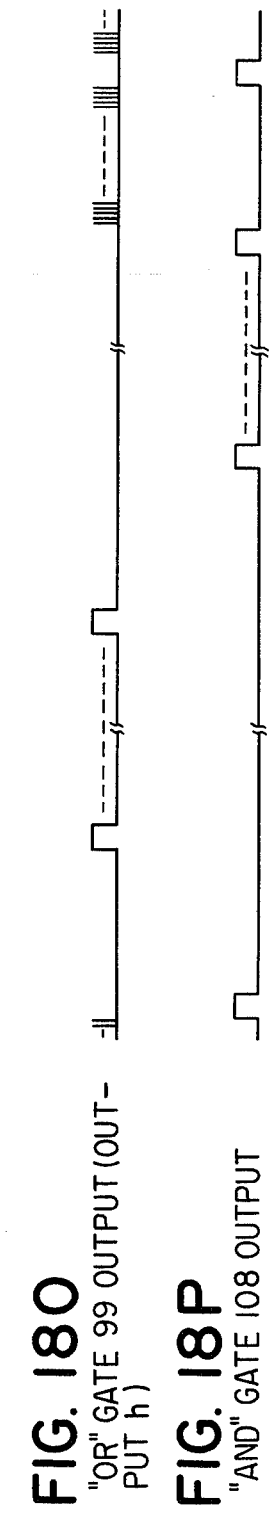
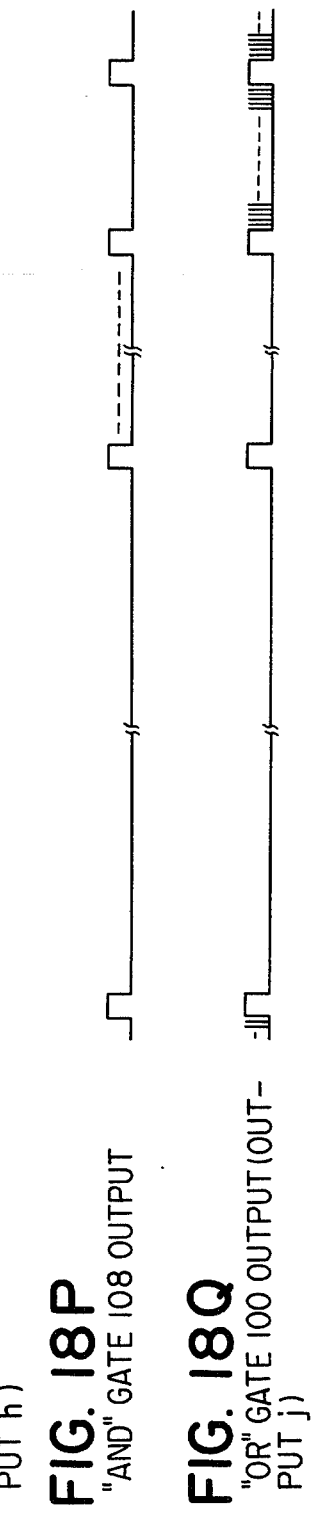
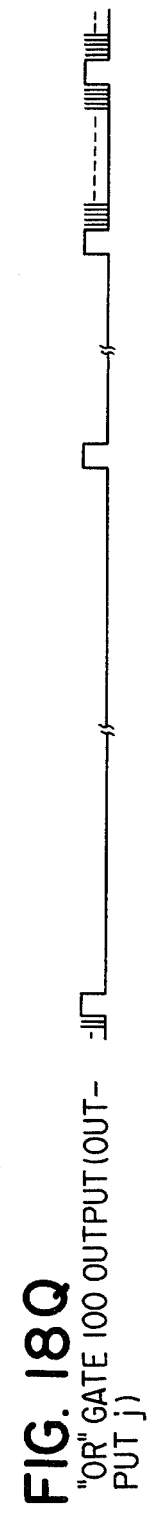
FIG. 18L "OR" GATE 95 OUTPUT (OUTPUT i)
FIG. 18M "AND" GATE 96 OUTPUT
FIG. 18N "AND" GATE 97 OUTPUT
FIG. 18O "OR" GATE 99 OUTPUT (OUTPUT h)
FIG. 18P "AND" GATE 108 OUTPUT
FIG. 18Q "OR" GATE 100 OUTPUT (OUTPUT j)

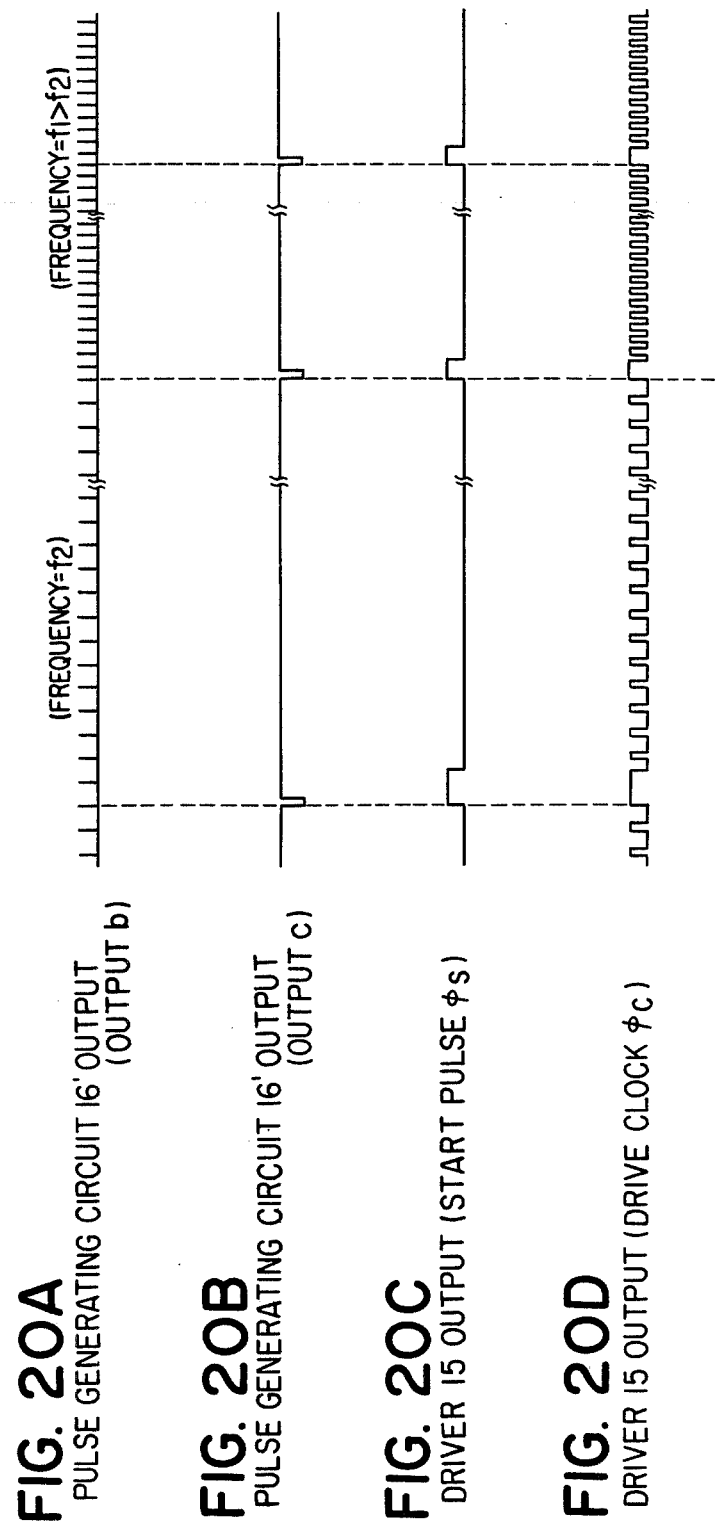

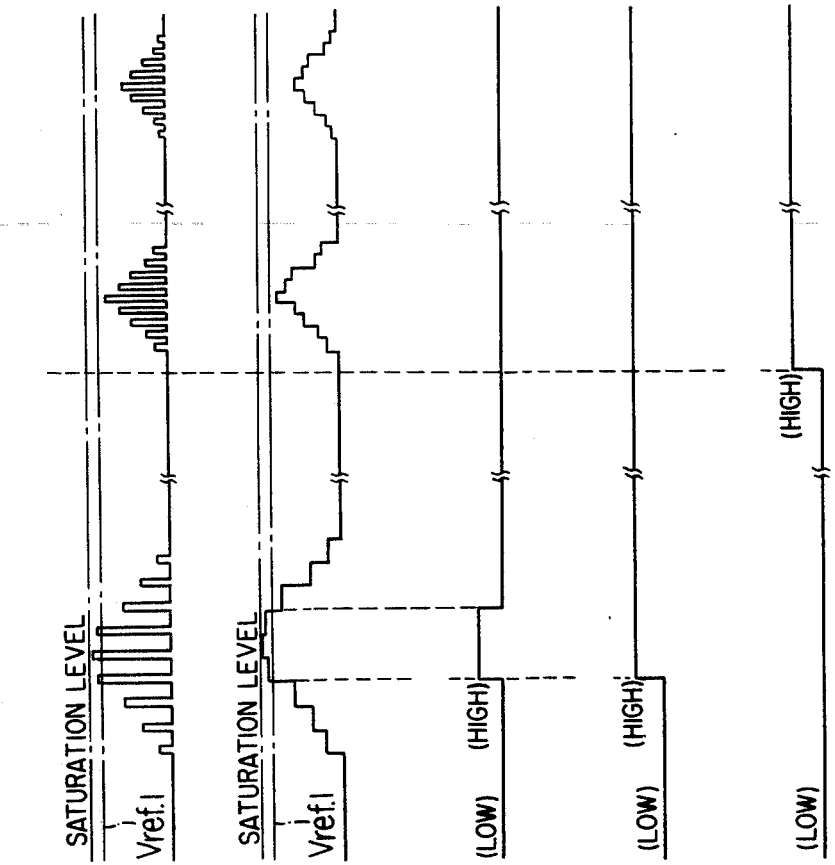

FIG. 21

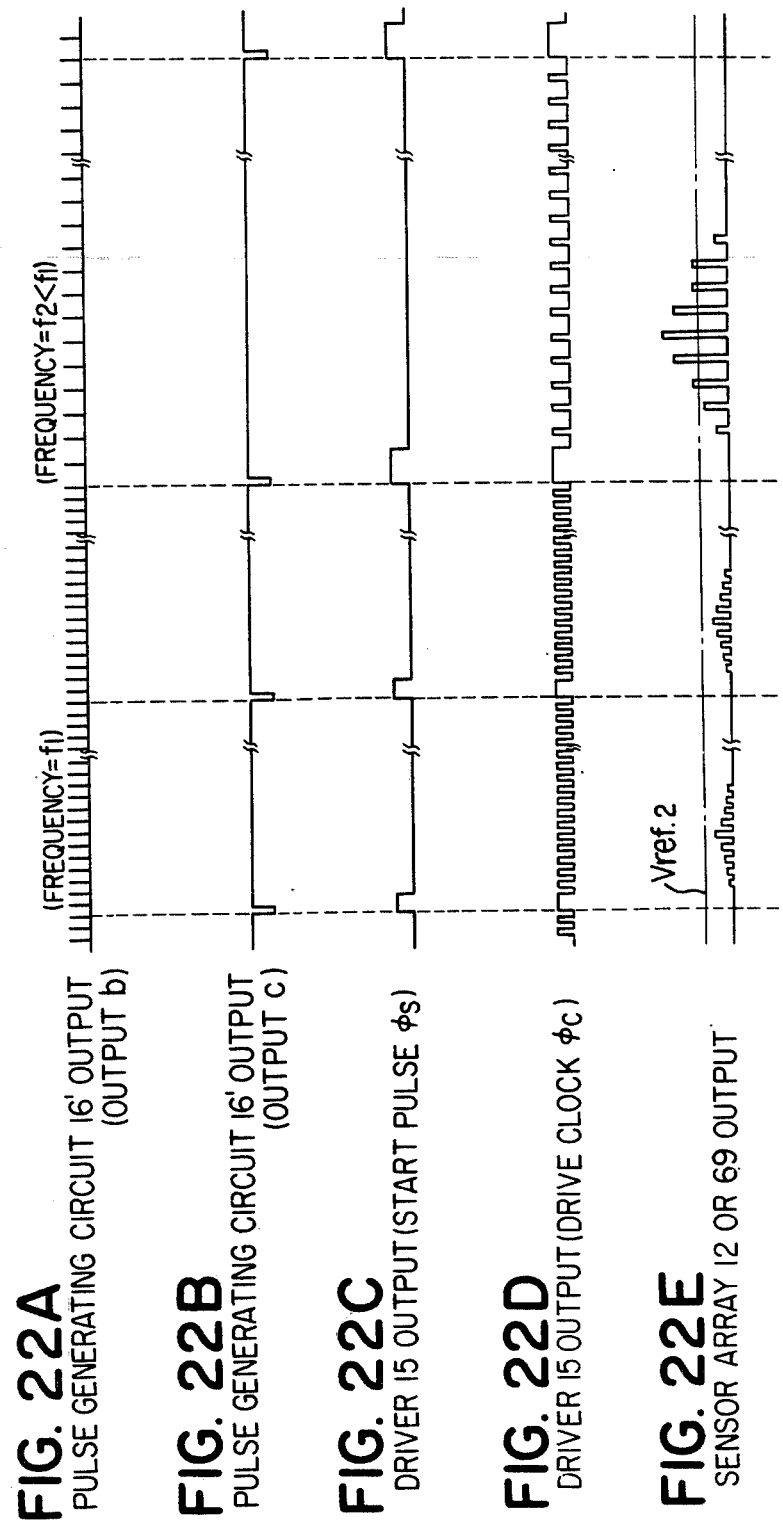

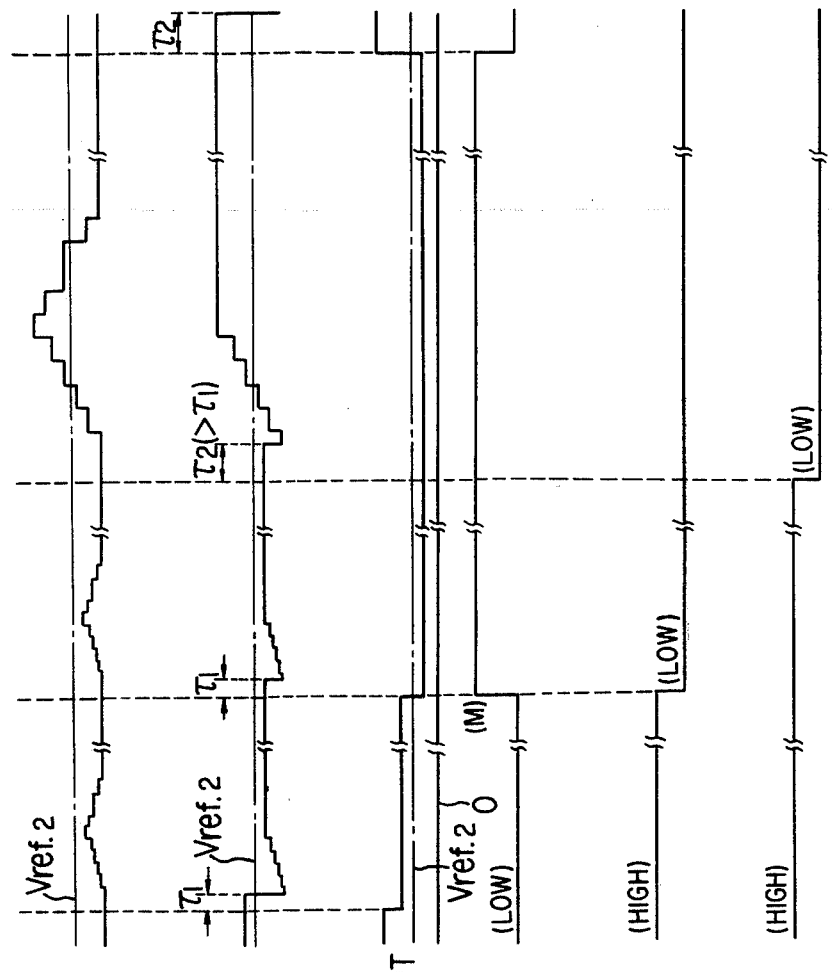

RANGE DETECTING METHOD AND APPARATUS

BACKGROUND OF THE INVENTION

1. Field of the Invention

This invention relates to a range detecting method and apparatus, and more particularly, it is concerned with the range detecting method and apparatus of a type such that a distance to an object is measured by electrically detecting a relative quantity of discrepancy in space between two images in utilization of the distance measurement principle in a base line double-image coincidence type distance measurement meter. More specifically, the invention relates to a range detecting method and apparatus of a type, in which image scanning signals concerning the two images are obtained by scanning the abovementioned two images, based on which signals a relative quantity of spatial discrepancy between the two images may be detected.

2. Description of the Prior Art

There have so far been proposed various types of electric double-image coincidence detection type range detecting method and apparatus as outlined in the preceding, or automatic focus adjusting devices for photographic cameras, etc. using such range finding devices. Describing more specifically, this range finding device is of such a type that two images of an object to be formed by a range finding optical system with a relative positional parallax corresponding to the object distance are received by photo-electric light receiving means, and quantities of relative positional parallax in these two images are found from outputs of the light receiving means obtained at this time, thereby calculating a distance to the object for the range finding.

For example, according to Japanese Patent Publication No. 48-5733 (published Feb. 20, 1973, for the invention of "An Automatic Focus Adjusting Device in a Camera" in the name of Canon Kabushiki Kaisha), there is proposed a range detecting method and apparatus in the form of an automatic focus adjusting device, wherein a pair of photo-conductive elements which are so constructed that their resistance values may vary in accordance with positional changes in an image on the light receiving surfaces thereof are juxtaposed, and then images of the one and the same object are formed on these elements by means of a range finding optical system comprising a pair of focussing lenses fixedly disposed at a certain length on the base line so that a distance to the object may be detected by finding a difference in the resistance values between these two elements by utilizing the principle that a relative quantity of discrepancy in the image forming position on each element corresponds to a distance to the object.

In this disclosed device, however, the photo-conductive element per se is of a very peculiar structure, on account of which there inevitably take place various inconveniences in using a pair of these elements such that coincidence of the response characteristics in both elements in an ideal state becomes highly difficult, as the result of which precision in the detection becomes deteriorated due to increase in error signal, and false determination in distance will arise in the range detection due to coincidence of the resistance values in both elements in spite of the relative positions of the images on both elements being actually discrepant.

With a view to solving such a problem, there has been proposed a range detecting device, or an automatic focus adjusting device, in which image scanning signals on the two images are obtained by scanning them in utilization of a photo-electric light receiving means, and then by finding a quantity of relative positional parallax in these two images from the two image scanning signals, the object distance is calculated, or the focus adjustment of the objective lens system in a camera with respect to the object is automatically attained by utilizing informations concerning a relative positional parallax in these two images.

For example, U.S. Pat. No. 3,898,676, (filed Dec. 20, 1975, granted to Hosoe et al. for an invention entitled "Distance Detecting Device" assigned to Canon Kabushiki Kaisha) teaches an automatic focus adjusting device of a construction, wherein arrays of photo-sensors are used as the photo-electric light receiving means for receiving the two images, and, by driving these photo-sensor arrays simultaneously, a photo-electric output of each photo-sensor in the arrays is obtained in a timed sequence to thereby scan the two images simultaneously in a purely electrical manner, and image scanning signals to be obtained on these two images at this time are converted to wave form signals through low pass filters, after which these wave form signals are introduced into a phase discriminator to detect a phase difference between these image scanning signals, and a servomotor is actuated by an output from the phase discriminator to cause are objective lens system to shift along its optical axis, in association with which one of the two images is shifted with respect to the other, whereby "in-focus position" of the objective lens system to the object is determined with a point where the phase difference between the image scanning signals for the two images becomes zero, in other words, a point where the relative positional parallax of the two images becomes zero.

Also, according to Laid-Open Japanese Patent Application No. 51-45556 (Laid-Open on Apr. 19, 1976 for the invention of "Method and Apparatus for Distance Detection", there is proposed a method and an apparatus for detecting distance of an object, which is constructed in such a manner that self-scanning image sensors (a kind of photo-sensor array) are utilized as the photo-electric light receiving means for receiving two images, that the two images are repeatedly scanned by these image sensors, at which time coincidence and non-coincidence of the image scanning signals on the two images to be obtained from the image sensors are detected by means of a coincidence detection circuit, while a timing for commencing scanning of one of the image sensors is varied by a variable delay circuit against a timing for commencing the scanning of the other image sensor, and that the relative positional parallax quantities of the two images, i.e., the object distance is made known directly from a lagged quantity between the timings for starting the scanning operations by the two image sensors which has been found upon detection of the coincidence of the abovementioned image scanning signals by the abovementioned coincidence detection circuit.

In the methods and devices as disclosed in these U.S. Pat. No. 3,899,676 and Laid-Open Japanese Patent Application No. 51-45556, the two images of an object to be formed by the range finding optical system are scanned purely electrically in utilization of photo-sensor arrays or image sensors known as, in particular, Photo-Diode Array, CCD (Charge Coupled Device), or BBD (Bucket Brigade Device), and so on, and the image scanning signals concerning the two images to be obtained at this time are used for distance detection or focus detection. In particular, since the image is scanned in a purely electrical manner utilizing the photo-sensor arrays or image sensors, accurate signal corresponding exactly to the image pattern can be used, on account of which further improvement in precision of the distance detection or the focus detection can be expected.

However, these methods and apparatuses as have heretofore been proposed contain therein many problems still to be solved such as, for example, a concrete method for processing the abovementioned image scanning signals as one aspect, hence their reduction to practice is far-reaching.

For example, in the device proposed in the above-described U.S. Pat. No. 3,899,676, as already mentioned above, the image scanning signals are converted to the waveform signals by causing them to pass through low pass filters, after which the waveform signals are introduced into the phase discriminator, where detection is conducted to find whether any phase difference has occurred between the two signals. In this case, since the phase discriminator deals with the waveform signals, in particular, the overall construction of the device becomes complicated, and, since its reliability is lacking, it is not possible to accurately detect the phase difference when it is extremely small, on account of which the operation of the phase discriminator as the automatic focussing device is unavoidably inaccurate.

Also, in the device as proposed in the above-discussed Laid-Open Japanese Patent Application No. 51-45556, there is merely adopted a differential amplifier or a combination of the differential amplifier and a comparator as the circuit for detecting coincidence and non-coincidence of the two image scanning signals. Considering, however, that the signals which the circuit deals with are time-sequential signals to be produced, as an output, from the image sensors, it is almost impossible to carry out detection of the coincidence and non-coincidence of the image scanning signals with such simple circuit construction.

Furthermore, in the method and apparatus as proposed here, the scanning start timing of one of the image sensors is caused to vary with respect to the scanning start timing of the other image sensor by the use of a variable delay circuit, and a discrepant quantity between the scanning start timings for these two image sensors is taken as the object distance. However, as has so far been well recognized, in utilizing the self-scanning type image sensors such as the photo-diode array of the charge accumulation type, CCD, or BBD, etc., if the scanning start timing, i.e., the timing for imparting the start pulse, is varied, the integration time, i.e., the effective light receiving time, also varies with the result that the level of the output signal varies. Accordingly, in the proposed method and device, since the scanning start timing of one of the image sensors is caused to vary by the variable delay circuit with respect to the scanning start timing of the other image sensor, the two image scanning signals to be obtained there are resulted from extreme level variations, so that, even if it is attempted to compare these two image scanning signals for detection of coincidence, such is apparently impossible. After all, it is not at all certain to attain accurate distance detection.

SUMMARY OF THE INVENTION

Thus, the present invention has been made with a view to eliminating various disadvantages inherent in the conventional range finding devices as mentioned in the foregoing. That is, a principal object of the invention is directed to provide an improvement in an image scanning, electrical double-image coincidence detection type range detection method and apparatus, or more specifically, a range detection method and apparatus of a type, in which two images of an object to be formed by a range finding optical system with a relative positional parallax corresponding to the object distance are scanned to obtain image scanning signals relative to the two images, and then a quantity of this relative positional parallax in these two images are found from these image scanning signals, with which the object distance is found.

It is therefore the primary object of the present invention to provide a novel range detection method and apparatus which is perfectly free from all the inconveniences above-described, has a sufficiently guaranteed precision in the range finding operation, is capable of obtaining always reliable and accurate distance information, is free from any difficulty at all in reduction into practice, and is capable of attaining always reliable and accurate focus detection or focus adjusting operation, even in case it is adopted in a semi-automatic or full automatic focus adjusting device in a photographic camera, and other optical apparatuses and appliances.

It is another object of the present invention to provide a novel range finding device, in which a quantity of the relative positional parallax in two images is detected with high precision through an entirely new signal processing method without relying on the phase discrimination method by a phase discrimination circuit as heretofore been practiced at the time of processing image scanning signals concerning the two images, thereby making it possible to obtain always reliable and accurate distance informations.

It is still another object of the present invention to further improve the precision in the range finding operation by digitally processing the abovementioned image scanning signals.

According to the present invention, there is provided a range detecting method and device of a type, in which two images of an object for the range detection formed by the range finding optical system are scanned purely electrically by the use of one or more photo-sensor arrays and picture element signals concerning the two images to be obtained at this time are converted into digital values, after which these digital values are stored, as inputs, in first and second digital storing means where coincidence and non-coincidence of the digital image scanning signals stored therein are detected by coincidence detection means, while one of the image scanning signals is caused to shift bit by bit relative to the other image scanning signal, and the shift bit quantity required until the digital image scanning signals of the same bit numbers concerning these first and second images become optimumly coincided are counted, thereby finding out the object distance from this shift bit quantity.

In the present invention, there is adopted such a method that one of the two images of the object for the range detection is made a reference image and the other is made a comparative image to be compared with the reference imge, a sensor region for the comparative image is made wider than that for the reference image, and the detection is conducted theoretically in what signal portion of the two-value image signals for this comparative image have there occurred image signals optimumly coincided with the two-value image signals for the reference image. Actually, in detecting the coincidence between the two-value image signals for the reference image and the comparative image, there are adopted modes of processing such as follows.

The one is that the sensor region for receiving the reference image is made N bits and the sensor region for receiving the comparative image is made M bits (where $M >> N$), and a serial-in-parallel-out type shift register of N-bit construction is provided for each of these two sensor regions. When N numbers of two-value image data, i.e., N numbers of two-value signals concerning the reference image and initial N numbers of two-value signals concerning the comparative image, are introduced into these shift registers as the inputs thereto, the detection for coincidence and non-coincidence of these N numbers of data stored in the shift registers are started by means of bit-to-bit parallel simultaneous comparison, the bit-to-bit parallel comparison is carried out at every shift bit, while causing the data concerning the comparative image to shift bit by bit with respect to the data concerning the reference image with a timing synchronous with driving of the sensor arrays by a driver circuit. This method is highly advantageous in that the processing time spent for this coincidence detection can be shortened to a remarkable extent.

The other method is that, when N numbers of data concerning the reference image and the comparative image are stored in serial-in-serial-out recirculation type shift registers of N-bit construction which is used in place of the abovementioned serial-in-parallel-out type shift registers, the data as stored therein are subjected to one recirculation with the same timing, at which a coincidence detection is carried out for the N numbers of data stored in both shift registers by means of bit-to-bit serial comparison, thereafter, at every time the output data concerning the comparative image are newly produced, they are taken into the shift registers which have stored the N numbers of data concerning the comparative image, while shifting the already stored data bit by bit, and, at every termination of this data storing, the data in both shift registers are subjected to one recirculation to carry out the coincidence detection by the bit-to-bit serial comparison. This mode of processing is highly advantageous in that the circuit construction for coincidence detection of the data between these two shift registers can be made remarkably simple.

In particular, the present invention is so designed that the analog signals concerning the two images are processed after conversion into digital signals (or quantization), which is highly advantageous in easiness of the data processing concerning the two images, simplification of the processing circuit construction, and improvement in detection precision, and so forth.

In determining the coincidence of the stored data between both storing means, it is ideally desirable to determine that both data are taken as having been coincided when they are perfectly coincided, although such is almost impossible from the standpoints of practice and reality in view of the construction of the sensor arrays to be used, construction of the processing circuit, and so forth. It will therefore be more practical and advisable to construct the device in such manners as shown in the preferred embodiments of the present invention to be described later, that (1) by the use of a detecting circuit to detect whether the two-value signals of the outputs from the mutually corresponding sensors in the two-value signal trains of the output sensor arrays, which are recorded in the abovementioned separate recording means, are coincided at a predetermined ratio, or not, each recorded value in each recording device is regarded as being coincided when the two-value signals of the outputs of these mutually corresponding sensors become coincided at such predetermined ratio, or (2) by the use of a detection circuit to detect the maximum value of coincided numbers through counting of the coincided numbers of the two-value signals of the outputs from the mutually corresponding sensors in the two-value signal trains of the output sensor arrays recorded in the abovementioned separate recording means, each recorded value in each of the separate recording means is regarded as being coincided when the coincided numbers of the two-value signals of the outputs from the mutually corresponding sensors have become the maximum.

It is other object of the present invention to provide more concrete method and device which is highly suitable for practical application to an automatic focus detecting device or a focus adjusting device in photographic cameras, etc., and are capable of improving precision in the detection or adjustment of the focus, when incorporated in the cameras, etc.

The foregoing objects, other objects, as well as the characteristic points of the present invention will become more apparent from the following detailed explanations thereof when taken in connection with the accompanying drawings.

BRIEF DESCRIPTION OF THE DRAWINGS

FIG. 1 is a schematic diagram for explaining the principle of the range detection according to the present invention;

FIGS. 3A to 3Q show various output waveforms of the outputs from the principal part of the circuit block diagram shown in FIG. 2;

FIGS. 8A to 8G show various output waveforms of the outputs from the principal part of the circuit block diagram in the coincidence detecting circuit of FIG. 7;

FIG. 10 is a schematic diagram showing another embodiment of the present invention, in particular, the optical layout of the device;

FIGS. 16A to 16K show various output waveforms of the outputs from each circuit block diagram in the control circuit shown in FIG. 15;

FIG. 17 is a circuit construction diagram showing one concrete example of the control circuit when the circuit construction shown in FIG. 14 is applied to the embodiment shown in FIG. 11;

FIGS. 18A to 18Q show various waveforms of the outputs from various circuit blocks in the control circuit shown in FIG. 17;

FIGS. 20A to 20I show various output waveforms of the outputs from the principal circuit in the range detecting device shown in FIG. 2 or 11 as well as in the pulse generating circuit shown in FIG. 19;

FIG. 21 is a circuit construction diagram showing one concrete example of an automatic resetting circuit applicable to the pulse generating circuit shown in FIG. 19;

FIGS. 22A to 22K show various output waveforms of the outputs from the principal circuit blocks in the automatic resetting circuit shown in FIG. 21, the range detecting device shown in FIG. 2 or 11 as well as the pulse generating circuit shown in FIG. 19;

DETAILED DESCRIPTION OF THE PREFERRED EMBODIMENTS

Figure 2A:
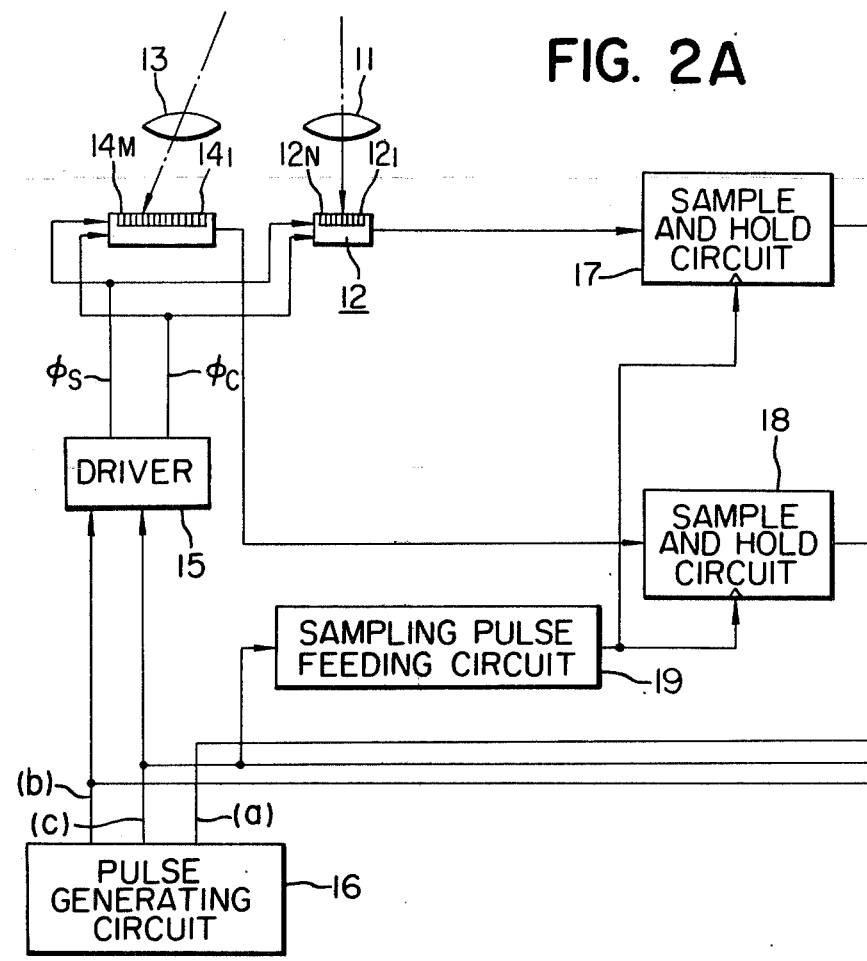
FIG. 2 is a combination chart of FIGS. 2A and 2B which are block diagrams showing one embodiment of the circuit construction of the present invention.

Referring first to FIG. 1, the principle of the present invention will be explained. In the drawing, reference numerals 11 and 13 designate a pair of focussing lenses for range finding which are fixedly disposed at a space interval with a predetermined base line length, and numerals 12 and 14 refer to photo-sensor arrays fixedly disposed in correspondence to the focussing lenses 11 and 13. The sensor array 12 consists of N numbers of very small photo-sensors $12_1, 12_2, \ldots, 12_N$ disposed linearly and regularly. The other sensor array 14 is of such a construction that M numbers (where M is a number sufficiently larger than N) of photo-sensors $14_1, 14_2, \ldots, 14_M$ of the same configuration as those photo-sensors $12_1, 12_2, \ldots, 12_N$ in the sensor array 12 (where M is a number sufficiently larger than N) are arranged linearly and regularly in the same manner.

In such constructional arrangement, an image of an object O is focussed on the sensor arrays 12 and 14 by the focussing lenses 11 and 13, respectively. In this case, the set of the lens 11 and the sensor array 12 is used for collimating the object O, hence the imate $I_1$ of the object O formed by the lens 11 can always be focussed on a substantially fixed position on the sensor array 12 due to the optical axis of the lens 11 being made to coincide with the object O. In contrast to this, the image $I_2$ of the object O formed by the lens 13 is focussed on a relatively discrepant position on the sensor array 14 with respect to the focussing position of the image $I_1$ on the abovementioned sensor array 12 for a quantity corresponding to a distance upto the object O. The relative discrepant quantity of the focussing position of the image $I_2$ on the sensor array 14, at this time, with respect to the focussing position of the image $I_1$ on the sensor array 12 can be converted to a discrepant quantity x of the image of the object O when it is on an ideally infinite point, hence the optical axis of the lens 13 coincides with the object O, from its focussing position on the sensor array 14 (this being designated by $I'_2$ in the drawing), whereby a distance D to the object O can be detected from this discrepant quantity x.

In more detail, if the base line length between the lenses 11 and 13 is d and their focal length is f, the distance D upto the object O is represented from the abovementioned discrepant quantity x of the image position, as follows:

$$D = d \cdot f / s$$

The discrepant quantity x at this time can be found out from a number covering both magnitude of the photo-sensors $14_1, 14_2, \ldots, 14_M$ in the sensor array 14 and the discrepant quantity x.

In order to find out this discrepant quantity x, the present invention is so constructed that a train of image element signals is taken out time-sequentially from each of the photo-sensors in the sensor arrays 12 and 14, respectively, in exactly same numbers (for example, N numbers) between them, thereafter, these image element signal trains are consecutively converted into two-value signals to be introduced as inputs into separate recording means, at which time the two-value image element signal trains from the sensor array 12 are stored in one of the recording means, while the two-value image element signal trains from the sensor array 14 are sequentially shifted bit-by-bit, for example, by clock pulses, etc. in the other recording means, to thereby discriminate coincidence and non-coincidence of the recorded values in both recording means at every time the shifting takes place, and counted values obtained by counting the numbers of the clock pulses spent for shifting of the two-value image element signal trains until the recorded values in both recording means become optimumly coincided from the start of the shifting of the two-value image element signal trains from the sensor array 14 are made the abovementioned discrepant quantity x, i.e., distance information upto the object O.

In the following, one physical embodiment of the present invention will be explained bearing in mind the principle of the present invention as described in the foregoing.

Figure 2:
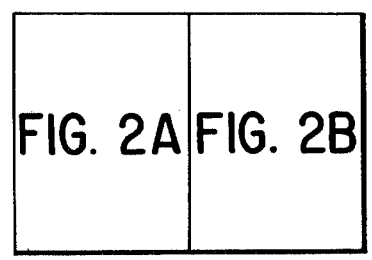
Figure 2B:
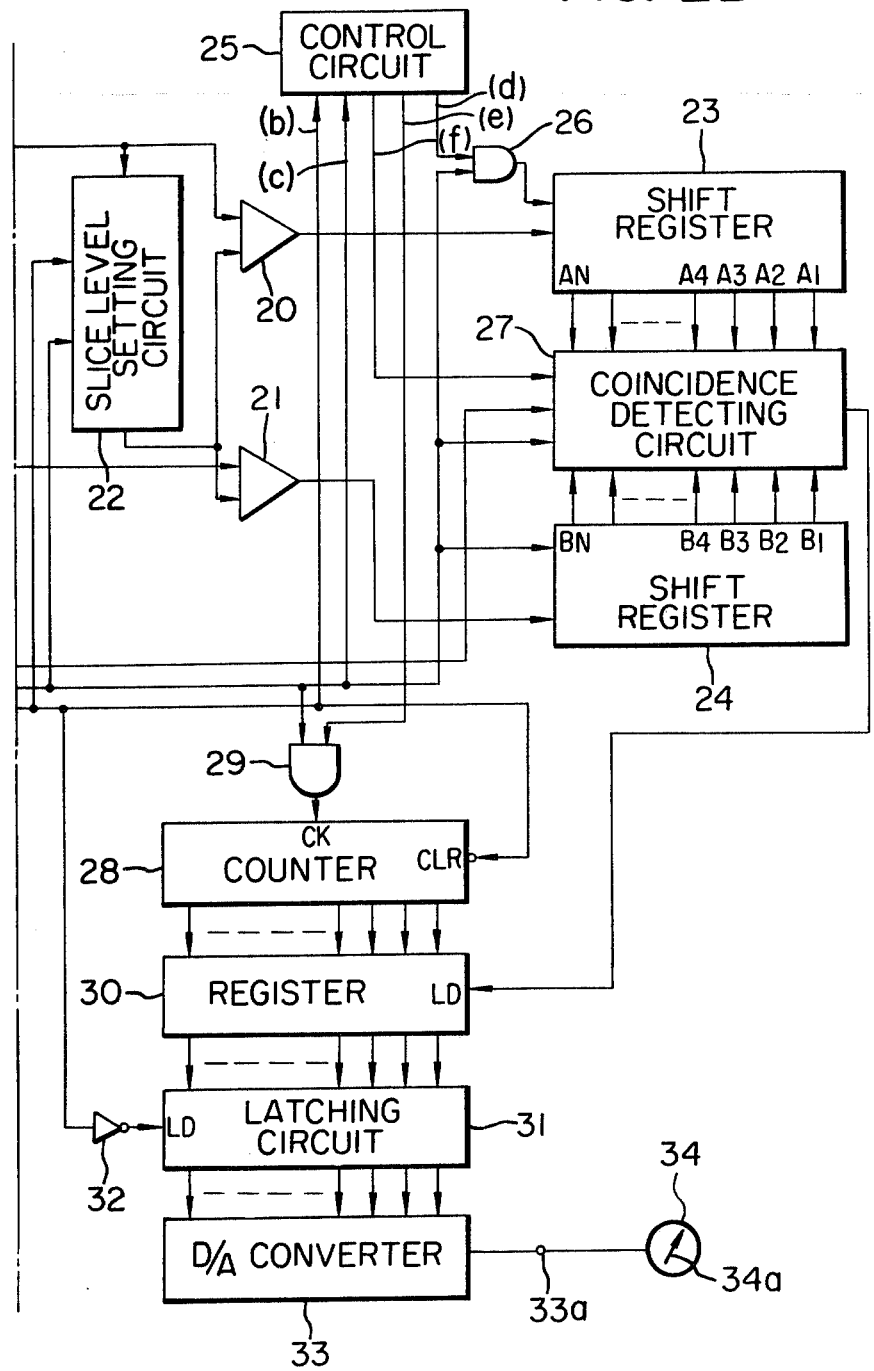

In FIG. 2, which is composed of FIGS. 2A and 2B showing one embodiment of the present invention, the optical layout is exactly same as that shown in FIG. 1 with the exception that self-scanning type sensor arrays are used as the photo-sensor arrays 12 and 14. In the drawing, a reference numeral 16 designates a pulse generating circuit which generates reference clock pulses required for driving the abovementioned sensor arrays 12 and 14 as well as sequential controls of every circuit element to be described in the following. The circuit in this embodiment is so constructed that it may generate first reference clock pulses (output a) shown in FIG. 3A, second reference clock pulses (output b) shown in FIG. 3B at every $N+\beta$ numbers by dividing frequency of the first reference clock pulses, and, further, third reference clock pulses (output c) shown in FIG. 3C at every K numbers (where:K is a number sufficiently larger than the number M of the sensors in the sensor array 14) by dividing frequency of the second reference clock pulses. A reference numeral 15 designates a driver for driving the abovementioned sensor arrays 12 and 14 based on the abovementioned second and third reference clock pulses to be generated as outputs from the pulse generating circuit 16. In this embodiment, the driver is so constructed that it may produce a start pulse $\phi_s$ as shown in FIG. 3D based on the third reference clock pulse (output c) and a drive clock $\phi_c$ as shown in FIG. 3E based on the second reference clock pulse (output b), and that, by applying these signals to the sensor arrays 12 and 14, it may send out time-sequentially the image elements signals from each of the photo-sensors $12_1 \ldots 12_N$ and $14_1 \ldots 14_M$ in the sensor arrays 12 and 14, respectively, as shown in FIGS. 3(f) and (g). Incidentally, when the photo-sensor arrays are driven, the drive clock $\phi_c$ to be used is practically in four or two phases. For the sake of ready understanding, however, the explanation herein will be made with the drive clock in a single phase.

Reference numerals 17 and 18 designate sample and hold circuits connected respectively to the sensor arrays 12 and 14, which, by being applied from a sampling pulse feeding circuit 19 with sampling pulse of a timing coincided with the output timing of image element signals from the sensor arrays 12 and 14, take thereinto the image element signal outputs from the sensor arrays 12 and 14 and hold them until subsequent sampling pulse is applied. In this consequence, pulse-shaped image scanning signals from the sensor arrays 12 and 14 as shown in FIGS. 3F and 3G and (g) are converted by these sample and hold circuits 17 and 18 into full wave signals, i.e., duty 100% signals, as shown in FIGS. 3H and 3I, respectively. The abovementioned sampling pulse feeding circuit 19 is so constructed that it may introduce the second reference clock pulses (output b) from the pulse generating circuit 16 as the input thereinto where the clock pulses are shaped into pulses coincided with the output timing of the image element signals from the sensor arrays 12 and 14, after which the thus shaped pulses are applied to the sample and hold circuits 17 and 18 as the sampling pulses, whereby the sample and hold circuits 17 and 18 become able to capture and hold a peak in the rising (or a trailing) of the image element signals from the sensor arrays 12 and 14. Incidentally, where there is used a photo-sensor device such as a combination of photo-diode arrays and CCD, in which the full wave signals, i.e., duty 100% video signals, are directly obtainable, the sample and hold circuits 17 and 18 are not required.

Numerals 20 and 21 refer to comparators for two-value conversion, which compare each of the output signal levels from the sensors $12_1 \ldots 12_N$ and $14_1 \ldots 14_M$ after the sampling and holding by the sample and hold circuits 17 and 18 with a slice level established in a slice level setting circuit 22 to produce an output "high" level signal when the signal level is higher than the slice level, and an output "low" level signal when the signal level is lower than the slice level. By these comparators 20 and 21, each of the output signals from each of the sensors $12_1 \ldots 12_N$ and $14_1 \ldots 14_M$ of the sensor arrays 12 and 14 after the sampling and holding operations by the abovementioned sample and hold circuits 17 and 18 are converted into two-value signals as shown in FIGS. 3J and 3K. The slice level to be established in the slice level setting circuit 22 is so automatically determined that the optimum two-value signals may be obtained on the basis of the outputs from the sensor array 12, the details of which will be described later.

Reference numerals 23 and 24 respectively designate serial-in-parallel-out type shift registers for recording each of output two-value image element signal trains (cf. FIGS. 3J and 3K) from the respective comparators 20 and 21. In this embodiment, the shift registers are of N-bit ($A_1 \ldots A_N$ and $B_1 \ldots B_N$) construction in conformity to the members of the sensors in the sensor array 12, and are driven by the second reference clock pulse (output b) from the pulse generating circuit 16 at the same clock speed in conformity to the emission speed of each of the image element signals from the sensor arrays 12 and 14. Accordingly, these shift registers function in such a manner that each of the two-value image element signals imparted by the comparators 20 and 21 is sequentially recorded, while shifting the signals bit-by-bit for every one clock, and the thus recorded values are produced as outputs in parallel.

A reference numeral 25 designates a control circuit which controls feeding of the clock pulse for shifting to the shift register 23, feeding of the second reference clock pulse (output b) from the abovementioned pulse generating circuit 16 to a counter 28 which counts number of the second reference clock pulses (output b), and, further, operations of a coincidence detecting circuit to be described later. The control circuit is so constructed that it introduces as the inputs thereinto both the second reference clock pulse (output b) and the third reference clock pulse (output c) from the abovementioned pulse generating circuit 16; then applies to an "AND" gate 26 provided for controlling shift clock pulse to the shift-register 23 a signal (output d) which maintains a high level during a period of from generation of the third reference clock pulse (output c) upto generation of the $\alpha+$Nth pulse of the second reference clock pulse (output b) in the pulse generating circuit 16, and maintains a low level during a period of from generation of the $\alpha+$Nth pulse of the second reference clock pulse (output b) upto generation, again, of the third reference clock pulse (output c), as shown in FIG. 3L, applies to an "AND" gate 29 provided for controlling feeding of the abovementioned second reference clock pulse (output b) to the abovementioned counter 28 a signal which is entirely opposite to the abovementioned output d, i.e., a signal (output e) which maintains a low level during a period of from generation of the third reference clock pulse (output c) upto generation of α+Nth pulse of the second reference clock pulse (output b) and maintains a high level during a period of from generation of the α+Nth pulse of the second reference clock pulse upto generation, again, of the third reference clock pulse (output c), as shown in FIG. 3M, and applies to the coincidence detecting circuit a signal (output f) which maintains a low level during a period of from generation of the third reference clock pulse (output c) upto generation of α×N−1st pulse of the second reference clock pulse (output b) and maintains a high level during a period of from generation of the α+N−1st pulse of the second reference clock pulse upto generation, again, of the third reference clock pulse, as shown in FIG. 3N.

Accordingly, the shift register 23 is to be fed only with the first to α+Nth pulses of the second reference clock pulse (output b) through the AND gate 26 after generation of the third reference clock pulse (output c) through the "AND" gate 26 as shown in FIG. 3O, on account of which it is caused to stop its shifting operation at the time when two-value image element signals from the whole sensors $12_1 \ldots 12_N$ in the sensor array 12 are completely recorded, and to hold the recorded values at this time. In contrast to this, the shift register 24 is shift-connected so far as the second reference clock pulse (output b) from the pulse generating circuit 16 is imparted thereto, so that only the recorded values in the register 24 are relatively shifted bit-by-bit at every one clock with respect to recorded values in the shift register 23 by pulses after the α+N+1st. As the result, two-value image element signals, each being lagged for one bit, $(14_1 \ldots 14_N \to 14_2 \ldots 14_{N+1} \to 14_3 \ldots 14_{N+1} \to \ldots)$ are produced parallelly as the outputs at every shifting operation.

Further, since the "AND" gate 29 permits the abovementioned second reference clock pulse (output b) to pass therethrough only during the period when the output e from the control 25 is at the high level, as shown in FIG. 3P, the counter 28 receives, as inputs thereinto, those pulses after the α+N+1st of the second reference clock pulse (output b), from its clock input terminal CK, and counts the number of these pulses, i.e., numbers of the shifting times by the shift register 24 after stoppage of the shifting operations in the abovementioned shift register 23, or, more particularly, a relative shifting quantity of the two-value image element signal trains from the sensor 14 with respect to the two-value image element signal trains from the sensor array 12. Incidentally, the counter 28 is cleared its contents by application of the abovementioned third reference clock pulse (output c) to its clear terminal CLR.

By the way, as is understandable from FIGS. 3B to 3G, the above-mentioned number "α" is one that is established in conformity to a delayed portion from the first pulse of the second reference clock pulse (output b), since, in driving the sensor arrays 12 and 14, the image element signal output does not start in correspondence to the first pulse of the second reference clock pulse (output b) from the pulse generating circuit after generation of the third reference clock pulse (output c) therefrom owing to the mode of driving by the driver 15 as well as the construction of the sensor arrays, but it starts in correspondence to a pulse slightly delayed from the first pulse of the second reference clock pulse (output b). This number may be arbitrarily selected in conformity to the delayed portion from the abovementioned first pulse until the image element signal output from the sensor arrays are started in accordance with the mode of driving by the driver as well as the structure of the sensor array to be employed.

A reference numeral 27 designates a coincidence detecting circuit which detects coincidence and non-coincidence of the recorded values in N-bit in both shift registers 23 and 24. In this embodiment, the circuit 27 is so constructed that it may produce a coincidence signal output as shown in FIG. 3Q when it has detected the optimumly coincided state, if not the perfect coincidence of every recorded values. This coincidence detecting circuit 27 is also controlled by the output f FIG. 3N from the control circuit 25 in such a manner that it may conduct the coincidence detection of the recorded values in both shift registers 23 and 24 only during the period when the output f is maintaining the high level, the details of which will be explained later.

A numeral 30 refers to a register which reads thereinto a counted value of the abovementioned counter 28, in response to the output coincidence signal from the coincidence detecting circuit 27, at the time when the detection circuit 27 has detected the maximum coincidence between the recorded values in both shift registers 23 and 24. The abovementioned coincidence detecting circuit 27 is so connected that the coincided signal therefrom may be applied to a load terminal LD of the register 30.

A numeral 31 refers to a latching circuit which takes thereinto for latching the recorded values in the abovementioned register 30 in response to the third reference clock pulse (output c) from the pulse generating circuit 16, i.e., at every time the scanning of the object images starts by the sensor arrays 12 and 14. This latching circuit is so connected that the third reference clock pulse (output c) may be applied thereto through an inverter 32.

A reference numeral 33 designates a D/A converter which is so constructed that it may receive as an input thereto a latched value in the abovementioned latching circuit 31, and process this input value in accordance with the equation for the distance, i.e., $D = f \cdot d/x$ which has been explained in relation to FIG. 1, to produce, as the result of the processing, an output analog signal (e.g., a voltage value) corresponding to the distance D. A reference numeral 34 designates a meter as an indicating device to indicate the distance upto the object for the range detection, and is connected to an output terminal 33a of the D/A converter 33.

In the above-described construction, the set of the lens 11 and the sensor array 12 are collimated with respect to the object for the range detection, and an image to be a reference of the object is focussed by the lens 11 on a substantially definite position on the sensor array 12. On the other hand, when the second and third reference clock pulses as shown in FIGS. 3B and 3C are generated from the pulse generating circuit 16 in a state of the object image being formed on the sensor array 14 at a relatively discrepant position thereon in accordance with the distance to the object, the driver 15 is actuated, whereby the image element signal is sent out time-sequentially from each of the sensors in the sensor arrays 12 and 14 (FIGS. 3F and 3G). These image element signals are then converted into full wave signals as shown in FIG. 3H and 3I means of the sample and hold circuits 17 and 18, after which these full wave signals are compared by the comparators 20 and 21 with the level established in the slice level setting circuit 22, and then applied to the shift registers 23 and 24, while being converted to two-value signals.

In this circuit construction, the control circuit 25 applies the high level signal (output d) to the "AND" gate 26 as shown in FIG. 3L in response to the third reference clock pulse (output c) from the pulse generating circuit 16. Accordingly, each of the shift registers 23 and 24 is driven by the second reference clock pulse (output b) from the pulse generating circuit 16, and, while shifting bit-by-bit, sequentially records the two-value image element signal trains to be imparted from the abovementioned comparators 20 and 21 so as to produce these recorded values in the form of parallel outputs at every time the recording is carried out.

In this sequence operation, the control circuit 25 applies to the "AND" gate 29 the low level signal (output e) as shown in FIG. 3M, so that feeding of the second reference clock pulse (output b) from the pulse generating circuit 16 to the counter 28 is interrupted (vide FIG. 3P). When the $\alpha+N$th pulse output of the second reference clock pulse (output b) from the pulse generating circuit 16 is produced, the control circuit 25 at this instant applies to the "AND" gate 26 the low level signal (output d) as shown in FIG. 3L to interrupt feeding of the second reference clock pulse (output b) from the pulse generating circuit 16 to the shift register 23 to thereby stop the shifting operation (accordingly, the shift register 23 holds the two-value image element signal trains from the whole sensors $12_1 \ldots 12_N$ in the sensor array 12 (vide FIG. 3P) and to apply to the "AND" gate 29 the high level signal (output e) as shown in FIG. 3M to cause feeding of the second reference clock pulse (output b) from the pulse generating circuit 16 to the counter 28 to start (vide FIG. 3P). Accordingly, the shifting operation of the shift register 24 alone is continued with respect to the pulses after the $\alpha+N+1$st of the second reference clock pulse (output b), and counting of the second reference clock pulse (output b) is started from the $\alpha+N+1$st pulse of this second reference clock pulse.

On the other hand, the coincidence detecting circuit 27 starts the coincidence detection of the recorded values in both shift registers 23 and 24 for the moment when the two-value image element signals from the whole sensors $12_1$ to $12_N$ in the sensor array 12 are provided in the shift register 23 by the output f of the abovementioned control circuit 25, the signal level of which changes from low to high when the $\alpha+N-1$st output pulse of the second reference clock pulse (output b) from the pulse generating circuit 16 as shown in FIG. 3N is produced, and, at the same time, the two-value image element signals from the initial N numbers of the sensors $14_1$ to $14_N$ in the sensor array 14 have been recorded in the shift register 24. And, when the circuit 27 detects a state wherein the recorded values in both shift registers 23 and 24 have become recognizable as having been substantially coincided mutually, in the course of the shift register 24 alone being subjected to the bit-by-bit shifting operations by the pulses after the $\alpha+N+1$st pulse of the second reference clock pulse (output b) and the two-value image element signal train recorded therein being in sequential transition such as $14_1$ to $14_N \rightarrow 14_2$ to $14_{N+1} \rightarrow 14_3$ to $14_{N+2} \rightarrow$ and so on, it produces a coincidence signal output as shown in FIG. 3(q) to the register 30. The register 30, the load terminal LD of which has been applied with the coincidence signals from the coincidence detecting circuit 27, reads thereinto counted values of the abovementioned counter 28 at this time. Accordingly, the recorded values of the register 30 becomes the distance information to the object. Thereafter, the recorded values of the register 30 at this moment are latched by the latching circuit 31 in response to the third reference clock pulse output (output c) from the pulse generating circuit 16 at the start of the subsequent scanning operation of the object images, after which they are converted into, for example, voltage values, by means of the D/A converter, and the converted values by the D/A converter 33 are then indicated as the distance informations by deflection of an indicator needle 34a of the meter 34 connected to an output terminal 33a of the D/A converter 33. It may, of course, be possible to digitally indicate these distance informations by the use of a digital indicating element in place of the analog indicating means as illustrated. In this case, the values latched by the latching circuit 33 are converted into digital codes for indication, in pursuance of which the abovementioned digital indicating element may be driven.

In the following, physical examples of the pulse generating circuit 16, the slice level setting circuit 22, the control circuit 25, and the coincidence detecting circuit 27 in the circuit construction shown in FIGS. 2A and 2B will be explained with particular details.

Figure 4:
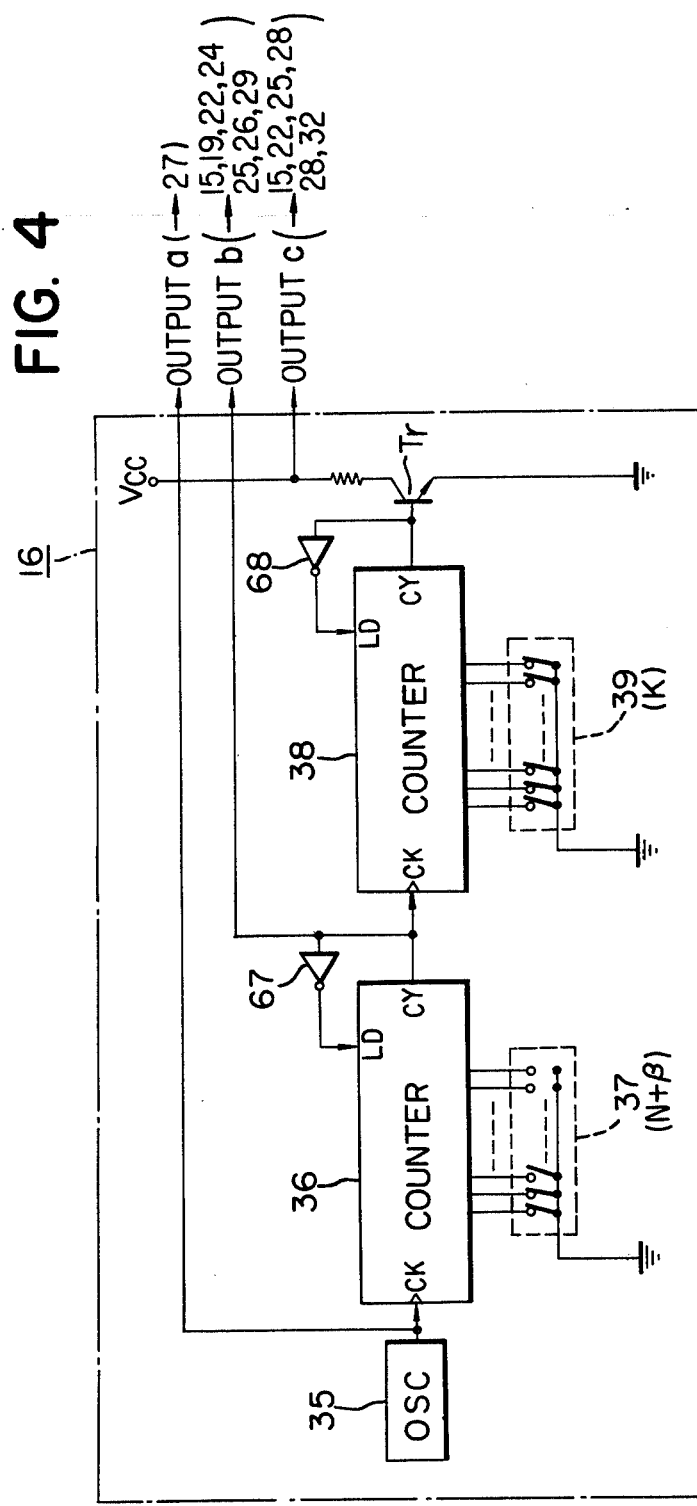
FIG. 4 is a circuit construction diagram showing one concrete example of a pulse generating circuit in the circuit construction shown in FIG. 2.

First, for the pulse generating circuit 16, a construction as shown in FIG. 4 may be adopted as an example. In the drawing, a numeral 35 refers to an oscillator which, in this embodiment, has been previously adjusted to generate the first reference clock pulse shown in FIG. 3A. A numeral 36 refers to a first counter to receive therein clock pulses from the oscillator 35 through its clock input terminal CK and counts the pulse number. The counter 36 is so constructed that it may produce an output signal from its carry output terminal CY when the counted values arrived at values set in a first switching circuit 37 for setting the counted values. A reference numeral 38 designates a second counter which receives thereinto a carry signal from the first counter 36 through its clock input terminal CK and counts the number. The counter 38 is so constructed that it may produce a carry output from its carry output terminal CY when the counted values arrive at values set in a second switching circuit 39 for setting the counted values. Also, a reference symbol Tr designates a transistor, to the collector side of which a voltage Vcc is applied, the emitter of which is connected to the earth, and the base of which is connected to the carry output terminal of the second counter 38.

According to such construction, the first reference clock pulses as shown in FIG. 3A are produced as the output a from the oscillator 35; pulses are generated in a signal line connected to the carry output terminal CY of the first counter 36 each time the first counter 36 counts the number of the first reference clock pulse (output a) from the oscillator 35 upto a value set in the first switch circuit 37; and, pulses are further generated in the signal line connected to the collector side of the transistor Tr due to its conduction in response to the carry output signals from the first counter at every time the second counter 38 counts the number of the carry signals upto a value set by the second switch circuit 39. Here, if a constant K is made to be established, in consideration of a constant $N+\beta$ by the combination of closing and opening of each switch in the first switch circuit 37, and the abovementioned number and the number M of the sensors in the sensor array 14 by the combination of closing and opening each switch in second switch 39, there can be obtained as the output b from the signal line connected to the carry output terminal CY of the first counter 36 the second reference clock pulse as shown in FIG. 3B as the output at every time the first counter 36 counts the $N+\beta$ numbers of the first reference clock pulse (output a) from the oscillator 35, and also there can be obtained as an output c from the signal line connected to the collector side of the abovementioned transistor Tr the third reference clock pulse shown in FIG. 3C at every time the second counter 38 counts the K numbers of the carry signal from the first counter 36. Incidentally, each of the carry signals of the counters 36 and 38 are fed back to each of the load terminals LD thereof through the respective inverters 67 and 68. This feed back operation is for causing these counters 36 and 38 to take thereinto the values set in the switch circuits 37 and 39, respectively, when the counters 36 and 38 have completed counting upto the values already set in the switch circuits 37 and 39.

Figure 5:
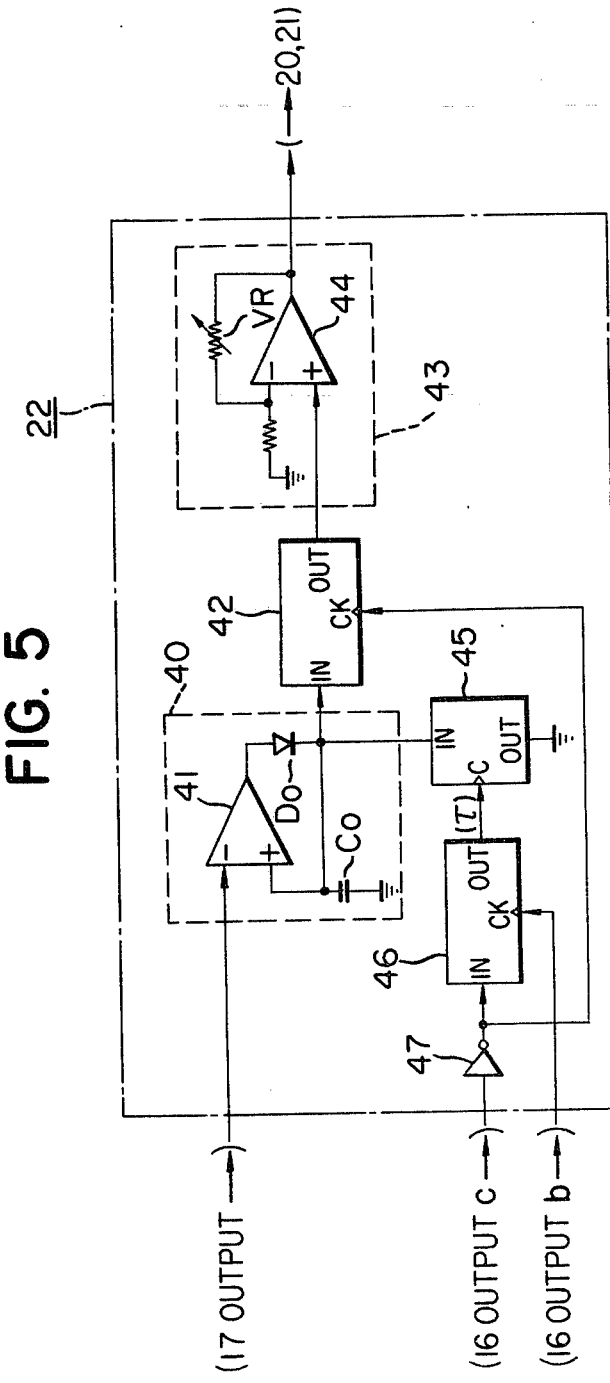
FIG. 5 is a circuit construction diagram showing one concrete example of a slice level setting circuit in the circuit construction shown in FIG. 2.

Next, for the slice level setting circuit 22, there may be adopted a construction such as, for example, one shown in FIG. 5. In the drawing, a reference numeral 40 designates a peak hold circuit which holds sequentially the output peak values from the abovementioned sample and hold circuit 17. This peak hold circuit 40 consists of a differential amplifier 41, a capacitor Co to hold the peak values, and a diode Do for prevention of back flow. A numeral 42 refers to a sample and hold circuit which is so connected that the peak values held in the capacitor Co in the abovementioned peak hold circuit 40 may be sampled and held in response to the third reference clock pulse from the abovementioned pulse generating circuit 16 by its application to the clock input terminal CK through an inverter 47. A reference numeral 43 designates an operational circuit for determining a slice level on the basis of an output from the sample and hold circuit 42. This operational circuit consists of an operational amplifier 44 and a variable register VR for setting a constant to determine the slice level, wherein an output from the operational amplifier 44 is imparted to the abovementioned comparators 20 and 21 as the slice level. A numeral 45 refers to an analog switch for clearing the peak values held in the peak hold circuit 40. This analog switch is so constructed that it is connected to the capacitor Co in the peak hold circuit 40 and becomes conductive by application of the third reference clock pulse (output c) from the abovementioned pulse generating circuit 16 to its control terminal c through the inverter 47 and a shift register 46 to clear the values held in the capacitor Co. The shift register 46 is provided for delaying a timing to render the analog switch 45 to be conductive for a predetermined time $\tau$ from generation of the third reference clock pulse (output c) in the pulse generating circuit 16. In this embodiment, this shift register 46 is so constructed that, after the third clock pulse (output c) is introduced, as an input thereinto from its input terminal IN through the inverter 47, it may be applied to the control terminal c of the analog switch 45 at the time when the second reference clock pulse (output b) as shown in FIG. 3B is applied to its clock input terminal CK for a number corresponding to the bit construction number, whereby the value held in the capacitor Co becomes cleared with the abovementioned time delay $\tau$ after the abovementioned sample and hold circuit 42 completes its sampling and holding operations of the values held in the capacitor Co in response to the third reference clock pulse (output c). The bit construction number of the shift register 46 in this case may be kept below the number $\alpha$ as already explained in connection with FIG. 2.

According to such construction, the peak values of the output from the sample and hold circuit 17 (i.e., the peak values of the output from the sensor array 12) are first held in the capacitor Co in the peak hold circuit 40 at the time of scanning of the object image by the sensor array 12, and, after termination of the scanning operations, when the reference clock pulse output (output c) as shown in FIG. 3C is generated from the pulse generating circuit 16 at the start of the subsequent scanning operation, the sample and hold circuit, in response to this subsequent scanning, takes thereinto the peak values held in the abovementioned capacitor Co, and applies the values to the operational circuit 42. In the operational circuit 43 which has received the output from the sample and hold circuit 42, the operational amplifier 44 determines the slice level on the basis of the output from the sample and hold circuit 42, i.e., the peak value of the output from the sample and hold circuit 17 during the previous scanning of the object image and a slice level determining constant set in the variable resistor VR, and then forwards the thus determined slice level, as the output, to the comparators 20 and 21 for two-value conversion, whereby both comparators 20 and 21 convert the outputs from the sample and hold circuit into two-value signals on the basis of the slice level determined by the operational circuit.

As stated in the foregoing, the capacitor Co in the abovementioned peak hold circuit 40 is cleared of the hold values in the previous scanning by the analog switch 45 to become conductive in response to the output from the shift register 46 after lapse of the abovementioned delay time $\tau$ since the sample and hold circuit 42 has occurrence and held the values held in the capacitor Co. Thereafter, the capacitor Co starts to hold the peak values of the output from the sample and hold circuit 17 at the subsequent scanning operations of the object image by the sensor array 12.

Thus, in the construction of the slice level setting circuit 22 shown in FIG. 5, the slice level at the time of the current scanning operations of the object image is automatically established based on the peak values of the output from the sensor array obtained at the time of the previous scanning operations of the object image.

For the slice level determining constant to be set in the variable resistor VR in the abovementioned operational circuit 43, experiments have revealed that a constant of from 0.6 to 0.8 or so, i.e., a number to render the output level from the operational amplifier 44 to be 60% to 80% of the peak level of the output from the sensor array 12 is preferable.

Figure 6:
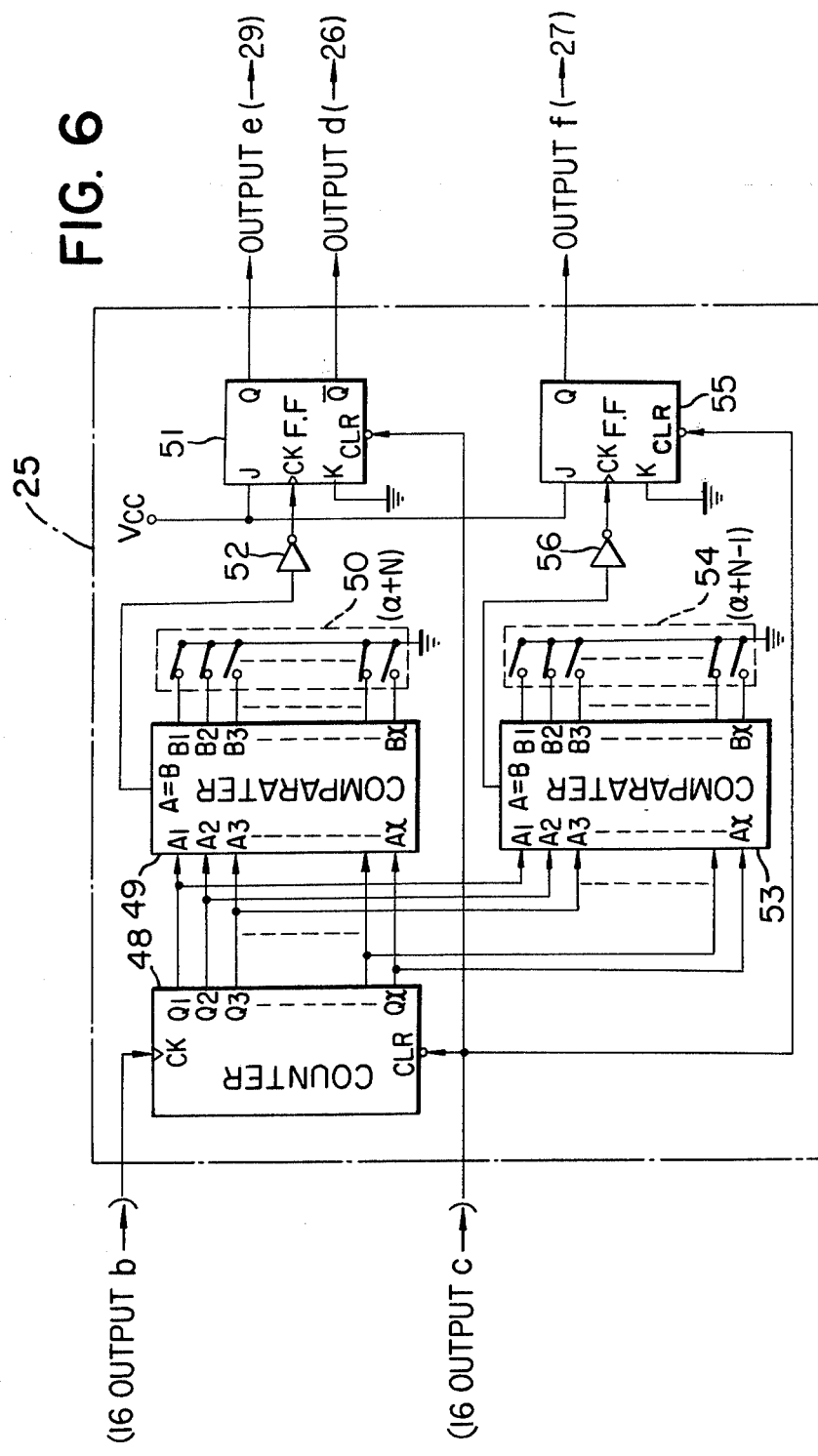
FIG. 6 is a circuit construction diagram showing one concrete example of a control circuit in the circuit construction shown in FIG. 2.

Thirdly, for the control circuit 25, a construction as shown in FIG. 6 may be employed. In the drawing, a reference numeral 48 designates a counter which introduces the second reference clock pulse (output b) as shown in FIG. 3B from the pulse generating circuit 16 as the input thereto through its clock input terminal CK to count the pulse number, and which is cleared of its contents by the third reference clock pulse (output c) as shown in FIG. 3C. A numeral 49 refers to a first comparator which compares the counted value of the counter 48 with a value set by a first constant setting switch circuit 50, and produces a coincided signal output when the counted value of the counter 48 becomes coincided with the value set by the first switch circuit 50. A numeral 51 refers to a first J-K type flip-flop which introduces into its clock input terminal CK the coincided signal from the first comparator 49 through an inverter 52. A reference numeral 53 designates a second comparator which compares the counted value of the counter 48 with a value established by a second constant setting switch circuit 54, and produces a coincided signal output when the counted value of the counter 48 becomes coincided with the value set by the second switch circuit 54. A reference numeral 55 denotes a second J-K type flip-flop which introduces the coincided signal from the second comparator 53 as an input into its clock input terminal CK through an inverter 56. Each of the abovementioned first and second flip-flops 51 and 55 is of such a construction that a voltage Vcc is applied to its input terminal J, its input terminal K is connected to the earth, and its clear terminal CLR may receive the third reference clock pulse (output c) from the pulse generating circuit 16 as is the case with the abovementioned counter 48.

In this construction, outputs Q and $\bar{Q}$ of the first flip-flop 51 are first considered. In the state wherein the first flip-flop 51 is cleared by the third reference clock pulse (output c) from the pulse generating circuit 16, the output $\bar{Q}$ is at a "high" level, while the output Q is at a "low" level. When the counter 48 starts its counting operation from the first pulse of the second reference clock pulse (output b) after it is cleared by the third reference clock pulse (output c), and its counted value has reached the value set by the first switch circuit 50, a coincided signal output is produced from the first comparator 49, whereby the first flip-flop 51 which receives this coincided signal through the inverter 52 is inverted with the result that the output $\bar{Q}$ changes from the "high" level to the "low" level, and the output Q changes from the "low" level to the "high" level. Subsequently, when cleared again by the abovementioned third reference clock pulse (output c), the output $\bar{Q}$ reinstates its level from "low" to "high", and the output Q from "high" to "low". Consequently, when the constant $\alpha+N$ is set by the combination of the closing and opening operations of switches in the first switch circuit 50, the first flip-flop 51 will become inverted at the time of the counted value of the counter 48 having become $\alpha+N$. On account of this, the outputs Q and $\bar{Q}$ take the "high" level and the "low" level, respectively, during the period of from generation of the third reference clock pulse (output c) from the pulse generating circuit 16 to generation of the $\alpha+N$th pulse of the second reference clock pulse (output b). Thereafter, the outputs $\bar{Q}$ and Q, respectively, take the "low" level and the "high" level until the third reference clock pulse (output c) will again be generated in the subsequent stage. As the result, the output $\bar{Q}$ of the first flip-flop 51 can be utilized as the output d shown in FIG. 3L for controlling the "AND" gate 26, and the output Q can be utilized as the output e shown in FIG. 3M for controlling the "AND" gate 29.

Considering now the output Q from the second flip-flop 55, it shows the same change as the output Q of the first flip-flop 51, as is apparent from the foregoing explanations. Accordingly, when the constant $\alpha+N-1$ is set by the combination of closing and opening operations of switches in the second switch circuit 54, the second flip-flop 55 is inverted when the counted value of the counter 48 has become $\alpha+N-1$. On account of this, the output Q thereof is at the low level during the period from generation of the third reference clock pulse (output c) from the pulse generating circuit 16 to generation of the $\alpha+N-1$st pulse of the second reference clock pulse (output b). Thereafter, it takes a high level until the third reference clock pulse (output c) is again generated subsequently. As the result, the output Q of this flip-flop 55 can be utilized as the output f shown in FIG. 3N for controlling the coincidence detecting circuit 27.

Figure 7:
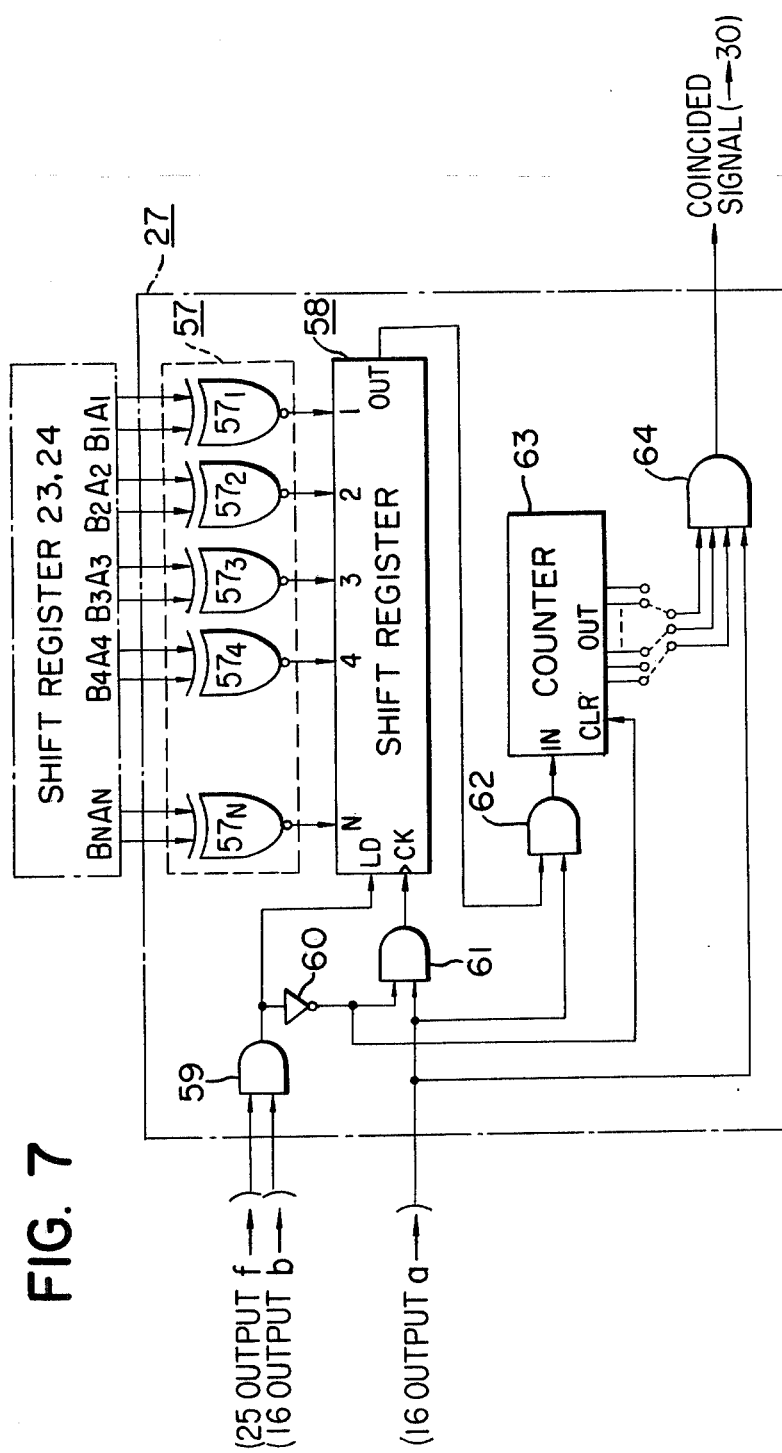
FIG. 7 is a circuit diagram of one concrete example of the coincidence detecting circuit in the circuit construction shown in FIG. 2.
Figure 9:
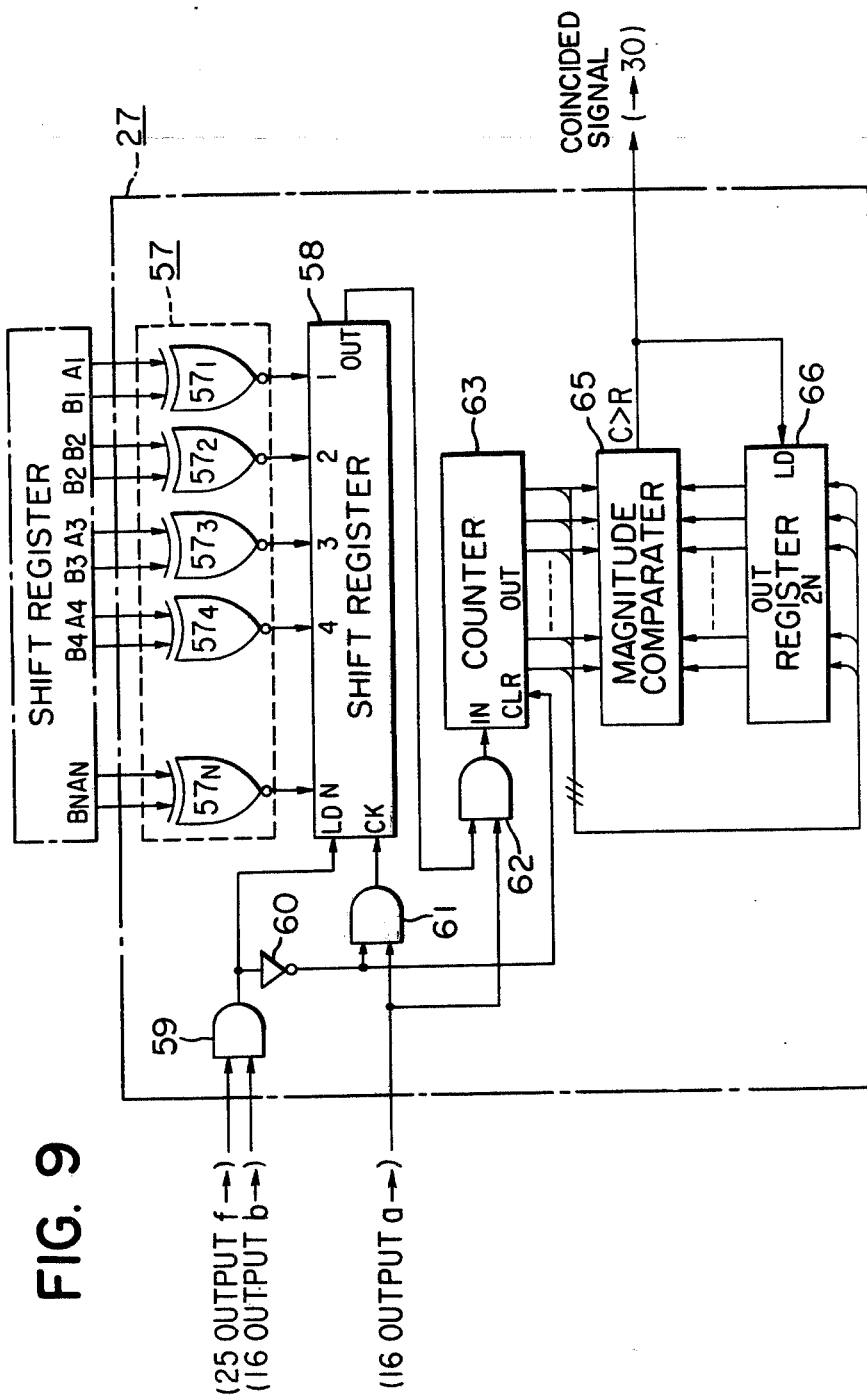
FIG. 9 is a circuit diagram showing another concrete example of the coincidence detecting circuit in the circuit construction shown in FIG. 2.

Lastly, for the coincidence detecting circuit 27, there may be adopted a construction as shown, for example, in FIG. 7 or FIG. 9.

Here, a particular notation is given. In the coincidence detection of the recorded values between both shift registers 23 and 24, it is an ideal that the recorded values in both shift registers 23 and 24 are regarded as being coincided only when the outputs from each of the mutually corresponding bits become entirely coincided between these shift registers 23 and 24. However, it occurs from time to time that when the outputs from each of the respective sensors $12_1$ to $12_M$ and $14_1$ to $14_M$ in the sensor arrays 12 and 14 are converted into two-value signals by comparing them with the slice level set in the slice level setting circuit 22 through the comparators 20 and 21, those output signals which are very close to the slice level are determined in some cases as being at the "high" level, and in other cases as being at the "low" level. Accordingly, since probability of the perfect coincidence between the recorded values in the shift registers 23 and 24 becomes extremely low in practice, it may be practical to adopt a method in which satisfactory coincidence is regarded as having been attained, if the recorded values in the corresponding bits become coincided at a predetermined ratio.

Explaining first the embodiment shown in FIG. 7, the construction of the coincidence detecting circuit 27 is such that the recorded values in both shift registers 23 and 24 are regarded as having been coincided at an instant when two-value image element signals recorded in the mutually corresponding bits $A_1-B_1$, $A_2-B_2$, . . . ,$A_N-B_N$ in the shift registers 23 and 24 are coincided at and above a predetermined ratio.

In the drawing, a reference numeral 57 designates a group of gates consisting of exclusive "NOR" gates $57_1$ to $57_N$ (i.e., in numbers corresponding to the bit numbers in the shift registers 23 and 24, or N numbers). In this construction, the outputs from the mutually corresponding bits $A_1-B_1$, . . . ,$A_N-B_N$ in the shift registers 23 and 24 are introduced as the inputs into their respectively corresponding exclusive "NOR" gates $57_1$ to $57_N$, and the gates produce "high" level output signals when the recorded values in mutually corresponding bits $A_1-B_1$, . . . ,$A_N-B_N$ are equal, and "low" level output signals when they are different.

A numeral 58 refers to a shift register of N-bit construction which receives and records the outputs from each of the exclusive "NOR" gates $57_1$ to $57_N$ in the group of gates 57 into each of the bits 1 to N corresponding thereto at every time the second reference clock pulse (output b shown in FIG. 3B and FIG. 8B) from the pulse generating circuit 16 is applied to its load terminal LD through an "AND" gate 59. The "AND" gate 59 has been applied with the output f from the control circuit 25, as shown in FIG. 3N and FIG. 8C, and the shift register 58 is, accordingly, applied with pulses after the $\alpha+N$th pulse of the abovementioned second reference clock pulse (output b) as shown in FIG. 8E, whereby taking of the outputs from the group of gates 57 is commenced from the time instant when the two-value image element signals from the initial N numbers of the sensors $14_1$ to $14_N$ in the sensor array 14 are recorded in the shift register 24, and thereafter this taking of the outputs from the group of gates 57 is repeated at every shifting of the shift register 24.

A reference numeral 61 designates an "AND" gate which imparts the first referece clock pulse (output as shown in FIG. 3A and FIG. 8A) from the pulse generating circuit 16 to the clock input terminal CK of the shift register 58. Further, outputs (FIG. 8D) from the "AND" gate 59 are imparted to this "AND" gate 61 with the phase being inverted by an inverter 60 as shown in FIG. 8E. Accordingly, as as shown in FIG. 8F, the first reference clock pulse (output a) is applied to the shift register 58, only when the output from the "AND" gate 59 is at the low level, i.e., with a timing switch does not carry out shifting in the shift register 24, whereby the recorded values of each bit in the shift register are produced sequentially and in series as the outputs.

A reference numeral 62 denotes an "AND" gate which takes an "AND" between the output of the shift register 58 and the first reference clock pulse (output a) to produce only the "high" level signal outputs among those outputs from the shift register 58. A reference numeral 63 designates a counter which counts the number of the "high" level signal outputs from the "AND" gate 62. This counter is so controlled that it is cleared by the signals (FIG. 8E) from the inverter 60 at every time the second reference clock pulse (output b) trails (i.e., the output of the inverter 60 rises), and that it counts the output numbers from the "AND" gate 62 only when the second reference clock pulse (output b) is at the low level (i.e., when the output from the inverter 60 is at the high level). Accordingly, the counted values of the counter 63 denote the coincided numbers of the recorded values in the mutually corresponding bits $A_1$-$B_1$, . . . ,$A_N$-$B_N$ of the shift registers 23 and 24.

According to the abovementioned construction, the instant, when the counted values of the counter 63 have become N, corresponds to the time when the recorded values in both shift register 23 and 24 are in the perfect coincidence. However, the determination of the coincidence of the recorded values in both shift registers 23 and 24 with the time when the counted values of the counter 46 have become N is not realistic from the circumstances as described in the foregoing. In this embodiment, therefore, there is adopted such a circuit construction that outputs of arbitrary bits (the bits of higher places should preferably be included) of the counter 63 may be imparted to the "AND" gate 64 together with the first reference clock pulse (output a), and that a high level signal output (FIG. 8G) may be produced from the "AND" gate 64 when the preselected bit outputs in the counter 63 are all at the "high" level.

According to such construction, when the counted of the counter 63 have become values higher than the values previously established, in other words, when the recorded values in the mutually corresponding bits $A_1$-$B_1$, . . . ,$A_N$-$B_N$ in the shift registers 23 and 24 have become coincided at and above a predetermined ratio, "high" level signal outputs are produced from the "AND" gate 64, and these "high" level signals can be utilized as the coincided signals as already mentioned in the foregoing.

In the construction of the coincidence detecting circuit 27 shown in FIG. 7, the coincided signals (FIG. 3Q) are obtained in the form of $N+\beta-1$ pulses corresponding to the first to the $N+\beta-1$st in the first reference clock pulse (output a), as shown in FIG. 8G. However, as will be understandable from FIGS. 8A to 8G and the foregoing explanations, these $N+\beta-1$ numbers of the coincided pulses are all generated within a pulse-to-pulse time duration of the second reference clock pulse (output b), so that there is no inconvenience at all, even if they are applied as the load signals to the register 30 in their form as generated. Also, when the construction as shown in FIG. 7 is used as the coincidence detecting circuit 27, the latching circuit as shown in FIG. 2 may be dispensed with.

The embodiment shown in FIG. 9 is a modification of that shown in FIG. 7, which is so constructed that the recorded values in both shift registers 23 and 24 are regarded as having been coincided at an instant when the counted values of the counter 63 have become maximum, in other words, when the numbers of coincidence of the recorded values in the mutually corresponding bits $A_1$-$B_1$, . . . ,$A_N$-$B_N$ of the shift registers 23 and 24 have become maximum. In the drawing, those elements and signals designated by the same symbols as in FIG. 7 are identical with those in FIG. 7.

In the drawing, a reference numeral 65 designates a magnitude comparator which discriminates largeness and smallness of the recorded values in a register 66 and the counted values in the counter 63. The comparator is so constructed that it may produce "high" level signal outputs when the counted values C of the counter 63 is greater than the recorded values R of the register 66 (C>R), and that, while the "high" level signals from the comparator 65 are applied to the load terminal LD of the register 66 as the load signals, they may also be applied to the load terminal LD of the register 30 in FIG. 2. Accordingly, these registers 66 and 30 become able to take thereinto the counted values of the counters 63 and 28 at that instant in response to the high level signal outputs from the comparator 65 when such are produced.

According to such construction, so far as the high level signal outputs are continuously produced from the comparator 65, the registers 66 and 30 take thereinto the counted values of the counters 63 and 28 at every time and in response to such output signals produced. On account of this, at the termination of one scanning operation of the object image, the values recorded in these registers 66 and 30 will be the maximum counted values of the counter 63 and the counted values of the counter 28 at the instant when the counted values of the counter 63 have become maximum, respectively. As a consequence as explained in connection with FIG. 2, if the recorded values of the register 30 are latched by the latching circuit 31 at the start of the subsequent scanning, the output from the latching circuit 31 at this time represents the shift numbers of the shift register 24 which have been spent until the recorded values in the shift registers 23 and 24 become optimumly coincided, i.e., the so-called object distance.

As is apparent from the foregoing explanations, no coincided signals as shown in FIG. 3Q can be obtained with the construction of the coincidence detecting circuit 27 shown in FIG. 9, but the counted values of the counter 28 at the instant when the recorded values in both shift registers 23 and 24 have become optimumly matched may be accurately recorded in the register 30.

In the following, another embodiment of the range detecting method and apparatus according to the present invention will be explained in reference to FIGS. 10 and 11. This embodiment is different from the embodiment shown in FIG. 2 in that a single unit of photo-sensor array is utilized in place of a pair of photo-sensor arrays 12 and 14. Accordingly, the figures of drawing show only the construction of those main parts which are particularly different from that of the aforedescribed embodiment, and in which the similar component elements to those in the previous embodiment are designated by the same reference symbols, and the explanations will be directed to those parts alone which differ from the previous embodiment.

In FIG. 10, reference numerals 11 and 13 designate a pair of focussing lenses fixedly disposed at a definite space interval which a base line length d, same as described in the foregoing.

In this embodiment, the optical layout of the component elements is such that a single unit of photo-sensor array 69 consisting of L numbers of photo-sensors $69_1$ to $69_L$ (where: L is a number sufficiently larger than 2N such as, for example, L=N+M in view of the embodiment in FIG. 2) may be disposed in confrontation to these lenses 11 and 13 so as, on one hand, to constantly focus an image $I_1$ of an object for the range detection formed by the lens 11 at a substantially definite position on a first sensor region 69a containing the initial N numbers of sensors $69_1$ to $69_N$ of the sensor array 69 by way of an obliquely fixed mirror 70 and a reflecting surface 72a of a reflecting prism 72 (hence the combination of the lens 11 and the first sensor region 69a may be applied for collimation to the object for the range detection, same as described in the foregoing), and, on the other hand, to focus an image $I_2$ of the object formed by the lens 13 at a position corresponding to a distance to the object on a second sensor region 69b containing (L-N) numbers of the sensors $69_{N+1}$ to $69_L$ by way of an obliquely fixed mirror 71 and another reflecting surface 72b of reflecting prism 72.

According to such construction, if it is assumed that the object is at an infinite distance, the image thereof to be formed by the lens 13 is focussed at a position designated by a reference symbol $I'_2$ (within a range of the sensors $69_{N+1}$ to $69_{2N}$) in the drawing along a route shown by a dash line. Contrary to this, when the object is at a finite distance, the object image is focussed at a position designated by a reference symbol $I_2$ along a route shown by a solid line in the drawing.

Accordingly, when a relative discrepant quantity of the focussing position of the image $I_2$ to the focussing position $I'_2$ of the image of the object at the infinite distance is found out, same as described above, the distance to the object can be detected. In order to find out this discrepant quantity X, the embodiment of the present invention shown in FIG. 10 operates in such a manner that two-value image element signal trains from the N numbers of the sensors $69_1$ to $69_N$ in the first sensor region 69a are first introduced as the input into first recording means at the time when the image element signals are time sequentially taken out of each of the sensors $69_1$ to $69_L$ in the sensor array 69, then two-value image element signal trains from the sensors of the same numbers in the second sensor region 69b as the output are introduced into the second recording means as the input to cause the two-value image element signal trains in this second recording means to sequentially shift, and the shifted quantities during a period of from the start of the shifting operation to a state wherein the recorded values in both recording means can be regarded as having been substantially coincided each other are counted, the counted values of which are made the abovementioned discrepant quantities X, i.e., the distance informations of the object for the range detection.

The physical circuit construction of the embodiment shown in FIG. 10 will now be explained in more detail in reference to FIG. 11.

In the drawing, a reference numeral 22' designates a slice level setting circuit corresponding to the slice level setting circuit 22 in FIG. 2. In this circuit construction, the slice level setting circuit 22' is so designed that it may set the slice level based on the peak value of the outputs from the first sensor region 69a of the sensor array 69 in correspondence to the slice level setting circuit 22 in FIG. 2, the details of which will be described later. Similarly, a numeral 25' refers to a control circuit which corresponds to the control circuit 25 in FIG. 2. This control circuit 25' is so constructed that, in conformity with changes in the sensor array, it may first impart to the "AND" gate 29 a signal, as an output e', which maintain a low level during a period of from generation of the third reference clock pulse output (output c) shown in FIG. 3C from the pulse generating circuit 16 upto termination of the $\alpha+2N$th pulse output of the second reference clock pulse (output b) shown in FIG. 3B, and, thereafter, maintains a high level upto a time when the third reference clock pulse output (output c) is again produced, that is, a signal which causes the counter 28 to count pulses after the $\alpha+2N+1$st pulse of the second reference clock pulse (output b); and, on the other hand, impart to the coincidence detecting circuit 97 a signal, as an output f', which maintains a low level during a period of from generation of the third reference clock pulse output (output c) upto termination of the $\alpha+2N-1$st pulse output of the second reference clock pulse (output b), and, thereafter, maintain a high level upto a time when the third reference clock pulse output (output c) is again produced, that is, a signal to start the coincidence detection at the instant when the two-value image element signals from the initial N numbers of the sensors $69_{N+1}$ to $69_{2N}$ in the second sensor region 69b of the sensor array 69 are recorded in the shift register 24 (the details of this operation will be described later).

Incidentally, an "AND" gate 73 same as the "AND" gate 26 provided in the shift register 23 is also provided in the shift register 24 so that the control signal (output d) shown in FIG. 3L to be imparted to the "AND" gate 26 from the control circuit 25' may also be imparted to the "AND" gate 73 through an inverter 74. According to this construction, of the second reference clock pulse outputs (output b) from the pulse generating circuit 16, the first to the $\alpha+N$th pulses alone are fed to the shift register 23, while the $\alpha+N+1$st to the Kth pulses alone are fed to the shift register 24. On account of this, even if the data lines to the two-value comparator 20 in both shift registers 23 and 24 are common, the two-value image element signal trains from the N numbers of the sensors $69_1$ to $69_N$ in the first sensor region 69a are introduced as input into the shift register 23 alone, while the two-value image element signal trains from the N numbers of the sensors in the second sensor region 69b are introduced as input into the shift register 24 alone. Moreover, in the shift register 24, there is carried out the sequential shifting of the two-value image element signal trains by the clock pulses after the $\alpha+2N+1$st. Accordingly, the circuit construction shown in FIG. 11 performs the same distance detecting operations as in the circuit construction shown in FIG. 2.

Figure 12:
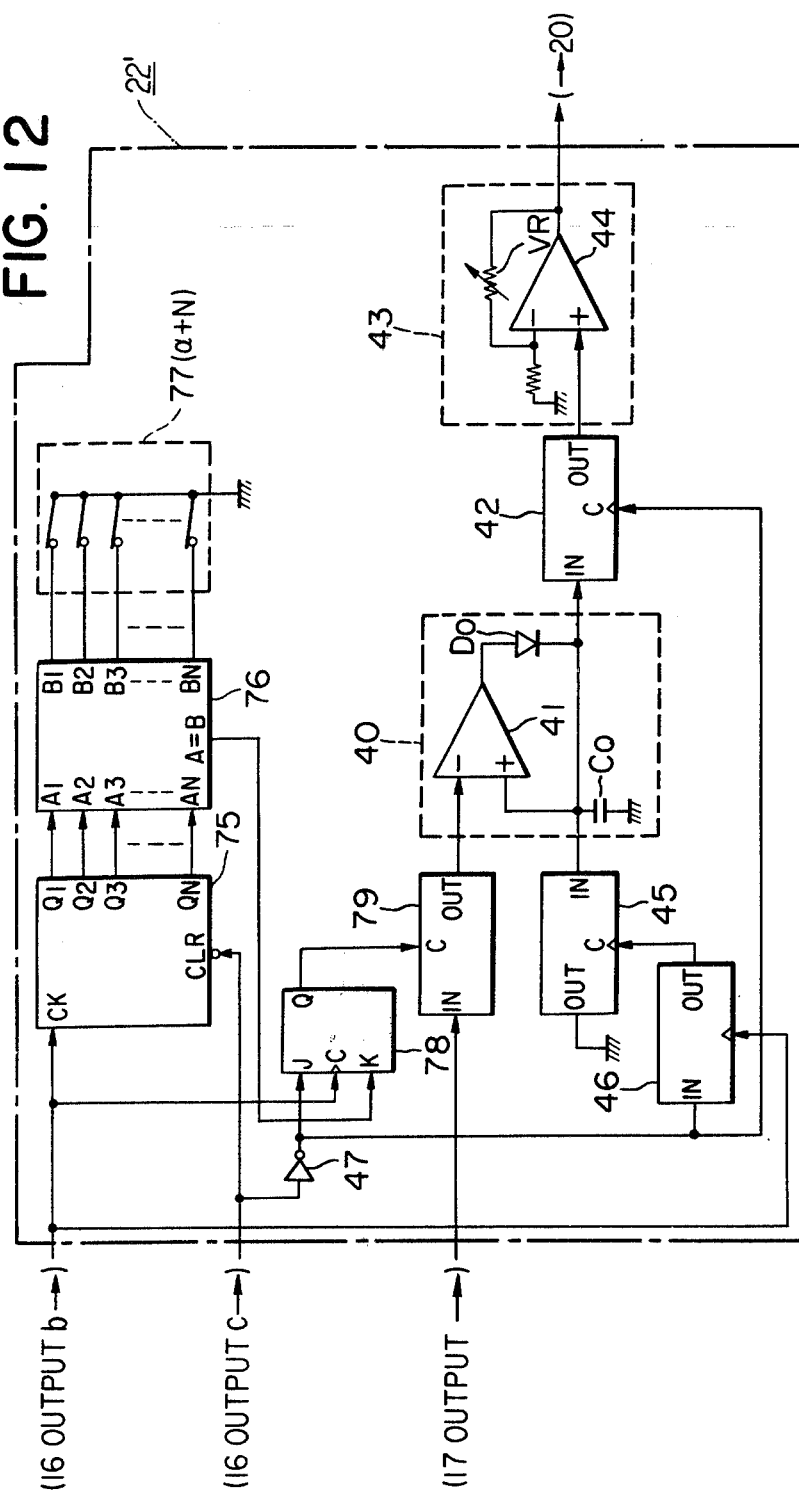
FIG. 12 is a circuit construction diagram showing one concrete example of the slice level setting circuit shown in FIG. 11.

The slice level setting circuit 22' has a circuit construction as shown, for example, in FIG. 12. The illustrated construction, besides the construction shown in FIG. 5, is further added with a construction which restricts feeding of the sensor output to the peak hold circuit 40 to an output from the first sensor region 69a in the sensor array 69 alone.

In the drawing, a reference numeral 75 designates a counter which counts the second reference clock pulse (output b) from the pulse generating circuit 16; 76 refers to a comparator which compares the counted values in the counter 75 with a constant set in a constant setting switch circuit 77, and produces an output coincidence signal when the counted values have become coincident with the constant set in the switch circuit 77; 78 refers to a J-K type flip-flop which is so connected in the circuit construction that it may be set by receiving in its input terminal J the third reference clock pulse (output c) from the pulse generating circuit 16 through the inverter 47, and, in that state, receive the second reference clock pulse (output b) in its clock terminal, and produce from its output terminal Q the input J as an output in synchronism with the second reference clock pulse, and that it may be reset by receiving a coincided signal from the comparator 76 in its input terminal K; and 79 designates an analog switch which is so circuit-connected that it may receive the output Q from the flip-flop 78 in its control terminal, and, when the output Q assumes the "high" level, becomes conductive in response thereto to enable the output from the sample and hold circuit 17 to be imparted to the peak hold circuit 40.

According to such circuit construction, the flip-flop 78 is in a set condition during a period of from generation of the third reference clock pulse (output c) upto coincidence of the counted values in the counter 75 with the constant already set in the switch circuit 77; during this set condition, the flip-flop produces as an output its input J (which is a high level signal) from its output Q terminal with a timing corresponding to the second reference clock pulse (output b), whereby the analog switch 79 is rendered on-and-off with this output Q with a timing corresponding to the second reference clock pulse. On account of this, while the flip-flop 78 is in set condition an output from the sample and hold circuit 17 is applied to the peak hold circuit 40 with a timing corresponding to the sampling operation at this sample and hold circuit 17, whereby the slice level is determined by the operational circuit 44 on the basis of the hold value in the peak hold circuit 40, i.e., the peak value of the output from the sample and hold circuit 17 through the process mentioned in connection with FIG. 5.

Accordingly, whenever the constant $\alpha+N$ is set by the switch circuit 77, the flip-flop 78 is kept at its set condition during a period of from generation of the third reference clock pulse (output c) up to the termination of the take-out operation of the entire outputs from the first sensor region 69a in the sensor array 69, on account of which the peak hold circuit 40 is applied with only the outputs from the first sensor region 69a of the sensor 69 to hold therein the peak values. As the result, the slice level is set on the basis of the peak values in the outputs from the first sensor region 69a of the sensor array 69.

Figure 13:
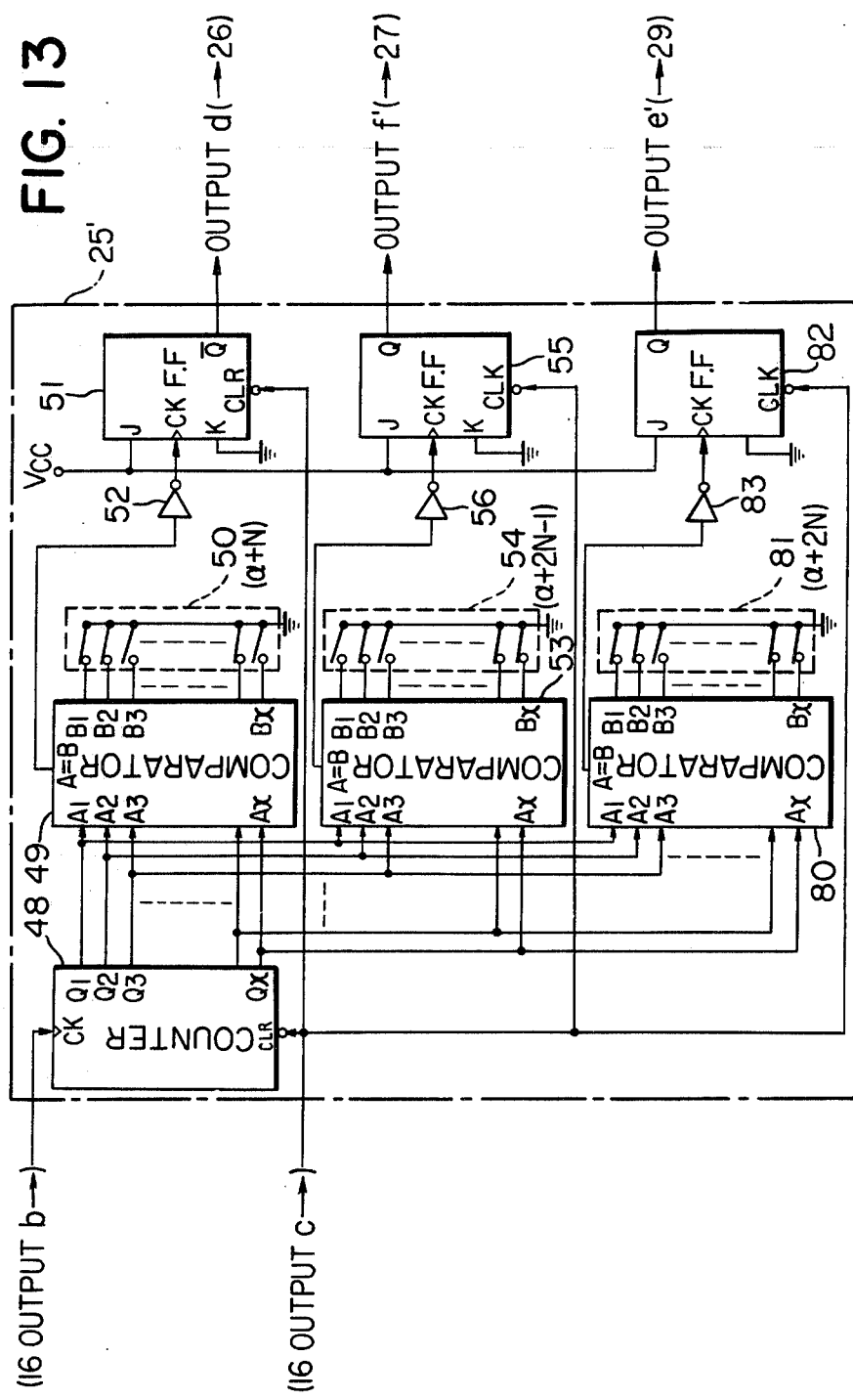
FIG. 13 is a circuit construction diagram showing another concrete example of the control circuit applicable to the circuit shown in FIG. 11.

The abovementioned control circuit 25' has a construction as shown in FIG. 13, for example. The illustrated circuit construction, besides the construction shown in FIG. 6, is further added with a third constant setting switch circuit 81 which alters the constant set by the second switch circuit 54 from $\alpha+N-1$ to $\alpha+2N-1$, and further has another constant $\alpha+2N$ set therein, a third comparator 80 which compares the counted values of the counter 48 with the value set in this third switch circuit 81 to produce a coincided signal output when the counted value has become coincided with the set value, and a third J-K type flip-flop 82 of the same construction and same circuit-connection as those of the first and second flip-flops 51 and 55, which receives the coincided signal from the third comparator 80 in its clock input terminal CK through an inverter 83.

According to such construction, there can be obtained from the output terminal Q of the second flip-flop 55 signal which maintains the low level during a period of from generation of the third reference clock pulse (output c) from the pulse generating circuit 16 upto the termination of generation of the $\alpha+2N-1$st pulse in the second reference clock pulse (output b), and, thereafter, maintains the high level until the third reference clock pulse (output c) will again be generated, i.e., an output f' to be applied to the abovementioned coincidence detecting circuit 27; also, there can be obtained from the output terminal Q of the third flip-flop 82 a signal which maintains the low level during a period of from generation of the third reference clock pulse (output c) upto termination of generation of the $\alpha+2N$th pulse in the second reference clock pulse (output b), and, thereafter, maintains the high level until the third reference clock pulse (output c) will again be generated, i.e., an output e' to be applied to the abovementioned "AND" gate 29. Incidentally, there is no change at all with respect to the output d from that shown in FIG. 6.

In the above-described embodiment, the serial-in-parallel-out type shift register has been used as the means for recording the two-value image element signal trains from each sensor array or each sensor region. In the following, explanations will be given in reference to FIG. 14 as to a case wherein a serial-in-serial-out recirculation type shift register is used as the recording means.

Figure 11:
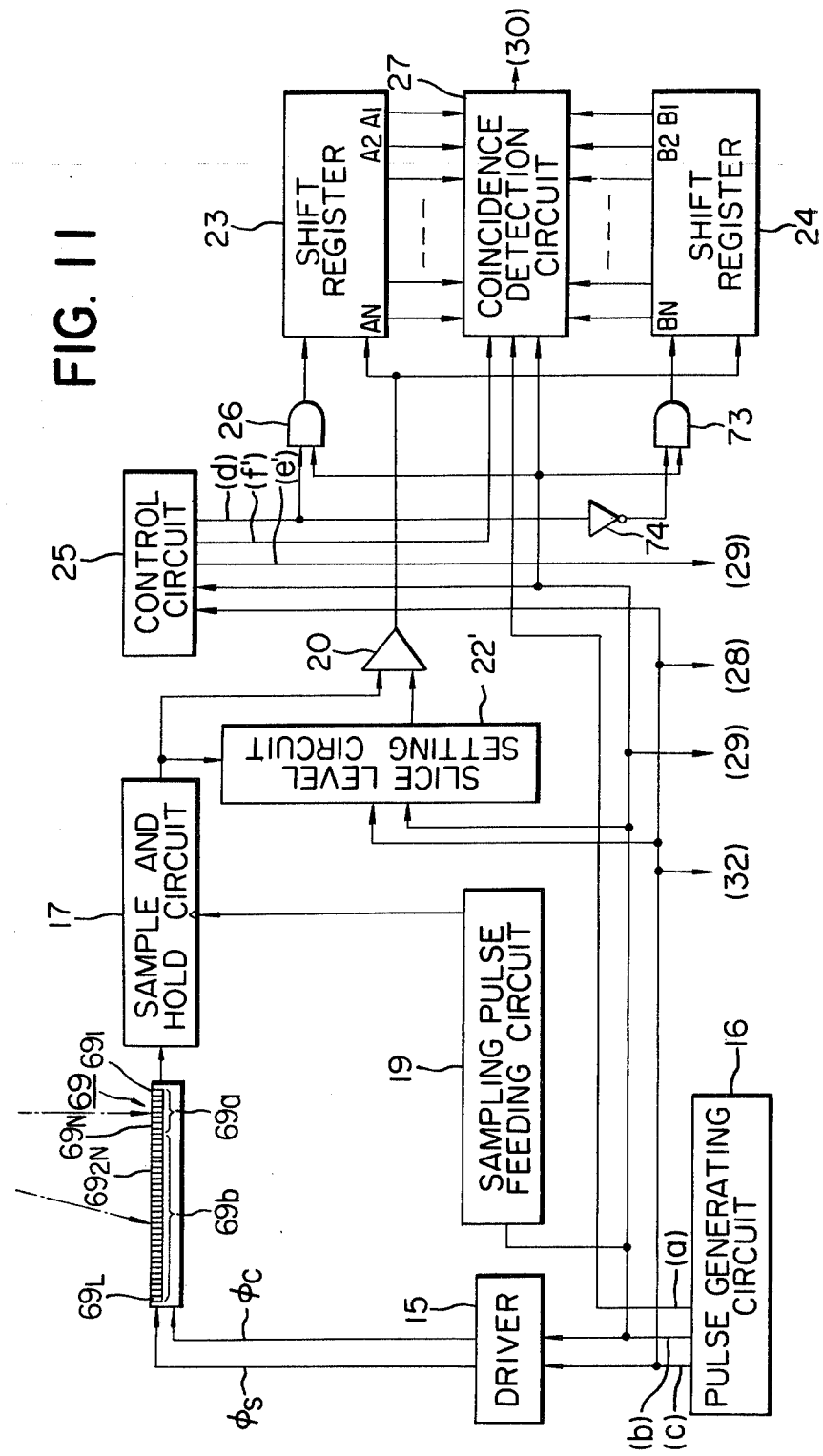
FIG. 11 is a block diagram of an electrical circuit used in the construction of FIG. 10 showing, in particular, the construction of the principal part different from the circuit construction shown in FIG. 2.
Figure 14:
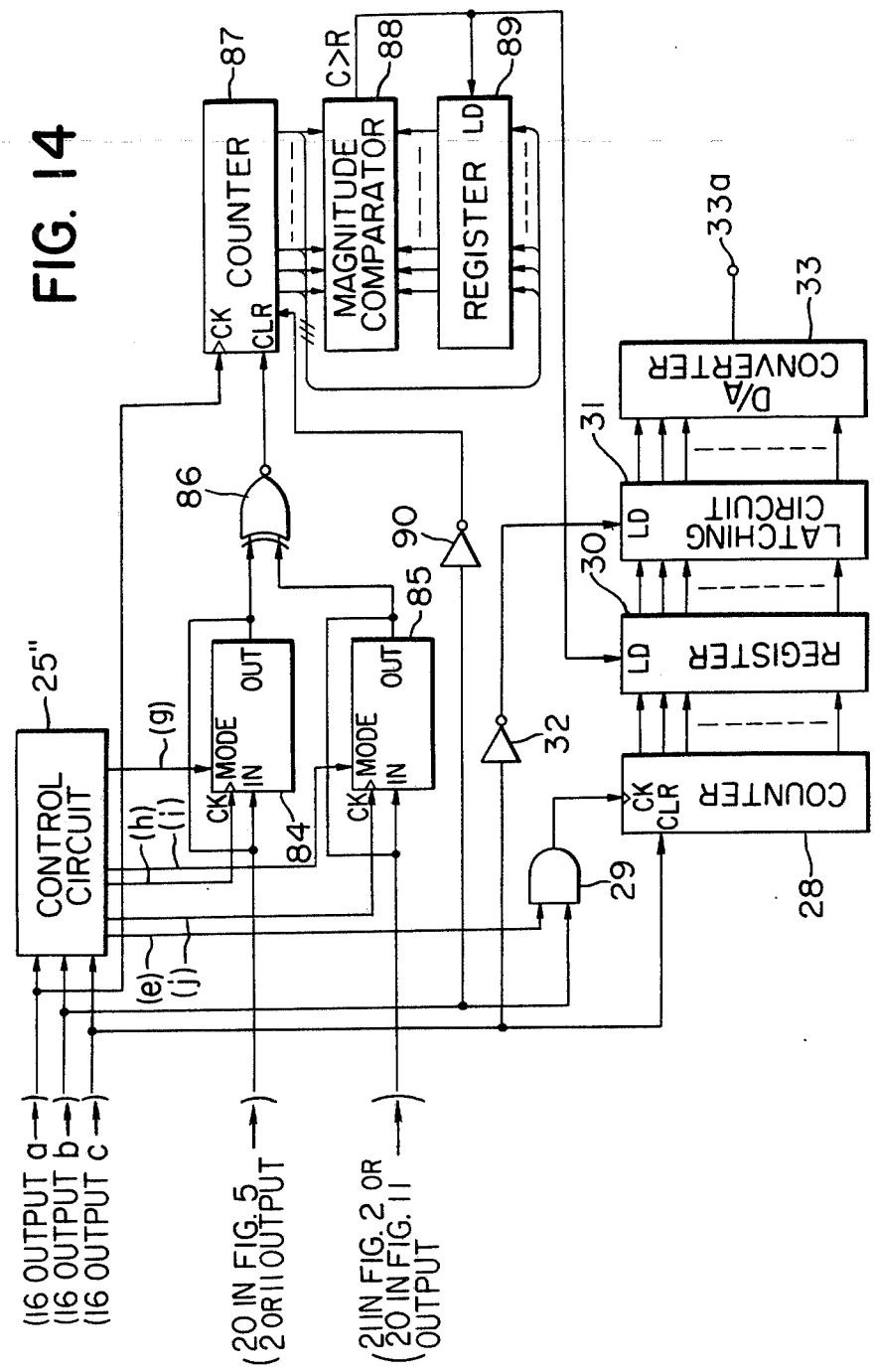
FIG. 14 is a block diagram of still another embodiment of the present invention showing, in particular, a construction of the main part different from that shown in FIG. 2 or 11.

The circuit construction shown in FIG. 14 may be applied either to the embodiment shown in FIGS. 1 and 2 or to the embodiment shown in FIGS. 10 and 11. First of all the case wherein this type of shift register is applied to the embodiment shown in FIGS. 1 and 2 will be explained.

In the drawing which shows only the principal portions which differ from the construction in FIG. 2, reference numerals 84 and 85 designate serial-in-serial-out recirculation type shift register of an N-bit construction to record therein the two-value image element signal trains from the respective comparators 20 and 21, each output line of which is fed back to each input line.

A reference numeral 86 designates an exclusive "NOR" gate which produces a high level output signal when the recorded values between the mutually corresponding bits in both shift registers 84 and 85 are coincident, and produces a low level output signal when they are different.

A reference numeral 87 designates a counter which counts the numbers of the high level signal from the exclusive "NOR" gate 86, which is so constructed that it may be cleared of its counted values by application of the second reference clock pulse (output b), as shown in FIGS. 3B and 16B from the pulse generating circuit 16 through an inverter 90.

A numeral 88 refers to a magnitude comparator which determines largeness or smallness of the counted values C of the counter 87 and the recorded values R of a register 89 to record the counted values of the counter 87. This comparator produces a high level output signal when the counted values C is larger than the recorded values R (C>R).

The abovementioned register 89 is so constructed that it may record therein the counted values before the counter 87 is cleared of its contents by the high level output signal from the magnitude comparator 88, i.e., the counted values with respect to the recorded contents of the shift register 85, which are relatively discrepant for one bit, at the time of relative shifting for every bit in the sensors in the abovementioned sensor array 14 after the $14_{N+1}$th bit.

A reference numeral 25" designates a control circuit corresponding to the control circuit 25 shown in FIG. 2, which is so constructed that it may receive thereinto the first, second and third reference clock pulses (outputs a, b, and c) shown in FIGS. 3A, 3B and 3C and FIGS. 16A, 16B and 16C from the pulse generating circuit 16 as the inputs, based on which the mode change and drive control of the shift registers 84 and 85 as well as the feed control of the second reference clock pulse (output b) to the counter 28 may be controlled.

Although the details of this circuit construction will be explained later, it is constructed generally as follows. That is, is the shift register 84 there are applied a mode control signal (output g) shown in FIG. 16F for setting the shift register 84 in a "WRITE MODE" (a mode for recording the outputs from the two-value comparator 20) during a period of from generation of the third reference clock pulse (output c) from the pulse generating circuit 16 upto generation of the $\alpha$+Nth pulse of the second reference clock pulse (output b), and for setting the same in a "RECIRCULATION MODE" (a mode for recirculating the recorded contents through the feed back line) during the other period than the abovementioned; and driving pulses (output h) shown in FIG. 16J which cause the shift register 84 to take therein the outputs from the abovementioned comparator 20 in synchronism with the second reference clock pulse (output b) when the register is in the state of being set in the "WRITE MODE", and subject the recorded contents to one recirculation during non-generating period of the second reference clock pulse (output b) (more accurately, during a period of from trailing of the second reference clock pulse to its rising once again) when the shift register is in the state of being set in the "RECIRCULATION MODE". On the other hand, to the shift register 85 there are applied a mode control signal (output i) shown in FIG. 16G for setting the shift register 85 in the "WRITE MODE" during a period of from generation of the abovementioned third reference clock pulse (output c) upto generation of the $\alpha$+Nth pulse of the second reference clock pulse (output b), and, thereafter, during a period of from rising of the second reference clock pulse to its trailing at every generation of the second reference clock, and for setting the same in the "RECIRCULATION MODE" during a period other than the abovementioned; and driving pulses (output j) shown in FIG. 16 (k) which cause the shift register 85 to take therein the outputs from the comparator 21 in synchronism with the second reference clock pulse (output b) when the register is in the state of being set in the "WRITE MODE", and subject the recorded contents to one recirculation when the shift register is set in the "RECIRCULATION MODE". By the way, a control signal (output e) shown in FIG. 16E is applied to the "AND" gate 29 to control feeding of the reference second clock pulse (output b) to the counter 28, as is the case with the control circuit 25 shown in FIG. 2.

The other construction is exactly same as the circuit shown in FIG. 2, with the exception that the register 30 is so made as to take thereinto the counted values of the counter 28 during that period in response to the high level signal from the comparator 88. The above-described counter 87, comparator 88, and register 89 are same as those counter 63, comparator 65, and register 66, respectively, shown in FIG. 9.

In the above-described construction, when the third reference clock pulse (output c) is produced as an output from the pulse generating circuit 16, the control circuit 25", in response to this output, sets the shift registers 84 and 85 in their respective "WRITE MODES" with the outputs g and i (FIGS. 16F and 16G), after which it applies to both shift registers the driving pulses (output h and j) shown in FIGS. 16J and 16K in accordance with the second reference clock pulse (output b). Accordingly, the shift registers 84 and 85 begin to take thereinto the outputs from the comparators 20 and 21 in response to the driving pulses h and j. When the $\alpha$+Nth pulse of the second reference clock pulse (output b) is produced from the pulse generating circuit 16, and, accordingly, the shift register 84 completes taking thereinto of the two-value signals of the outputs from the whole sensors $12_1$ to $12_N$, and the shift register 85 also completes taking thereinto of the two-value signals of the outputs from the initial N numbers of the sensors $14_1$ to $14_N$ in the sensor array 14, the control circuit 25", at this point, sets the respective shift registers 84 and 85 in their "RECIRCULATION MODES" with the outputs g and i, and applies the N numbers of the driving pulses (outputs h and j) shown in FIGS. 16J and 16K during a period until the $\alpha$+N+1st pulse of the second reference clock pulse (output b) will be generated. Accordingly, the shift registers 84 and 85 subject the recorded contents therein, i.e., the two-value signals of the outputs from the sensors $12_1$ to $12_N$ and the two-value signals of the outputs from the sensors $14_1$ to $14_N$, to one recirculation. At the time of one recirculation of the recorded values in these shift registers 84 and 85, the exclusive "NOR" gate 86 detects coincidence and non-coincidence of the recorded values between the mutually corresponding bits. If the recorded values are coincident, i.e., both recorded values are either "1" or "0", a high level signal or match signal output is produced, and the match signal from the exclusive "NOR" gate 86 at this time is counted by the counter 87. Incidentally, the control circuit 25", at this point, causes the "AND" gate 29 to begin feeding of the second reference clock pulse (output b) to the counter 28 with the output e (FIG. 16E). Accordingly, same as in the case of the embodiment shown in FIG. 2, the counter 28 begins to count the second reference clock pulse (output b) from its $\alpha$+N+1st pulse. Then, when the $\alpha$+N+1st pulse of the second reference clock pulse (output b) is produced from the pulse generating circuit 16, the control circuit 25" sets the shift register 85 in the "WRITE MODE" during the period of from rising of the second reference clock pulse (output b) to its trailing, with the shift register 84 being set in the "RECIRCULATION MODE", as shown in FIGS. 16F and 16G, and applies the driving pulses (output j) to the shift register 85, as shown in FIG. 16K in response to the second reference clock pulse (output b). Accordingly, the shift register 85, while it is causing the recorded contents up to that time, i.e., two-value signals of the outputs from the sensors $14_1$ to $14_N$, to shift by one bit (at which time the two-value signal of the output from the sensor $14_1$ is dropped), begins to take thereinto the output from the comparator 21, i.e., the two-value signal of the output from the sensor $14_{N+1}$, whereby the recorded contents become changed from "the two-value signals of the outputs from the sensors $14_1$ to $14_N$" to "the two-value signals of the outputs from the sensors $14_2$ to $14_{N+1}$". During this period, the control circuit 25″, does not apply the driving pulse to the shift register 84, as shown in FIG. 16J, so that the shift register 84 is in stoppage with the two-value signals of the outputs from the sensors $12_1$ to $12_N$ being maintained therein. When the $\alpha+N+1$st pulse of the second reference clock pulse (output b) begins to trail, the control circuit 25″, as shown in FIG. 16G, sets the shift register 85 in the "RECIRCULATION MODE" by the output i, and applies the N numbers of the driving pulses (outputs h and j) to both shift registers 84 and 85, respectively, as shown in FIGS. 16J and 16K, during a period up to generation of the subsequent $\alpha+N+2$nd pulse of the second reference clock pulse (output b) so as to cause the recorded contents therein, i.e., the two-value signals of the outputs from the sensors $12_1$ to $12_N$ and the two-value signals of the outputs from the sensors $14_2$ to $14_{N+1}$, to perform one recirculation. At this one recirculation of the recorded contents, the matched numbers in the recorded contents of both shift registers 84 and 85 are counted by the counter 87 through the exclusive "NOR" gate 86, as mentioned in the foregoing. The same operations will be repeated thereafter until the Kth pulse of the second reference clock pulse (output b) will be produced from the pulse generating circuit. On the other hand, processing of the counted values of the counter 87 and the counted values of the counter 28 as well during this period can be performed in the same manner as mentioned in connection with FIG. 9. Therefore, the recorded values in the register 30 at the instant when the shift register 85 has recorded the two-value signals of the outputs from the sensors $14_{M-N-1}$ to $14_M$ and subjected the same to one recirculation amount to the maximum counted value of the counter 28, i.e., relative shift numbers of the shift register 85 which have been spent during a period of from commencement of the relative shifting of the recorded contents until the matched numbers in the recorded contents become maximum. After all, as already stated in connection with FIG. 2, when the recorded values of the register 30 are latched by the latching circuit 31 by the third reference clock pulse (output c) generated from the pulse generating circuit 16, at the start of the subsequent scanning of the object images, the output of the latching circuit 31 represents the object distance.

As stated in the foregoing, the detection of the object distance with the circuit construction shown in FIG. 14 is carried out by the use of the serial-in-serial-out recirculation type shift registers 84 and 85.

In the following, one example of the control circuit 25″ will be explained in detail in reference to FIGS. 15 and 16A through 16K.

Figure 15:
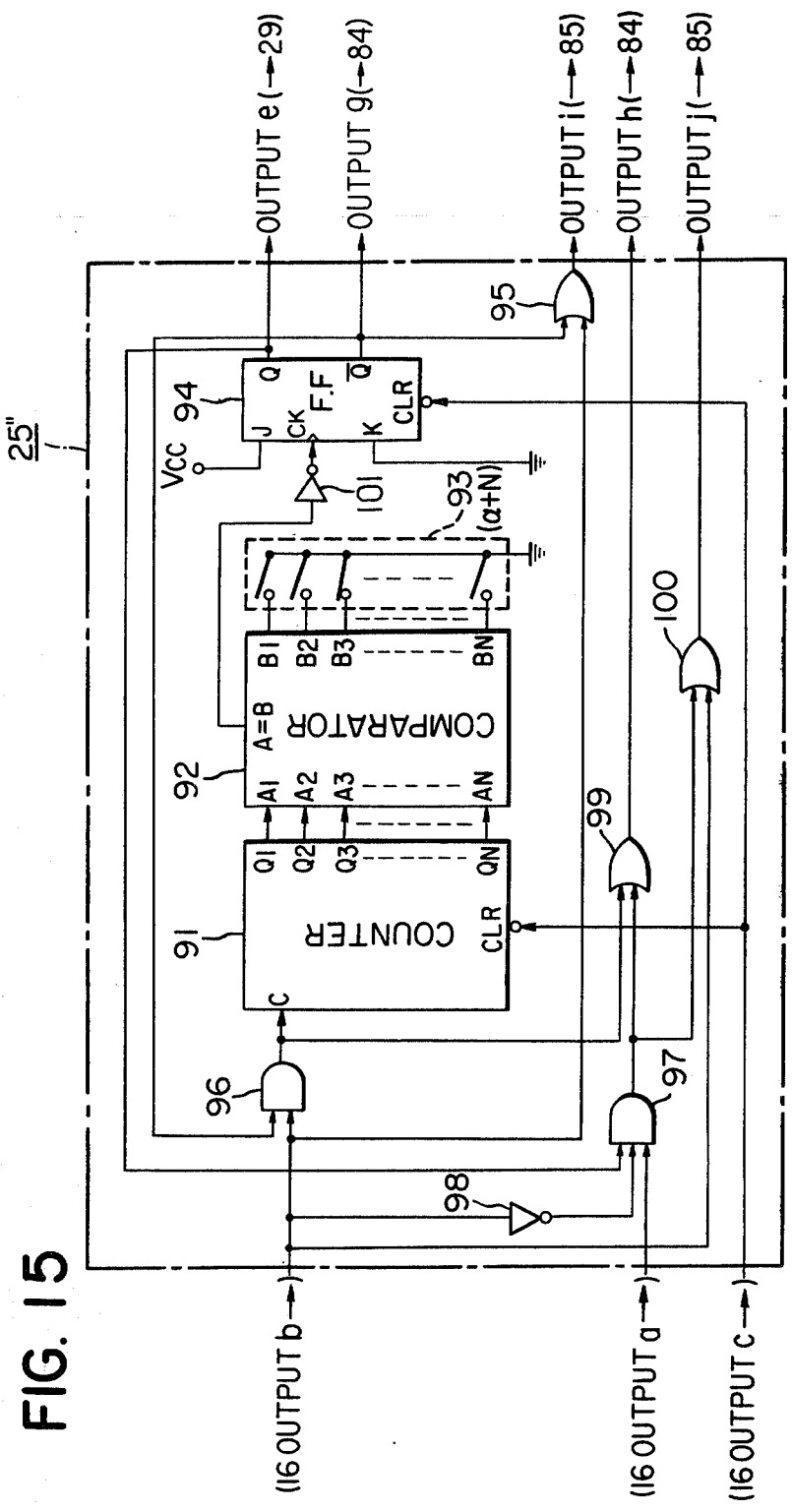
FIG. 15 is a circuit construction diagram showing one concrete example of the control circuit when the circuit construction shown in FIG. 14 is applied to the embodiment shown in FIG. 2.

In FIG. 15, a numeral 91 refers to a counter to count the second reference clock pulse (output b) shown in FIG. 16B from the pulse generating circuit 16 through an "AND" gate 96; 92 designates a comparator which compares the counted values by the counter 91 with a constant $\alpha+N$ set by a constant setting switch circuit 93 and produces a coincided signal output (FIG. 16D) when the counted values have become coincided with the constant $\alpha+N$; and 94 refers to a J-K type flip-flop which receives the coincided signal output from the comparator 92 in its clock input terminal CK through an inverter 101. The counter 91, the comparator 92, the switch circuit 93, and the flip-flop 94 exactly correspond to the first counter 48, the first comparator 49, the first switch circuit 50, and the first flip-flop 51, respectively, as shown in FIG. 6 or 13. The flip-flop 94 is so constructed that the input terminal J may be applied with a voltage Vcc, the input terminal K thereof may be connected to the earth, and the clear terminal CLR thereof may receive, along with the counter 97, the third reference clock pulse (output c) shown in FIG. 16C from the pulse generating circuit 16 as the clear signal. The "AND" gate 96 is so made as to receive the output Q (FIG. 16F) of the flip-flop 94, and the output thereof is as shown in FIG. 16H. A reference numeral 95 designates an "OR" gate which receives therein the output $\overline{Q}$ of the flip-flop 94 and the second reference clock pulse (output b), the output from this gate being as shown in FIG. 16G. A numeral 97 refers to an "AND" gate which receives the first reference clock pulse (output a) shown in FIG. 16A from the pulse generating circuit 16, the second reference clock pulse (output b) inverted by an inverter 98, and the output Q of the flip-flop 94. By taking "AND" of these three input signals, the gate permits the first reference clock pulse (output a) to pass therethrough, only when the output Q of the flip-flop 94 is at the high level, and the second reference clock pulse (output b) is at the low level (hence the output of the inverter 98 is at the high level), as shown in FIG. 16I. Incidentally, as shown in FIGS. 16A and 16B, the frequency of the first reference clock pulse (output a), and the sustaining time and the numbers B of the second reference clock pulse (output b) are so set in this gate, that the $\beta$ numbers of the pulses out of the $N+\beta$ numbers of the first reference clock pulses (output a) are covered by the second reference clock pulses (output b). In other words, when the "AND" is taken between the first reference clock pulse (output a) and the second reference clock pulse (output b) inverted by the inverter, the N numbers of the first reference clock pulse (output a) can be obtained within a period when the second reference clock pulse is at the low level. A reference numeral 99 designates an "OR" gate which receives an output from the "AND" gate 96 and an output from the "AND" gate 97, these outputs being as shown in FIG. 16J. A numeral 100 refers to an "OR" gate which receives the output from the "OR" gate 97 and the second reference clock pulse (output b), the outputs of which are as shown in FIG. 16K.

According to such construction, the output Q of the flip-flop 94 (FIG. 16E) can be utilized as the output e for controlling the "AND" gate 29, as in the case with the control circuit 25 in FIG. 6. On the other hand, the output $\overline{Q}$, opposite to the output Q as shown in FIG. 16F, maintains the high level during a period of from generation of the third reference clock pulse (output c) from the pulse generating circuit 16 up to generation of the $\alpha+N$th pulse of the second reference clock pulse (output b), and maintains the low level during a period, thereafter, until the third reference clock pulse (output c) will again be generated. On account of this if selection is so made as to have a type of the shift registers 84 and 85 such that which assumes the "WRITE MODE" when the mode control signal to be imparted to the mode control terminal of the registers is at the high level, and which assumes the "RECIRCULATION MODE" when the mode control signal is at the low level, as the shift registers 84 and 85 this output $\overline{Q}$ can be utilized as the output g for controlling the mode of the shift register 84. Also, the output from the "OR" gate 95 is a further addition of the second reference clock pulse (output b) to the output $\overline{Q}$ of the flip-flop 94, as shown in FIG. 16G, so that the output therefrom can be utilized as the output i for controlling the mode of the shift register 85. Further, as shown in FIG. 16J, since the second reference clock pulse output (output b) is produced from the "OR" gate 99 during a period of from generation of the third reference clock pulse (output c) from the pulse generating circuit 16 up to generation of the $\alpha$+Nth pulse of the second reference clock pulse (output b), and the first reference clock pulse (output a) is produced from the "OR" gate 99 only while the second reference clock pulse (output b) is at the low level during a period, thereafter, until the third reference clock pulse (output c) will again be generated, the output from this "OR" gate 99 can be utilized as the output h for driving the shift register 84. Moreover, since the second reference clock pulse output (output b) is produced from the "OR" gate 100 during the whole period, as shown in FIG. 16K, and the first reference clock pulse (output a) is produced therefrom while the second reference clock pulse (output b) is at the low level during a period of from generation of the $\alpha$+Nth pulse of the second reference clock pulse (output b) up to generation of the third reference clock pulse (output c), the output from this "OR" gate 100 can be utilized as the output j for driving the shift register 85.

The circuit construction shown in FIG. 14 may also be applied to the embodiments shown in FIGS. 10 and 11. In such a case, the mode of operations should be such that, as is apparent from the explanations in connection with FIGS. 11 and 10, the first sensor region of the sensor array 69, i.e., the two-value signals of the outputs from the sensors $69_1$ to $69_N$, is first taken into the shift register 84, then the two-value signals of the outputs from the initial N numbers in the second region 69b are taken thereinto, and, at the termination of the signal taking operations, the recorded contents in each of these two shift registers 84 and 85 are subjected to one recirculation with a mutually same timing, before the two-value signal of the output from the subsequent sensor $69_{2N+1}$ is produced from the comparator 20, to thereby count the matched numbers between the recorded contents in both shift registers by the counter 87 through the exclusive "NOR" gate, and, after termination of this one recirculation, the two-value signal of the output from the sensor $69_{2N+1}$ is taken into the shift register 85, same as above-described, and, at the termination of this signal taking operation, the recorded contents of each of the shift registers 84 and 85 are subjected once again to one recirculation to count the matched numbers. Accordingly, for the control circuit 25", the shift register 84 should be such that it is set in the "WRITE MODE" during a period of from generation of the third reference clock pulse (output c) from the pulse generating circuit 16 up to generation of the $\alpha$+Nth pulse of the second reference clock pulse (output b), is set in the "RECIRCULATION MODE" during a period, thereafter, until the third reference clock pulse (output c) will again be generated, and, in the state of the "WRITE MODE", it applies the first to $\alpha$+Nth pulses of the second reference clock pulse (output b) for taking thereinto of the two-value signals of the outputs of the sensors $69_1$ to $69_N$ produced from the comparator 20, and, in the state of the "RECIRCULATION MODE", it does not apply any driving pulse until the $\alpha$+2Nth pulse of the second reference clock pulse (output b) is generated, and, after termination of this $\alpha$+2Nth pulse, and only while the second reference clock pulse (output b) is at the low level, it applies the N numbers of the pulses of the first reference clock pulse (output a) for the recirculation of the recorded contents therein. On the other hand, the shift register 85 should be such that it is set in the "WRITE MODE" at every time the second reference clock pulse (output b) is generated during a period of from termination of the $\alpha$+Nth pulse of the second reference clock pulse (output b) up to generation of the $\alpha$+2Nth pulse, and during a period, thereafter, until the third reference clock pulse (output c) will again be generated, is set in the "RECIRCULATION MODE" during a period other than the abovementioned, and, in the state of its being set in the "WRITE MODE", it applies the second reference clock pulse (output b) for taking thereinto the two-value signals of the outputs of the sensors $69_{N+1}$ to $69_L$ produced from the comparator 20, and, in the state of its being set in the "RECIRCULATION MODE", it applies N numbers of the pulses of the first reference clock pulse (output a) for the recirculation of the recorded contents therein, only while the second reference clock pulse (output b) is at the low level during the remaining period except for the period of from generation of the third reference clock pulse (output c) to generation of the $\alpha$+Nth pulse of the second reference clock pulse (output b) this period corresponds to a period, in which the shift register 84 is set in the "WRITE MODE". The physical circuit construction of the control circuit 25" is, for example, as shown in FIG. 17.

The construction shown in FIG. 17 is a modification of the circuit construction shown in FIG. 15 in accordance with the contents as explained in the foregoing. In the illustration, those component elements designated by the same reference symbols as in FIG. 15 are correspondent to those elements in FIG. 15. A reference numeral 102 designates a second comparator which compares the counted values of the counter 91 with a constant $\alpha$+2N set in a second constant setting switch circuit 103, and produces a coincided signal output (FIG. 18G) when this counted values become coincided with the constant $\alpha$+2N. A numeral 104 refers to a second J-K type flip-flop which receives therein the coincided signal from the comparator 102 through an inverter 105, which is of the same circuit connection as that of the abovementioned flip-flop 94. Incidentally, the second comparator 102, the second switch circuit 103, and the second flip-flop 104 exactly correspond to the third comparator 80, the third switch circuit 81, and the third flip-flop 82, respectively, shown in FIG. 3. 106 refers to an "AND" gate which receives the output Q (FIG. 18E) of the flip-flop 94 and the output $\overline{Q}$ of the flip-flop 104, the output of which is as shown in FIG. 18J. 107 designates an "AND" gate which receives the output Q of the flip-flop 104 and the second reference clock pulse (output b) shown in FIG.

18B to be generated at the pulse generating circuit 16, the output of which is as shown in FIG. 18K. By the way, the abovementioned "OR" gate 95 is so made in this embodiment that the outputs from these "AND" gates 106 and 107 may be received therein, hence the output therefrom is as shown in FIG. 18L. A numeral 108 refers to and "AND" gate which receives the output Q of the flip-flop 94 and the second reference clock pulse (output b), the output of which is as shown in FIG. 18P. Incidentally, the "AND" gate 97 is so made here as to receive the output Q of the flip-flop 104, the output of which is as shown in FIG. 18N, hence the output from the "OR" gate 99 is as shown in FIG. 18O. Also, the abovementioned "AND" gate 100 is so made here as to receive the output from the "AND" gate 97 and the output from the "AND" gate 108, hence the output thereof is as shown in FIG. 18Q.

As will be clearly understood from comparison of the signal waveforms shown in FIGS. 18F, 18L, 18O, and 18Q with the foregoing explanations, according to the present invention, the output $\overline{Q}$ of the flip-flop 94 can be used as the output g for controlling the mode of the shift register 84, the output of the "OR" gate 99 can be used as the output h for driving the shift register 84, the output of the "OR" gate 95 can be used as the output i for controlling the mode of the shift register 85, and the output of the "OR" gate 100 can be used as the output j for driving the shift register 85, respectively. Also, for the output e for controlling the counter 29, the output Q of the flip-flop 104 can be used as is the case with the construction shown in FIG. 13.

As has been described so far, the present invention is so constructed that two images of an object formed by a range finding optical system is electrically scanned by the use of one or more photo-sensor arrays, then the analog data concerning these two images at this time are converted in two-value data, thereafter, these two-value data are relatively shifted in the shift registers, and the relative shift quantities spent until the both two-value data become optimumly coincided each other are made the distance information for the object.

In case the photo-sensor array or arrays are used, the following should be taken into consideration from the standpoint of the characteristics of the photo-sensors constituting the array. That is, of the abovementioned photo-sensor arrays, CCD or BBD, for example, consist of the charge accumulation type photo-sensors; this charge accumulation type photo-sensor, when subjected to light irradiation in a state of an electrically void layer being formed by application of a voltage to the electrode, accumulates electrical charge proportional to the incident light quantity (light intensity x time) at a velocity in accordance with intensity of the incident light. Generally, once the charge is discharged, this accumulated charge is used as the image element signal during a time instant of from discharge of the charge as accumulated until the charge is again discharged at the subsequent scanning operation according to the integrated quantity of the light projected thereinto during the period (hence the abovementioned time is recognized as the charge accumulation time of each photosensor). At this time, however, the charge quantity which the photosensor can accumulate, i.e., the saturation level of the accumulated charge is fixed previously, so that, when this saturation level is exceeded, excess charge will flow out thereafter, and this outflow charge would intrude into the void layer in the other photo-sensor. This is, the phenomenon known as the so-called "blooming phenomenon". When such phenomenon takes place, no adequate image element signal can be obtained any longer.

Together with this, when the accumulated charge quantity in the photo-sensor is very small, an S/N ratio to dark current, etc., becomes extremely low, hence adequate image element signal cannot be obtained.

On the other hand, in the case of a self-scanning type photo-diode array, if it is used in the charge accumulation mode, the photo-diode constituting the array, when light is irradiated thereonto in a state of its having been charged until it is saturated in the capacitor of the pn junction, decreases its accumulated charge due to the charge proportional to the incident light quantity being discharged at a velocity in accordance with intensity of the incident light (hence, in this case, the photo-diode functions as the charge accumulation and discharge type photo-sensor). In general, the charge is discharged in accordance with the integrated quantity of the incident light during a time period after the photo-sensor is once charged to saturation until it is charged again to saturation at the time of the subsequent scanning, so that, at the time of the re-charging, the flowing charge current may be obtained as the image element signal in a manner to fill up the portion of the charge decreased by the previous discharge (hence, the abovementioned time is recognized as the charge discharging time of each photo-diode). At this time, the capacity of each photo-diode is previously fixed, so that, if the integrated quantity of the incident light into the photo-diode, for example, exceeds the level of the integrated light quantity to be determined in correspondence to the photo-diode capacity, there only takes place discharge of the entire charge from this photo-diode which has been accumulated to the saturation level of this capacity, and no further discharge will occur. Therefore, the current to flow in the subsequent charging corresponds to the capacity of this photo-diode, and it does not correspond to the integrated quantity of the incident light into the photo-diode. As the result, inadequate image element signal will occur.

Further, when the discharge from the photo-diode is very small, the current flowing at the time of the charging becomes very weak with the result that the S/N ratio to the dark current, etc., becomes very low. In this consequence, no adequate image element signal can be obtained.

Accordingly, if the photo-sensor array consisting of the charge accumulation type or charge accumulation and discharge type photo-sensors is used for the range detecting device as in the present invention, highly precise range detection using such photo-sensor array cannot be expected, unless the light receiving quantity (light receiving time) of the photo-sensor is properly adjusted in accordance with brightness of the object so that the S/N ratio may become high, i.e., adequate image element signal may constantly be obtained, without accumulation or discharge of the charge in or from the photo-sensor arriving at the limted level.

From the above view point, one physical embodiment of the pulse generating circuit 16 which is so made as to be able to automatically adjust light receiving time of the photo-sensor arrays 12 and 14 or 69 in accordance with brightness of the object will be explained in reference to FIGS. 19 and 20.

Figure 19:
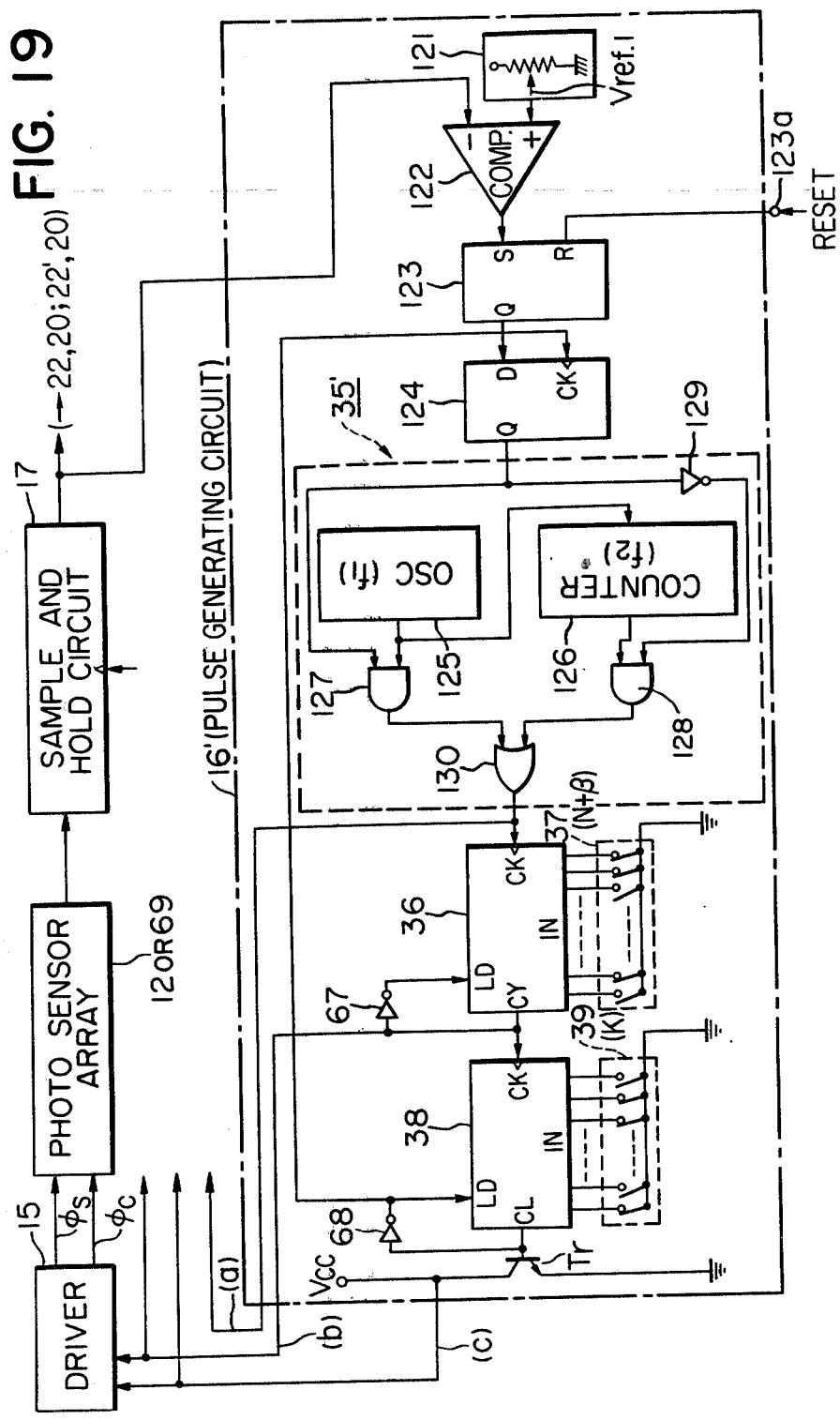
FIG. 19 is a circuit construction diagram showing one concrete example of the pulse generating circuit, in which the light receiving time of the sensor arrays may be automatically adjusted in accordance with brightness of an object to be detected.

In FIG. 19, the pulse generating circuit is designated by a reference numeral 16'. In this pulse generating circuit 16', the same circuit elements as those shown in FIG. 4 will be designated by the same reference numerals. In the drawing, a numeral 121 designates a reference voltage setting circuit, in which a voltage $V_{ref.1}$ slightly lower than the saturation level of each photo-sensor in the photo-sensor array 12 or 69 is established. 122 refers to a comparator which compares an output from the sample and hold circuit 17 with the reference voltage $V_{ref.1}$ set in the reference voltage setting circuit 121. This comparator is so set that, when the output from the sample and hold circuit 17 exceeds this reference voltage $V_{ref.1}$ (vide FIG. 20F), it may produce a high level signal. 123 refers to an RS flip-flop which produces a high level signal output (FIG. 20H) from its output terminal Q by being set in response to the high level signal from the comparator 122. 123a designates its reset terminal. A numeral 124 designates a D type flip-flop which produces a high level signal output (FIG. 20I) from its output terminal Q in synchronism with a carry signal output from the counter 38, after receiving the high level signal input from the flip-flop 123.

A numeral 35' refers to an oscillating circuit corresponding to the oscillator 35 in FIG. 4. In this embodiment, the oscillating circuit consists of an oscillator 125 which generates a reference clock pulse of a predetermined frequency $F_1$, a counter 126, or a frequency dividing circuit which divides the clock pulse from the oscillator 125 into a frequency $F_2$ lower than this clock pulse frequency, an "AND" gate 127 which produces the reference clock pulse output from the oscillator 125 when the output Q from the flip-flop 124 it receives becomes "high" level, an "AND" gate 128 which receives the output from the flip-flop 124, in the same manner as the gate 127, through an inverter 129, and produces the reference clock pulse output from the counter 126 when the output from the inverter 129 is at the high level, i.e., the output Q from the flip-flop 124 is at the low level, and an "OR" gate 130 which produces the outputs of these "AND" gates 127 and 128 as the first reference clock pulse (output a).

In the above-described construction, if nothing exists, at the image scanning, in the outputs from the photo-sensors in the photo-sensor arrays 12 or 69, which exceeds the reference voltage $V_{ref.1}$ set in the reference voltage setting circuit 121, the output of the comparator 122 is at the low level, hence the outputs Q of the flip-flops 123 and 124 are either at the low level. On account of this, in the oscillating circuit 35', the "AND" gate 128 is in the "on" state due to the "high" level output from the inverter 129 to produce, as the output a, the output from the counter 126, i.e., the first reference clock pulse of the frequency $F_2$, whereby the frequency of the second reference clock pulse output (output b) from the counter 36 becomes $f_2 = F_2/N + \beta$. As the result, there are applied to the driver 15 both the second reference clock pulse (output b) of the frequency $f_2$ and the third reference clock pulse output (output c) which is generated at every Kth number of the second reference clock pulse (output b) of the frequency $f_2$, so that the scanning operation is conducted at a relative slow speed (accordingly, the charge accumulating time of each photo-sensor in the sensor array 12, 14 or 69 is prolonged due to the start pulse generating cycle period being long).

In contrast to this, as shown in FIG. 20F, when the output from the sample and hold circuit 17 exceeds the reference voltage $V_{ref.1}$ in the course of the scanning, the output of the comparator 122 assumes a "high" level as shown in FIG. 20G, in response to which the output Q of the flip-flop 123 assumes the high level, as shown in FIG. 20H. On the other hand, the output Q of the flip-flop 124 which receives the high output from this flip-flop 123 assumes the high level in response to the carry signal output produced from the counter 38 at the start of the subsequent scanning, as shown in FIG. 20I. As the consequence, the output of the inverter 129 assumes the low level, on account of which the "AND" gate 128 becomes off and the "AND" gate 127 becomes on instead, whereby the output from the oscillator 125, i.e., the first reference clock pulse of the frequency $F_1$ is produced as the output a. Therefore, the second reference clock pulse output (output b) of the frequency $f_1$ ($f_1 = F_1/N + \beta$) is produced from the counter 36, as shown in FIG. 20A. Thus, both the second reference clock pulse (output b) of the frequency $f_1$ and the third reference clock pulse (output c) generating at every Kth number of the second reference clock pulse (output b) of the frequency $f_1$ are applied to the driver 15, whereby the scanning cycle period of the sensor array 12, 14, or 69 becomes short, and the charge accumulation time of the photo-sensor becomes curtailed. The ratio of the curtailment of the charge accumulation time at this time corresponds to the ratio of the frequency changes in the first reference clock pulse (output a) such as if $F_1 = 2F_2$, the ratio becomes ½, if $F_1 = 4F_2$, it is ¼, and so on.

Thus, according to the pulse generating circuit 16' shown in FIG. 19, when the object is particularly bright the frequency of, the second reference clock pulse (output b) to be applied to the driver 15 becomes higher, on account of which the pulse generating time interval of the third reference clock pulse (output c) becomes shorter, hence the scanning cycle period, i.e., the charge accumulation time of the photo-sensors in the photo-sensor array 12, 14, or 69 becomes shortened and the accumulated charge in the photo-sensors can be prevented in advance from reaching the saturation level.

In the embodiment of the pulse generating circuit shown in FIG. 19, the adopted construction is such that the oscillation circuit 35' is composed of the oscillator 125 which generates the reference clock pulse of the frequency $F_1$ and the counter 126 which frequency-divides the reference clock pulse of the frequency $F_1$ to generate the reference clock pulse of the frequency $F_2$ so as to be able to utilize either output from the oscillator 125 or the counter 126 depending on whether output Q of flip-flop 124 is at a "high" or a "low" level. In particular, for this oscillation circuit 35', a V-F converter (Voltage-Frequency converter) which is known to produce a clock signal output of a frequency corresponding to the input voltage may be utilized. In this case, a first voltage generating circuit to generate a voltage $V_1$ suited for the abovementioned frequency $F_1$ and a second voltage generating circuit to generate a voltage $V_2$ suited for the frequency $F_2$ are connected to the input terminal of the V-F converter so that either output voltage from these first and second voltage generating circuits may be selected for application to the V-F converter in accordance with the level of the output Q of the flip-flop 124, i.e., "high" or "low" level. Also, in the embodiment of the pulse generating circuit shown in FIG. 19, the frequency of the second reference clock pulse (output b) and the pulse generating time interval of the third reference clock pulse (output c) may be varied by changing the frequency of the first reference clock pulse (output a) thereby to adjust the light receiving time of the sensor array 12, 14, or 69. Besides this, the adjustment of the light receiving time in the photo-sensor array 12, 14, or 69 is possible even by varying the pulse generating time interval of the third reference clock pulse (output c) alone without changing whatsoever the frequency of the first and second reference clock pulses (outputs a and b). In other words, this is done by automatically changing the set value in the counted value setting switch circuit 39 for the counter 38 shown in FIG. 19. For example, if the circuit is so constructed that some of the switches in the switch circuit 39 are removed, in place of which the set value input terminals at the side of the counter 38 corresponding to these removed switches are connected to the Q output terminal of the flip-flop 124, whereby the set counted value to the counter 38 may be K when the output Q of the flip-flop 124 is at the "low" level, and the set counted value is K' (where: $K > K' \geq \alpha + M$ or $K > K' \geq \alpha + L$) when the output Q is at "high" level, the set counted value for the counter 38 assumes K or K' in accordance with the level of the output Q of the flip-flop 124, i.e., "low" or "high" level, on account of which the pulse generating time interval of the third reference clock pulse (output c) alone changes, while the frequency of the first and second reference clock pulses (outputs a and b) remains unchanged. As the result, the light receiving time of the sensor array 12, 14 or 69 becomes automatically adjusted.

For change-over of the frequency of the first reference clock pulse (output a) from the oscillation circuit 35' in the pulse generating circuit 16' shown in FIG. 19 from $F_1$ back to the original $F_2$, a "high" level signal may be applied to the reset terminal 123a of the flip-flop 123. This change-over operation can be done conveniently by bring interlocked with shutter charging operation, etc., in case the range detecting device of the present invention is applied to a focus detecting device or an automatic focus adjusting device for incorporation into a photographic camera, etc., for example. Or, there is another way, in which the frequency is automatically changed over to the original frequency $F_2$ in accordance with brightness of the object for the range detection, when it becomes dark. This will be explained in the following in reference to FIGS. 21 and 22.

Figure 21:
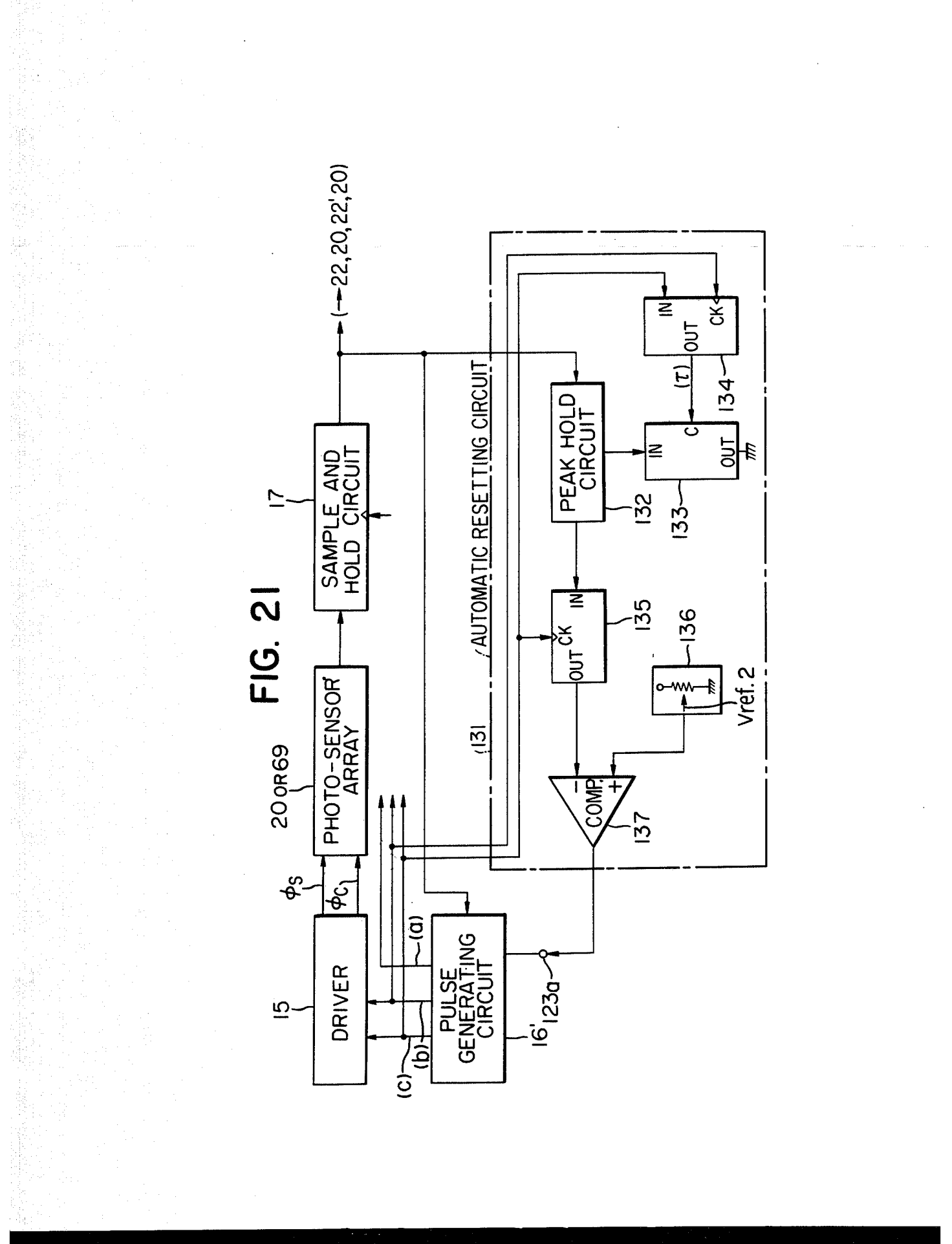

In FIG. 21, the automatic reset circuit in its entirety is designated by a reference numeral 131. 132 refers to a peak hold circuit which functions to sequentially hold peak values of the outputs from the sample and hold circuit 17 (FIG. 22 (f)). 133 designates a switch for clearing the peak values held by the peak hold circuit 132 (FIG. 22 (g)). This switch functions to clear the values held in the peak hold circuit 132 by being turned on in response to a control signal output from a shift register 134 after lapse of a certain delay time $\tau_1$ (when the frequency of the second reference clock pulse is $f_1$) or $\rho_2$ (when the frequency of the second reference clock pulse is $f_2$) from generation of the third reference clock pulse (output c) shown in FIG. 22B from the pulse generating circuit 16'. 135 refers to a sample and hold circuit for sampling and holding the output from the peak hold circuit 132, which is so set as to take thereinto the output from the peak hold circuit 132 in response to the third reference clock pulse (output c) from the pulse generating circuit 16' and to hold this until the third reference clock pulse (output c) will again be applied. 136 designates a reference voltage setting circuit, in which there is set a voltage $V_{ref.2}$ for determining the level to reinstate the pulse generating circuit 16' to its original state, i.e., to reset the frequency of the first reference clock pulse (output a) from the oscillation circuit 35' to the original state, i.e., from frequency $F_1$ to $F_2$. 137 designates a comparator which compares the output from the sample and hold circuit 135 (FIG. 22 (h)) with the reference voltage $V_{ref.2}$ set in the reference voltage setting circuit 136. The comparator is so set that it may produce a high level signal output, i.e., the reset signal output (FIG. 22 (i)) to the reset terminal 123a of the flip-flop 123 in the pulse generating circuit 16', when the output of the sample and hold circuit 135 becomes lower than the reference voltage $V_{ref.2}$.

In this construction, when the hold value of the peak hold circuit 132 (FIG. 22 (g)) is higher than the reference voltage $V_{ref.2}$ in the state of the frequency of the first reference clock pulse is generated from the oscillation circuit 35' in the pulse generating circuit 16' being $F_1$, the output of the sample and hold circuit at this time (FIG. 22 (h)) is naturally higher than this reference voltage $V_{ref.2}$, even when the sample and hold circuit 135 takes thereinto the output of the peak hold circuit 132 at the start of the subsequent scanning operation and forwards it to the comparator 137 as the output. On account of this, the output of the comparator 137 (FIG. 22 (i)) assumes the "low" level and the pulse generating circuit 16' is not reset. In contrast to this, when the value held in the peak hold circuit 132 becomes lower than the reference voltage $V_{ref.2}$, as shown in FIG. 22 (g), the sample and hold circuit 135 takes thereinto the output of the peak hold circuit 132 at the start of the subsequent scanning, as shown in FIG. 22H and produces it as the output therefrom, whereupon the output of the comparator 137 assumes the "high" level (i.e., the reset signal is generated), as shown in FIG. 22 (i). Thus, as shown in FIG. 22 (j), the flip-flop 123 is immediately reset in the pulse generating circuit 16', and the output Q thereof assumes the "low" level. The flip-flop 124 which receives this low level signal also assumes the low level in its output Q in response to the third reference clock pulse (output c) to be imparted thereto at the subsequent scanning operation, as shown in FIG. 22 (k), whereby the "AND" gate 127 in the oscillation circuit 35' the pulse generating circuit 16' is turned off, and, at the same time, the "AND" gate 128 is turned on to change-over the frequency of the first reference clock pulse (output a) from $F_1$ to $F_2$. As the result, the frequency of the second reference clock pulse (output b) to be imparted to the driver 15 is changed from $f_1$ over to the original frequency $f_2$, as shown in FIG. 22 (a).

As such, according to the combination of the pulse generating circuit 16' shown in FIG. 19 and the automatic reset circuit 131 shown in FIG. 21, even when brightness of the object varies during the range detecting operations, there can always be obtained an image scanning signal at an adequate level satisfactorily conforming to variations in the object brightness, so that it can be employed as the range detecting device with extreme advantage.

The range detecting method and device of the present invention as so far been explained in the foregoing can be applied as it is to the automatic focus adjusting system in the optical apparatuses and appliances such as photographic camera, etc., and detailed explanations will be given to this practical applications of the method and apparatus in the following.

Figure 23:
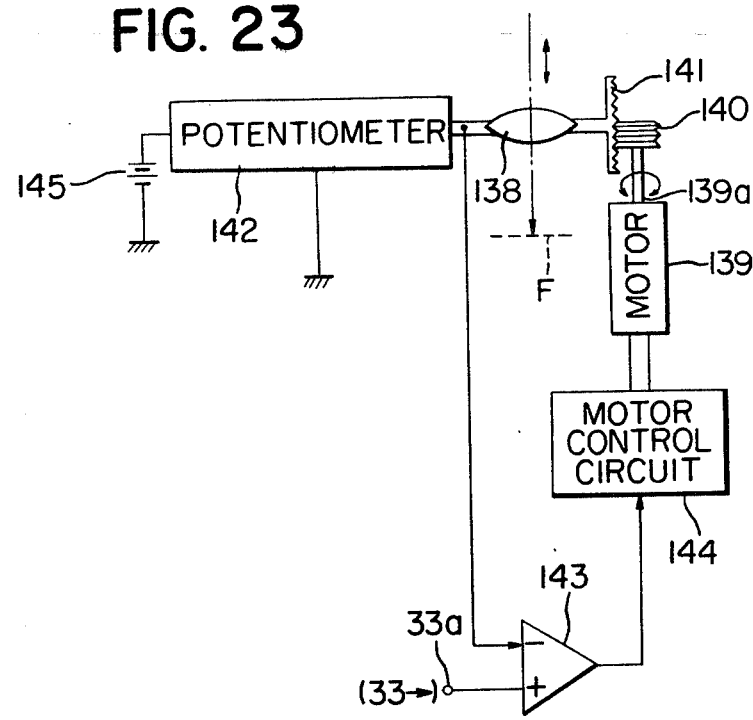
FIG. 23 is a general diagram showing a schematic construction of one embodiment, in which the range detecting device shown in FIG. 2 or 11 is applied to the automatic focus adjusting system in optical apparatuses and appliances such as photographic cameras, etc.

FIG. 23 shows schematically the principal part of a mechanism for servo-controlling a photographic lens in a camera utilizing an object distance signal output from the D/A converter 33 in the above-described embodimental device of the present invention.

In the drawing, 138 designates a photographic lens to be focussed to the object for the range detection. 139 refers to a drive motor for adjusting the photographic lens 138 along its optical axis. The drive motor is linked with a rack plate 141 fixed to the photograhic lens 138 through a worm 140 fixedly provided on its output shaft 138a. 142 denotes a potentiometer mechanically linked with the abovementioned photograhic lens 138 and is connected to one of the input terminal of a differential amplifier 143. Incidentally, the other input terminal of the differential amplifier 143 is connected to the output terminal 33a of the D/A converter 33 shown in FIG. 2. 144 refers to a motor control circuit to control the abovementioned motor 139 based on the output from the amplifier 143. 145 denotes a power source, and a symbol F designates a film surface.

In the above-described construction, when the range detecting device shown in FIG. 2 or 11 completes the range detection upto an object, and the output from the D/A converter 33 is applied to the differential amplifier 143 through the output terminal 33a thereof, the differential amplifier 143 assumes an output in accordance with a difference between a signal corresponding to the distance to the object from the D/A converter 33 and a signal corresponding to the adjusting position of the photographic lens 138 from the potentiometer, whereby the motor control circuit 144 determines the rotational direction of the motor 139 in accordance with polarity of the output from the amplifier 143, and starts adjustment of the photographic lens 138 by the motor 139. In the course of adjustment of the photographic lens 138, when a signal from the potentiometer 142 becomes coincided with a signal from the D/A converter 33, the output from the differential amplifier 143 becomes zero, and the motor control circuit 144 stops the motor 139. Accordingly, the photographic lens 138, at this time, is accurately focussed to the object, and the clearest image of the object can be formed on the film surface F.

Figure 24:
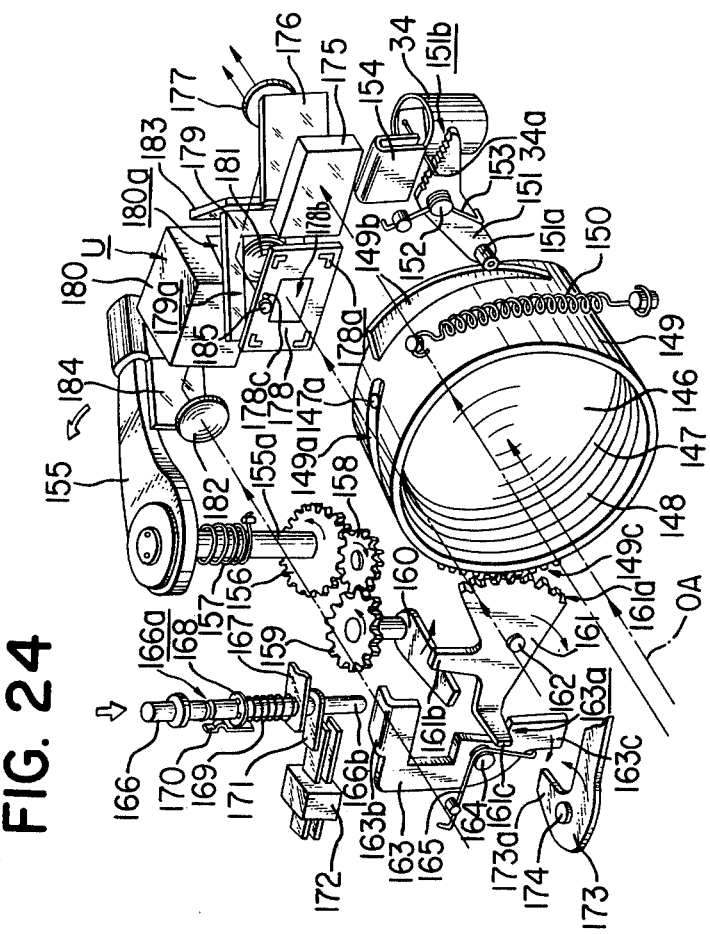
FIG. 24 is a perspective view of a principal mechanical construction of one concrete example in which the range detecting device shown in FIG. 2 is applied to the automatic focus adjustment system in a photographic camera.

FIG. 24 shows one concrete example of the automatic focus adjusting system in the photographic camera, in particular, wherein the photographic lens is so made as to be automatically adjusted at a position indicated by the indicator needle 34a of the meter 34 as the last output means in the embodimental device of the present invention as described in the foregoing in utilization of the oscillation of the indicator 34a.

In the drawing, 146 designates a photographic lens which is held in a lens holding barrel 147 which, in turn, is supported in a freely slidable manner within a fixed lens barrel 148. 149 indicates a lens driving ring which is mounted on the outer periphery of the fixed lens barrel 148 in a freely rotatable manner. This driving ring 149 is provided with a helical slot (or a cam slot) 149a for moving along the optical axis OA of the photographic lens 146, a cam piece 149b for indicating the adjusting position of the lens 146, and a gear section 149c, and is energized by a coil spring 150 to rotate in the clockwise direction with the optical OA as the center of its rotation. The slot 149a is engaged with a follower pin 147a embedded in the outer periphery of the lens holding barrel 147 after it has passed through an axial guide slot (not shown) formed in the fixed lens barrel 148. Accordingly, when the lens driving ring 149 rotates, the lens 146 is driven by the slot 149a together with the lens holding barrel 147 along the optical axis OA through the follower pin 147a. 151 designates a stop lever for stopping the lens driving ring 149 (hence the lens 146) at a position indicated by the indicator needle 34a of the meter 34. The stop lever 151 has a follower 151a which contacts the cam piece 149b of the lens driving ring 149 and a gear section 151b to be engaged with the indicator needle 34a of the meter 34, is axially supported by a shaft 152 in a freely rotatable manner, and is energized by a spring 153 to rotate in the clockwise direction with the shaft 152 as the center of its rotation, i.e., in the direction, in which the follower 151a contacts the cam piece 149b of the lens driving ring 149. 154 designates a U-shaped restricting member to restrict further rotation of the stop lever 151 in the anti-clockwise direction, when the gear section 151b of the stop lever 151 becomes engaged with the indicator needle 34a of the meter 34. This restricting member 154 is disposed as closely as possible to the indicator needle 34a of the meter 34 so that it may permit free swinging of indicator needle 151, and stop rotation of the stop lever 151 at the time when gear section 151b of the stop lever 151 is engages indicator needle 34a to push it toward the restricting member 154. 155 designates a shutter charging lever for the camera which is linked with a shutter charging mechanism (not shown) and a film winding-up mechanism through a gear 156 mounted on the shaft 15a, and is so energized by a coil spring 157 as to rotate in the clockwise direction, whereby, when an operator's hand is off the lever after the shutter charging operation, it may automatically return to the position as illustrated. 160 denotes a rotational lever for returning the lens to its original position, which is linked with the gear 156 through a gear 159 and an intermediate gear 158 integral with the lever. The rotational lever is so constructed that, when the shutter charging lever 155 is rotated in the arrow direction in the drawing, it may rotate in the arrow direction as shown in the drawing by the action of the gear train 156, 158 and 159, and, at this time, by rotating a sector gear 161 in the arrowed direction (i.e., clockwise direction) around a supporting shaft 162 through an arm portion 161b of the sector gear 161 meshed with a gear section 149c of the lens driving ring 149 in its gear section 161a, it may rotate the lens driving ring 149 in the anti-clockwise direction upto a position shown in the drawing with the optical axis OA as the center of its rotation. Incidentally, by the anti-clockwise rotation of the lens driving ring 149, the spring 150 is charged. 163 refers to an engagement lever which receives a bent arm 161c at the tail end of the sector gear 161 at an engaging stage 163b thereof when the lens driving ring 149 is rotated by the sector gear 161 to a position shown in the drawing to thereby stop the driving ring 149 through the sector gear 161 at the position shown in the drawing. This engagement lever 163 is axially supported by a shaft 164 in a freely rotatable manner, and is rotationally energized by a spring 165 in the anticlockwise direction with the shaft 164 as the center of its rotation, i.e., in the direction to receive the bent arm 161c of the sector gear 161.

The slot 149c in the lens driving ring 149 is so designed that, in a state wherein the driving ring 149 is returned to a position shown in the drawing by the sector gear 161, it sets the photographic lens 146 at a position focussing to the infinite distance, and that, at the time of rotation of the lens driving ring 149 in the clockwise direction with the optical axis OA as the center of its rotation, it moves the lens 146 in the forward direction along the optical axis OA, i.e., to a position where the lens focusses to a short distance. 166 refers to a shutter release button for the camera, which is supported by a fixed base plate 167 of the camera so as to be freely slidable up and down, as shown in the drawing, and is also energized in the upward direction by a coil spring 169 inserted between the base plate 167 and a washer 168 of its own. 170 designates a click spring which becomes engaged with a click groove 166a in one part of the shutter release button 166 on the way of pushing the release button 166 downward to thereby click-stop the release button. It should be understood that the spring 169 has sufficient spring power to release the click-stop of the release button 166 by this click spring 170. 172 denotes a power source switch of a constant open type, which is connected to a range detecting unit incorporated in the camera, to be described later. The switch is disposed at such a position that, at the time of depression of the release button 166, it may be closed by a switch closing member 171 fitted on the shutter release button 166 at the time instant when the click spring 170 is exactly engaged with the click groove 166a. The abovementioned engagement and stopping lever 163 is so constructed that it has the bent portion 163b to receive the tip end part 166b of the release button 166 at the time of further depression of the release button 166 from its position where the click spring 170 becomes engaged with the click groove 166a of the release button 166, that it causes the bent portion 163b to rotate against the spring 165 in the clockwise direction with the shaft 164 as the center of its rotation by being pushed by the tip end part 166b of the release button 166 to release the engagement of the sector gear 161 the engaging stage 163a, and that it may release the shutter (not shown) by pushing part 173a of lever 173 by part 163c thereof in the vicinity of the final stage of depression of button 166, and rotating the shutter release lever to release by causing the release lever 173 in the arrow direction shown in the drawing with the supporting shaft 174 as the center of its rotation. 175, 176, and 177 respectively refer to an objective lens, a semi-transparent mirror, and an eye-piece lens, all constituting the view finder optical system of the camera. 178 designates a mask plate provided with four openings 178a to indicate a photo-taking sight within the view finder of the camera and a single opening 178b for regulating the range detecting sight. Though not clearly shown in the drawing, the four openings 178a for indicating the photo-taking sight are covered with, for example, a yellow-colored light transmitting film. 179 denotes a mirror which is inclined at the back of the mask plate 178 to deflect light arriving through the four openings 178a for indicating the photo-taking sight of the mask plate 178 toward the semi-transparent mirror. This mirror has an opening 179a corresponding to the opening 178b for regulating the range detecting sight in the mask plate 178.

Figure 25:
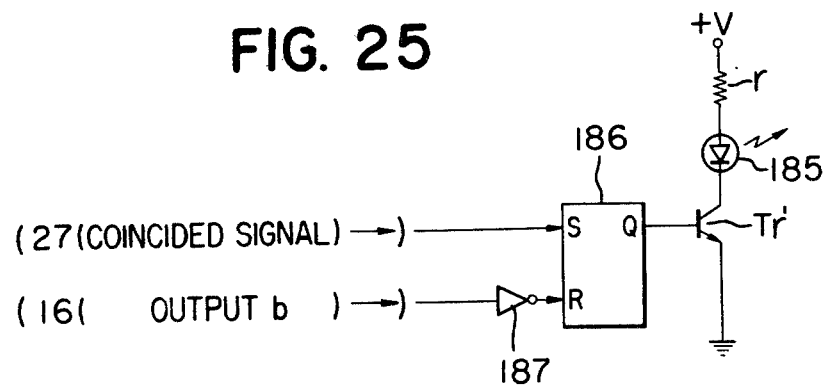
FIG. 25 is a schematic circuit diagram showing a construction of one embodiment of a display circuit for displaying termination of the range detecting operation in the automatic focus adjustment system shown in FIG. 24.

In such construction as described above, the range detecting device of the present invention as shown in FIG. 2, for example, is arranged in a compact type and sealed in a package box 180, which is then incorporated in the camera as the range detecting unit U. In this case, openings are provided at both the left and right side surfaces of the box 180 (in the drawing, only the opening 180a at the right side surface of the box is designated by a numeral 180a), and the photo-sensor arrays 12 and 14 shown in FIG. 2 are disposed within the box 180 opposite to the respective left and right openings. 181 and 182 refer to lenses corresponding to the lenses 11 and 13 shown in FIG. 1 or 2, respectively. In particular, the lens 181 is disposed at the back of the mirror 179 in opposition to the opening 179a thereof so that it may receive light from the object to be photographed which arrives through the opening 178b for regulating the range detecting sight of the mask plate 178 and the opening 179a of the mirror 179 to form a reference image of the object with the consequence that the sight thereof is restricted in comparison with that of the lens 182 to form a comparative image. 183 designates a mirror which is slantly disposed at the back of the lens 181 for receiving the reference image to be formed by the lens 181 in the sensor array 12 disposed at opposition to the opening 180a in the right side surface of the box 180. 184 indicates is a mirror which is slantly disposed at the back of the lens 182 for receiving the comparative object image to be formed by the lens 182 in the sensor array 14 disposed in opposition to the opening (not shown) at the left side surface of the box 180. 185 designates a light emitting diode for indicating termination of the range detection in the above-mentioned range detecting unit U. The light emitting diode 185 is disposed in opposition to a small hole 178c formed in the upper center part of the mask plate 178 so that indicating light may be projected onto the semi-transparent mirror 176 through the mirror 179. For the light emitting diode 185, those which emit red or green light, for example, would be preferable so as to be sufficiently distinguished from yellow light coming through the photographic sight indicating opening in the mask plate 178. The control circuit for the light emitting diode 185 for indicating termination of the range detection may be, for example, as shown in FIG. 25. In the drawing, 186 denotes a flip-flop which receives the output of the coincidence detecting circuit 27 in FIG. 2, i.e., the coincided signal (FIG. 3Q) at its set input terminal S and the third reference clock pulse from the pulse generating circuit 16 shown in FIG. 2 (output c shown in FIG. 3C) at its reset input terminal through the inverter 187. Tr' designates a transistor the base of which is connected to the Q output terminal of the flip-flop 186, and the emitter of which is grounded. The light emitting diode 185 is connected to the collector side of the transistor Tr' together with a protective resistor r.

According to such circuit construction the flip-flop 186 is reset at the start of the range detection, and the output Q thereof is at the "low" level, so that the transistor Tr' is non-conductive and the light emitting diode 185 is turned off; however, in the course of the range detection, when the coincidence detection circuit 27 detects coincidence of the contents in the shift registers 23 and 24 and produces a coincided signal output (FIG. 3Q), the flip-flop 186 is set and the output Q thereof changes from the "low" level to the "high" level with the result that the transistor Tr' becomes conductive and the light emitting diode 185 is turned on at this time, whereby termination of the range detection is indicated. Thereafter, when the third reference clock pulse (output c shown in FIG. 3C) is produced from the pulse generating circuit 16, the flip-flop 186 is reset and the output Q thereof changes from the "high" level to the "low" level, on account of which the transistor Tr' is turned off, and the light emitting diode 185 is turned off.

In the above-described construction of the photographic camera shown in FIG. 24, when the shutter charging lever 155 is manipulated in the arrow direction in the drawing to prepare for the photo-taking operation, the gear 156 rotates in the arrow direction to actuate the shutter charging mechanism and the film winding mechanism (not shown), whereby the shutter charging and the film winding are carried out, and the rotational lever 160 is rotated in the arrow direction in the drawing through the gears 158 and 159, whereby the sector gear 161 is rotated in the arrow direction in the drawing through the arm portion 161b, so that the lens driving ring 149 is rotated in the anti-clockwise direction with the optical axis OA as the center of its rotation. Accordingly, when the photographic lens 146 is set at a position which focusses to the infinite distance and the spring 150 is sufficiently charged, the lever 163 stops the bent arm 161c of the sector gear 161 at the engaging stage 163a by the action of the spring 165, whereby the lens driving ring 149 is stopped at a position shown in the drawing.

By the above-described process, the preparation for the photographic operation has been completed. In this state, when the camera is collimated to a photographic object so as to place a desired photographic object appearing in the view finder within the photographic sight defined by the four openings 178a in the mask plate 178, while viewing the view finder, the lens 181 at this time forms an image of the photographic object mainly at its center part of the sensor array 12 disposed in opposition to the opening 180a at the right side surface of the box 180, as a reference image, through the mirror 183 by means of light arriving through the opening 178b for regulating the range sight in the mask plate 178 and opening 179a of mirror 179, as is understood from the illustrated construction. On the other hand, the lens 182 forms through the mirror 184 an image of the photographic object as a comparative image on the sensor array 14 disposed in confrontation to the opening at the left side surface of the box 180 with a relative positional parallax corresponding to the distance to the object from the camera through the mirror 184 with a range wider than the range the lens 181 possesses. In this state, when the shutter release button 166 is first pushed down to a position where the click spring 170 is engaged with the click groove 161a, the switch 172 is closed by the switch closing member 171, whereby electric power is fed from the power source (not shown) to the range detecting unit U, whereby the unit commences the range detecting operation same as that already explained in connection with the device shown in FIG. 2. When the range detection in this range detecting unit U is completed, i.e., when the coincidence detection signal output (FIG. 3Q) is produced from the coincidence detecting circuit 27 shown in FIG. 2, the light emitting diode 185 is turned on as explained in connection with FIG. 25, and display is made within the view finder to the effect that the range detection is completed, and the indicator needle 34a of the meter 34 indicates its oscillation corresponding to the distance to the photographic object by the output from the D/A converter 33 shown in FIG. 2. At the time instant when the light emitting diode 185 is turned on, when the shutter release button 166 is further depressed, the engaging and lever 163 is rotated in the clockwise direction as shown in the drawing with the shaft 164 as the center of its rotation against action of the spring 165 by means of the tip end part 166b of the release button 166 to release engagement and stopping of the sector gear 161, whereby the lens driving ring 149 rotates in the clockwise direction by the action of the spring 150 with the optical axis OA as the center of its rotation, and the lens 81 is pushed forward on the optical axis OA along this slot 149a through the pin 147a. On the other hand, lens driving ring 149 is rotated by the action of the spring 150, the stop lever 151 is rotated in the anti-clockwise direction by the cam member 149b provided on the outer periphery thereof against the spring 153 with the shaft 152 as the center of rotation. When the tooth part 151b of the stop lever 151 is engaged with the indicator needle 34a of the meter 34 to cause it to collide against the restricting member 154, further rotation of the stop lever 151 is restricted, on account of which the driving ring 149 is stopped, and the photographic lens 146 is set at the forwarding position to be indicated by the indicator needle 34a, i.e., the forwarding position corresponding to the distance of the object. Accordingly, if the release button 166 is further depressed, at the time of stoppage of the lens 146, the release lever 173 is actuated by further rotation of the lever 163 to release the shutter (not shown), whereby the clearest image of the object can be photographed on the film (not shown). Thereafter, when the photographer leaves his finger away from the supply release button 166, the button returns to the position shown in the drawing by the action of the spring 169, at which the switch 172 is opened and the range detecting unit U is interrupted from the power feeding, hence it stops operation.

Thus, in the camera shown in FIG. 24, very quick and accurate automatic focussing of lens 146 becomes possible in an extremely simple construction, and in utilization of the range detecting device shown in FIG. 2, particularly, by utilizing the indicator needle 34a of the meter 34 for indicating the object distance as the ultimate output means of the detecting device. Also, according to this camera construction, even when the release button 166 is depressed to a position where it is click-stopped by the click spring 170, only the switch 172 is closed, but the lens 146 is not released. Also, at this instant, when the photographer leaves his finger away from the release button 166, the switch 172 is opened and the distance information from the detecting unit U is cancelled, so that, the object to be photographed can be freely changed to other object of different distance, if it is prior to release of the lens 146.

The above-described two embodiments of the automatic focus adjusting system are of such type that the photographic lens is adjusted by causing it to correspond to the object distance to be represented by the output from the range detecting device. However, in the range detecting method and device of the present invention, there can be obtained from the range detecting device an information corresponding to a deviation of the set position of the photo-taking lens from an in-focus position, at which the that lens focusses the object image on the film plane, by interlocking the lens 13 shown in FIG. 1 or 2 with the photographic lens, for example. Accordingly, the automatic focus adjustment of this photographic lens can be attained even by bringing the photograhic lens to a position where this deviation is eliminated.

This will be explained in reference to FIG. 26. In the drawing, the same component elements as that shown in FIGS. 1, 2 and 23 are designated by the same reference numerals. Also, those portions which overlap with the construction shown in FIG. 2 are omitted from the illustration. First of all, as already explained in connection with FIG. 1, the lens 13 is so arranged that it may cause the exact center part of the object image positioned at an infinite distance to coincide with the center part of the sensor region consisting of initial (or the rightmost) N numbers of the sensors (N is an even number) in the sensor array 14, as shown in the drawing. Now, assume that an object distance, in which the center part of the image becomes just coincided by the lens 13 with the center C of the sensor array 14 as the reference, is D'. Any object, the center part of the image of which is positioned to the left side from this center C, i.e., within the region of the arrow-indicated A side, is at the short distance side from this distance D'. Inversely, any object, the center part of the image of which is positioned to the right side from this center C, i.e., within the region of the arrow-indicated B side, is at the long distance side from this distance D'. Accordingly, when the lens 13 is not fixed, but is made movable in the arrow directions a and b as shown in the drawing, and is adjusted by a connecting device 188 as shown generally by broken lines with respect to the photo-taking lens 138 in such a relationship that it may cause the image center of the object to coincide with the center C of the sensor array 14, if it is connected in such a manner that the photo-taking lens 138 may be accurately focus-adjusted to the same object, e.g., in case the image center of the object to be formed on the sensor array 14 by the lens 13 is positioned in the region of the arrow-indicated A side in the drawing, the object will be positioned to a much shorter distance side with respect to the then set distance of the photo-taking lens 138 with the consequence that the taking lens 138 is in the "back" focus state with respect to this object. Inversely, when the image center of the object is positioned within the region of the arrow-indicated B side in the drawing, the object is positioned to a much longer distance side with respect to the then set distance of the taking lens 138 with the consequence that the taking lens 138 is in the "front" focus state. In this case, in the course of shifting the two-valve image signals recorded in the shift register 24, just M-N/2 times of the shifting operation is required counting from the instant when the two-value signals of the image element signals from the initial N numbers of the sensors in the sensor array 14 have been completely recorded in the shift register 24, as is understandable from the drawing, until the two-value signals of the image element signals from the N numbers of the sensors with the abovementioned center C of the sensor array 14 as the center will become recorded in the shift register 24. Therefore, if this M-N/2 is subtrated from the counted values of the counter 28 when the coincidence detection circuit 27 shown in FIG. 2 detects the coincidence, in the course of carrying out such coincidence detection while causing the two-value signals of the image element signals from the sensor array 14 recorded in the shift register 24 to shift bit by bit with respect to the two-value signals of the image element signals from the sensor array 12 recorded in the shift register 23, the resulted positive and negative symbols represent the directivity of the abovementioned deviation, i.e., whether it is the "back" focus (positive) or the "front" focus (negative), and the absolute values thereof represent the quantity of this deviation (if the subtracted result is zero, this represents that the taking lens 138 is in the in-focus position).

Figure 26:
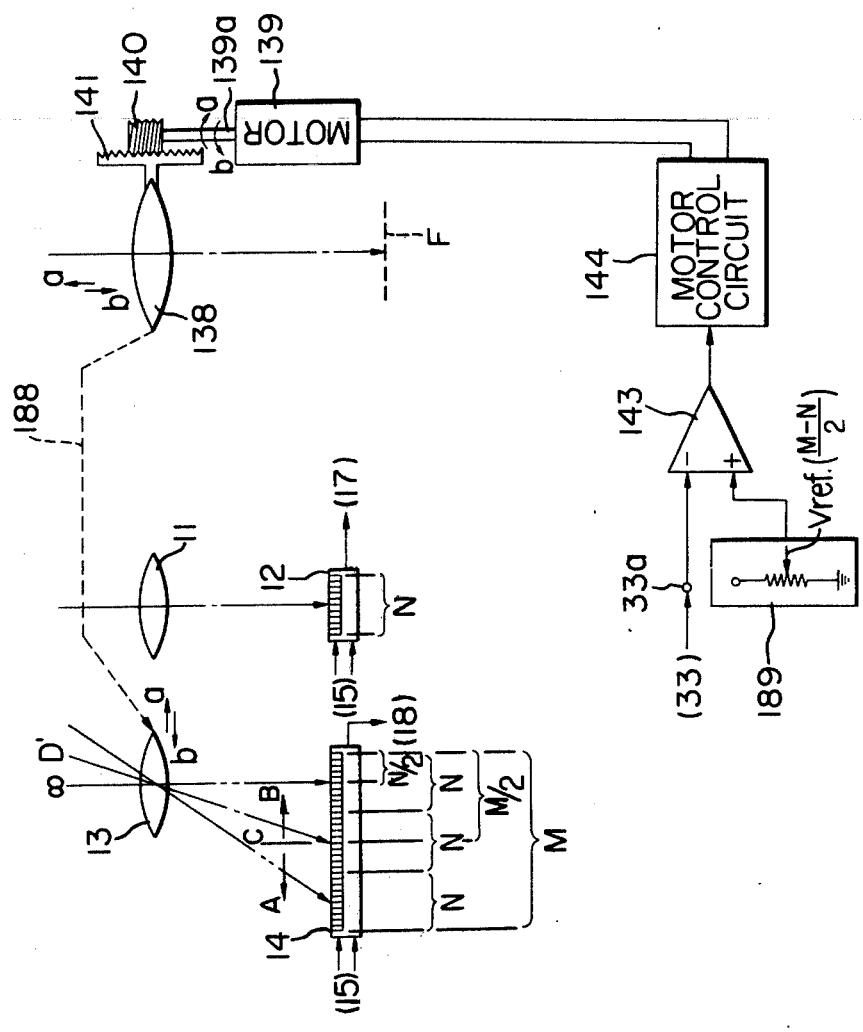
FIG. 26 is a general diagram showing a schematic construction of other embodiment in which the range detecting device shown in FIG. 2 is applied to the automatic focus adjustment system in optical apparatuses and appliances such as cameras, etc.

From the above view point, the embodiment shown in FIG. 26 is so constructed that it may produce the reference voltage $V_{ref}$ corresponding to the value M-N/2 by the reference voltage setting circuit 189 in accordance with the equation $D = d.f/x$ which has been explained in connection with FIG. 1 and apply the output to the (+) input side of the differential amplifier 143, while applying the output voltage from the D/A converter 33 to its (−) input side. That is, according to such construction, the polarity of the output from this differential amplifier 143 represents the deviation, i.e., directivity of the focus deviation (the absolute value of the output, of course, represents the quantity of the deviation). Therefore, when the output from this differential amplifier 143 is applied to the motor control circuit 144, the control circuit 144 causes the motor 139 to drive either in the direction of arrow a or b to eliminate this deviation in accordance with the polarity of the output from the differential amplifier 143, thereby moving the taking lens 138 in the direction of the arrow a or b along the optical axis thereof. At this time, the lens 13 is shifted to the arrow direction a or the arrow direction b in correspondence to the moving direction of the taking lens 138 through the linking mechanism 188, and, when the image center of the object becomes coincided with the center C of the sensor array 14 in the course of shifting of the lens 13, the output of the differential amplifier 143 becomes zero, whereby the motor control circuit 144 stops the motor 139, at which time the taking lens 138 is accurately focussed to the abovementioned object. In the embodiment shown in FIG. 26, the automatic focus adjustment of the taking lens 138 is thus achieved.

As has been stated in the foregoing, the present invention is so constructed that, by adoption of the range finding principle in the double-image coincidence type range or distance meter, apparent parallax in accordance with the distance, i.e., a relative lagged discrepant quantity between two images to be formed with a relative positional discrepancy may be detected by a totally novel and purely electrical method such that, unlike heretofore known techniques, digitallized image scanning signals are relatively shifted. Accordingly, deterioration in the range finding precision or various inconveniences due to complicated device construction, etc., as has been experienced with the conventionally proposed range detecting methods and apparatuses, are perfectly eliminated, and the highly precise range finding is made possible with a relatively simple circuit construction. Also, in the present invention, since the image scanning signals obtained in analog quantities are converted into digital data, the precision in the detection remarkably improved in comparison with the conventional method and device, and, moreover, the construction of the processing circuit can be simplified very much. In particular, since the coincidence detecting circuit utilizes the digital data, as its object of processing, its construction can be simple. And yet, by utilizing IC components in the circuit construction, the device can be formed in an extremely compact style, so that it can be applied highly advantageously to the automatic focus adjusting system in optical machinery such as cameras, etc..

Incidentally, when a pair of the photo-sensor arrays are used as shown in FIG. 2, the image on the photosensor 14 changes its position in accordance with the object distance, so that the number of the sensors sufficient for covering the lagged quantities of the image to be found from the base line length, focal distance, and range finding region, etc. between the lenses 11 and 13. On the contrary, as the image on the photo-sensor array 12 is the reference image, it can be focussed at a substantially constant position, so that the number of the sensor can be less than that in the photo-sensor array 14.

Also, when the coincidence of the recorded value in the shift registers 23 and 24 is to be detected, it is desirable that the data from the entire bits (i.e., N bits) in the shift registers 23 and 24 be appraised and detected, as shown in the illustrated embodiment, although, when the bit number becomes large, the construction of the coincidence detecting circuit 27 becomes complicated and the wiring becomes also complicated. In such case, it is practical to detect the coincidence in appropriate numbers of bits in the N numbers such as, for example, N/2 number at every one bit, or N/4 number at every three bits, or any arbitrary bit numbers.

For the photo-sensor array to be used in the present invention, CCD image sensor and self-scanning type photodiode array are general and easy to use. Also, by introducing each output of the ordinary photo-diode array into the analog shift register as the input thereto, these signals can be used as the time-sequential signals.

Size of a single sensor in the CCD image sensor and self-scanning type photo-diode array, available in general market is ordinarily 10 to 50 microns, depending on which size the precision in the range finding is determined. That is, the smaller the size of the sensor is, the more accurate distance information can be obtained well responding to even a small movement of the image on the photo-sensor array. On the other hand, if the size of the sensor is increased, the signal output becomes great, but the sensor is unable to follow small variations in the distance. However, in utilization of the advantage of its large signal output, such large-sized sensor can be used in the zone focus system in the camera, etc..

What we claim is:

1. A method of detecting a range of an object comprising the steps of:
    (a) deriving first and second images of said object along different sight lines;
    (b) electrically sensing said first and second images to produce an electrical analog signal for each image element of said first and second images;
    (c) quantizing said electrical analog signal to produce quantized data for each image element of the first and second images;
    (d) storing the quantized data on N successive elements of the first image and successively storing, on one set-by-set basis, the quantized data on each of a plurality of different sets of N successive elements of the second image;
    (e) comparing the stored quantized data on said set of the N successive elements of the second image with the stored quantized data on the N successive elements of the first image at every time the quantized data on a set of the N successive elements of the second image are stored;
    (f) detecting, through said comparison process, a set of the N successive elements of the second image which can be regarded as being substantially identical with the N successive elements of the first image; and
    (g) determining the range of the object on the basis of a location, within the second image, of said set of the N successive elements of the second image which has been regarded as being substantially identical with the N successive elements of the first image through said detection process.

2. An apparatus for detecting the range of an object comprising:
    (a) optical means arranged to form first and second images of said object along different sight lines;
    (b) image sensing means arranged to receive said first and second images to produce an electrical analog signal for each image element of said first and second images;
    (c) quantization means for quantizing said electrical analog signal to produce quantized data for each image element of said first and second images;
    (d) data storing means adapted to store the quantized data on N successive elements of said first image and to successively store, on one set-by-set basis, the quantized data on a plurality of different sets of N successive elements of said second image;
    (e) comparison means for comparing the stored quantized data on said set of the N successive elements of the second image with the stored quanitzed data on the N successive elements of the first image at every time the quantized data on a set of the N successive elements of the second image are stored in said data storing means;
    (f) detection means for detecting, based on an output from said comparison means, a set of the N successive elements of the second image which can be regarded as being substantially identical with the N successive elements of the first image; and
    (g) range determination means for determining the range of the object on the basis of a location, within the second image, of said set of the N successive elements of the second image which has been regarded as being substantially identical with the N successive elements of the first image by said detection means.

3. A method according to claim 1, wherein said range determination process comprises the step of storing, at every time the quantized data on a set of the N successive elements of the second image are stored, a location, within the second image, of said set of the N successive elements of the second image whose quantized data are stored.

4. A method according to claim 3, wherein said range determination process further comprises the step of reading out the stored data on the location at the instant when a set of the N successive elements of the second image which can be regarded as being substantially identical with the N successive elements of the first image have been detected.

5. A method according to claim 4, wherein said location storing process includes counting of address number, within the second image, of each set of the N successive elements of the second image, the quantized data of which are stored; and said read-out process includes reading-out of the counted address number at the instant when a set of the N successive elements of the second image which can be regarded as being substantially identical with the N successive elements of the first image have been detected.

6. A method according to claim 4, wherein said comparison process includes the step of searching of match data in the stored quantized data on a set of the N successive elements of the second image with respect to the stored quanitzed data on the N successive elements of the first image.

7. A method according to claim 6, wherein said detection process comprises the step of counting the number of searched match data in each of said plurality of sets of the N successive elements of the second image.

8. A method according to claim 7, wherein said detection process further comprises the step of detecting whether the counted number of the match data has reached a predetermined number, whereby a set of the N successive elements of the second image, the counted number of the match data of which reached said predetermined number, is regarded as the set which is substantially identical with the N successive elements of the first image.

9. A method according to claim 7, wherein said detection process further comprises the step of detecting the largest number of the match data, whereby a set of the N successive elements of the second image, the number of the match data of which have become the largest, is regarded as the set which is substantially identical with the N successive elements of the first image.

10. A method according to claim 4, wherein said quantization process comprises the steps of:
   detecting the maximum level in the electrical analog signals on the elements of the first image;
   setting a reference level on the basis of the detected maximum level; and
   comparing said electrical analog signal on each image element of the first and second images with respect to the set reference level.

11. A method according to claim 10, wherein the process for setting said reference level includes setting of a level lower than said detected maximum level.

12. An apparatus according to claim 2, wherein said range determination means comprises location storing means for storing, at every time the quantized data on a set of the N successive elements of the second image are stored in said data storing means, a location, within the second image, of said set of N successive elements of the second image whose quantized data are stored.

13. An apparatus according to claim 12, wherein said range determination means further comprises read-out means for reading out the stored data on the location from said location storing means, at the instant when a set of the N successive elements of the second image which can be regarded as being substantially identical with the N successive elements of the first image have been detected by said detection means, said read-out means being coupled to said location storing means and said detection means.

14. An apparatus according to claim 13, wherein said location storing means is a counting circuit which counts address number, within the second image, of each set of the N successive elements of the second image, the quantized data of which are stored in said data storing means; and said read-out means is a read-out circuit which reads out from the counting circuit the address number counted by said counting circuit at the instant when said detection means detects a set of the N successive elements of the second image which can be regarded as being substantially identical with the N successive elements of the first image, and which is coupled to said detection means and said counting circuit.

15. An apparatus according to claim 13, wherein said comparison means includes a match detecting circuit for detecting match data in the stored quantized data on a set of the N successive elements of the second image with respect to the stored quantized data on the N successive elements of the first image, said match detecting circuit being coupled to said data storing means.

16. An apparatus according to claim 15, wherein said detection means comprises a match counting circuit for counting the number of match data detected by said match detecting circuit, said match counting circuit being coupled to said match detecting circuit.

17. An apparatus according to claim 16, wherein said detection means further comprises a match count detecting circuit for detecting whether the match count of said match counting circuit has reached a predetermined count, said match count detecting circuit being coupled to said match counting circuit and producing a coincided signal when the match count of the match counting circuit reached said predetermined count, and said read-out means being coupled to said match count detecting circuit to read out from said location storing means the stored data on the location in response to said coincided signal, whereby a set of the N successive elements of the second image, the number of the match data of which has reached said predetermined number, is regarded as the set which is substantially identical with the N successive elements of the first image.

18. An apparatus according to claim 16, wherein said detection means further comprises a match count comparing circuit for detecting the largest match count of said match counting circuit, said match count comparing circuit being coupled to said match counting circuit and providing an electrical signal at every time the match count of the match counting circuit increases, and said read-out means being coupled to said match count comparing circuit and reading out from said location storing means the stored data on the location at every time said electrical signal is provided, whereby a set of the N successive elements of the second image, the number of the match data of which have become the largest, is regarded as the set which is substantially identical with the N successive elements of the first image.

19. An apparatus according to claim 2, wherein said quantization means comprises:
   first circuit means for detecting the maximum level in the electrical analog signals on the elements of the first image produced from said image sensing means;
   second circuit means for setting a reference level on the basis of the detected maximum level detected by said first circuit means, said second circuit means being coupled to said first means; and
   third circuit means for comparing said electrical analog signal on each image element of said first and second images produced from said image sensing means with respect to said reference level set by said second circuit means, said third circuit means being coupled to said second circuit means; and wherein said data storing means is coupled to said third circuit means to store therein the output from said third circuit means.

20. An apparatus according to claim 19, wherein said second circuit means comprises electrical means for setting a level lower than the maximum level detected by said first circuit means.

21. An apparatus according to claim 2, wherein said data storing means comprises:
   a first shift register having N storing locations and adapted to store the quantized data on the N successive elements of said first image; and
   a second shift register having N storing locations and adapted to successively store, on one set-by-set basis, the quantized data on said plurality of sets of the N successive elements of said second image; and wherein said comparison means is coupled to said first and second shift registers.

22. An apparatus according to claim 21, wherein said first and second shift registers are serial-in-parallel-our type shift registers.

23. An apparatus according to claim 21, wherein said first and second shift registers are serial-in-serial-out recirculation type shift registers.

24. An apparatus according to claim 2, wherein said optical means comprises:
first optical channel means for focussing said first image onto a first portion of said image sensing means; and
second optical channel means for focussing said second image onto a second portion of said image sensing means, said second optical channel means being disposed away from said first optical channel means so that said first and second images are derived along different sight lines.

25. An apparatus according to claim 24, wherein said image sensing means comprises a first array of photo-sensors for receiving said first image and a second array of photo-sensors for receiving said second image.

26. An apparatus according to claim 25, wherein said first array includes first number of photo-sensors, and said second array includes second number of photo-sensors which are more in number than the photo-sensors included in said first array.

27. An apparatus according to claim 24, wherein said image sensing means comprises an array of photo-sensors for receiving both of said first and second images.

28. An apparatus according to claim 27, wherein said array of photo-sensors has:
a first region which includes first number of photo-sensors to be used for receiving said first image; and
a second region which includes second number of photo-sensors which is more in number than the photo-sensors included in said first region, and which are used for receiving said second image.

29. An apparatus according to claim 2, wherein said image sensing means has a plurality of image sensing elements for sensing the image elements of said first and second images and producing said electrical analog signal for each image element of the first and second images; and said apparatus further comprises driver circuit means for electrically driving each of said image sensing elements of the image sensing means, said driver circuit means being coupled to the image sensing means and providing intermittent start pulses and intermittent drive pulses.

30. An apparatus according to claim 29, further comprising adjustment circuit means for adjusting the light receiving time of each of said image sensing elements of the image sensing means, said adjustment circuit means being capable of responding to the electrical analog signal produced from said image sensing means; being coupled to said driver circuit means; and adjusting the light receiving time of each of said image sensing element by adjusting the time interval of said start pulses to be provided to the image sensing means from the driver circuit means in accordance with the level of said electrical analog signal.

31. An apparatus according to claim 30, wherein said adjustment circuit means comprises:
first circuit means for generating first reference clock pulses to determine a timing of said drive pulses to be provided to said image sensing means from said driver circuit means, said first circuit means being coupled to said driver circuit means;
second circuit means for generating second reference clock pulses to determine a timing for said start pulses to be provided to said image sensing means from said driver circuit means, said second circuit means being coupled to said driver circuit means;
third circuit means for detecting a peak level of the electrical analog signal produced from said image sensing means; and
fourth circuit means for adjusting a timing of said second reference clock pulses to be generated from said second circuit means in response to the output from said third circuit means,
the time interval of said start pulses to be provided to said image sensing means from said driver circuit means being adjusted by adjusting the timing of said second reference clock pulses to be generated from said second circuit means.

32. An apparatus according to claim 31, wherein said second circuit means is so arranged that the same is coupled to said first circuit means, and generates said second reference clock pulse at every predetermined number of said first reference clock pulses to be generated from the first circuit means; and said fourth circuit means is so arranged that the same is coupled to said first circuit means, and adjusts said timing of said second reference clock pulses to be generated from said second circuit means by adjusting the timing of said first reference clock pulses to be generated from said circuit means.

* * * * *

UNITED STATES PATENT AND TRADEMARK OFFICE
CERTIFICATE OF CORRECTION

PATENT NO. : 4,189,232

DATED : February 19, 1980

INVENTOR(S) : NORIYUKI ASANO, et al.

It is certified that error appears in the above-identified patent and that said Letters Patent are hereby corrected as shown below:

Column 2, line 22, change "form" to --from--.

Column 4, line 64, change "imge" to --image--.

Column 5, line 19, add --thereafter-- before "the".

Column 8, line 15, change "imate" to --image--;

Column 10, line 56, insert --feeding of the-- after "controlling".

Column 13, line 48, change "provided" to --recorded--.

Column 14, line 4, insert --at this moment-- before "becomes";

line 6, delete "at this moment";

line 12, insert --33-- before ", and";

lines 12-13, delete "by the D/A converter 33";

line 38, insert --have-- before "arrived".

Column 17, line 47, change "Q" (first occurrence) to --$\overline{Q}$--.

UNITED STATES PATENT AND TRADEMARK OFFICE
CERTIFICATE OF CORRECTION

PATENT NO. : 4,189,232  
DATED : February 19, 1980  
INVENTOR(S) : NORIYUKI ASANO, et al.

Page 2 of 3

It is certified that error appears in the above-identified patent and that said Letters Patent are hereby corrected as shown below:

Column 22, line 35, change "97" to --27--.

Column 28, line 24, change "Q" to --$\overline{Q}$--.

Column 33, line 59, change "relative" to --relatively--.

Column 35, line 35, change "bring" to --being--.

Column 37, line 9, change "138a" to --139a--;

line 48, insert --needle-- after "indicator".

Column 41, line 22, insert --through-- after "viewing".

Column 42, line 1, insert --when the-- before "lens";

line 20, change "supply" to --shutter--;

line 22, insert --time-- after "which";

line 24, change "feeding" to --supply--;

line 27, change "in" to --with--.

UNITED STATES PATENT AND TRADEMARK OFFICE
CERTIFICATE OF CORRECTION

PATENT NO. : 4,189,232

DATED : February 19, 1980

INVENTOR(S) : NORIYUKI ASANO, et al.

It is certified that error appears in the above-identified patent and that said Letters Patent are hereby corrected as shown below:

Column 44, line 30, delete "lagged".

Signed and Sealed this

Eighteenth Day of November 1980

[SEAL]

Attest:

Attesting Officer

SIDNEY A. DIAMOND

Commissioner of Patents and Trademarks